US008447167B2

(12) United States Patent
Nabeshima et al.

(10) Patent No.: US 8,447,167 B2
(45) Date of Patent: May 21, 2013

(54) RECORDING/REPRODUCTION DEVICE AND METHOD FOR DIGITAL BROADCASTING

(75) Inventors: Shinji Nabeshima, Osaka (JP); Kazuo Okamura, Osaka (JP); Naoya Takao, Osaka (JP)

(73) Assignee: Panasonic Corporation (JP)

( * ) Notice: Subject to any disclaimer, the term of this patent is extended or adjusted under 35 U.S.C. 154(b) by 1296 days.

(21) Appl. No.: 12/166,512

(22) Filed: Jul. 2, 2008

(65) Prior Publication Data

US 2008/0271093 A1    Oct. 30, 2008

Related U.S. Application Data

(62) Division of application No. 09/471,357, filed on Dec. 23, 1999, now abandoned.

(30) Foreign Application Priority Data

Dec. 24, 1998   (JP) .................................. 10-367155

(51) Int. Cl.
*H04N 9/80*      (2006.01)
*H04N 5/917*    (2006.01)

(52) U.S. Cl.
USPC ......................................... 386/248; 386/330

(58) Field of Classification Search
USPC ...... 725/141, 51, 52, 110, 112, 133; 386/214, 386/220, 240, 248, 252, 330
See application file for complete search history.

(56) References Cited

U.S. PATENT DOCUMENTS 5,757,909 A * 5/1998 Park .............................. 380/201
5,799,081 A * 8/1998 Kim et al. ..................... 380/203

(Continued)

FOREIGN PATENT DOCUMENTS

EP   0838820       4/1998
EP   0849958 A2   6/1998

(Continued)

OTHER PUBLICATIONS

Official Action of Aug. 11, 2008, issued for the corresponding JP Patent Application No. 2003-124183 and English Translation.

(Continued)

*Primary Examiner* — Vincent Boccio
(74) *Attorney, Agent, or Firm* — Studebaker & Brackett PC; Donald R. Studebaker

(57) ABSTRACT

A recording/reproduction device is provided wherein service content having interactivity can be restored even when recorded. In recording mode, a transport stream from a receiving device 34 is received and a conversion device 36 converts this to a packet-multiplexed stream in a condition suitable for recording, which is then output as a converted stream. The conversion device 36 selects packets relating to a desired service from the transport stream and, of these packets, selects only packets needed for reproduction and uses these to generate a converted stream. A recording device 38 records this converted stream on a recording medium 44. In reproduction mode, the converted stream from recording medium 44 is read by means of a reading device 42 and supplied to a restoration device 40. Restoration device 40, in accordance with the content of this converted stream, restores and outputs a service content signal (for example a composite signal such as NTSC). A video/image output device 46 receives this service content signal and outputs video/images. These are recorded, still in packetized condition. Consequently, since recording can be achieved including the control data, recording/reproduction can be formed without impairing the functionality of the satellite broadcast provided by the control data.

4 Claims, 59 Drawing Sheets

U.S. PATENT DOCUMENTS

| | | | |
|---|---|---|---|
| 5,844,595 | A | 12/1998 | Blatter et al. |
| 5,931,908 | A | 8/1999 | Gerba et al. |
| 5,982,445 | A | 11/1999 | Eyer et al. |
| 6,081,837 | A | 6/2000 | Stedman et al. |
| 6,185,228 | B1 | 2/2001 | Takashimizu et al. |
| 6,324,694 | B1 | 11/2001 | Watts et al. |
| 6,698,020 | B1 | 2/2004 | Zigmond et al. |
| 2002/0007493 | A1 | 1/2002 | Butler et al. |

FOREIGN PATENT DOCUMENTS

| | | |
|---|---|---|
| EP | 0873022 A2 | 10/1998 |
| JP | 06349196 | 12/1994 |
| JP | 07240904 | 9/1995 |
| JP | 08077706 | 3/1996 |
| JP | 09083994 | 3/1997 |
| JP | 09098411 | 4/1997 |
| JP | 09200690 | 7/1997 |
| JP | 09231687 | 9/1997 |
| JP | 09233428 | 9/1997 |
| JP | 09-284763 | 10/1997 |
| JP | 10032796 | 2/1998 |
| JP | 10178614 | 6/1998 |
| JP | 10-271080 | 10/1998 |
| JP | 10-322607 | 12/1998 |
| JP | 10-322671 | 12/1998 |
| JP | 10-327389 | 12/1998 |
| JP | 200041066 | 2/2000 |
| WO | 9746007 | 12/1997 |

OTHER PUBLICATIONS

Official Action of Aug. 30, 2008, issued for the corresponding Korean Patent Application No. 10-2007-0085724 and English Translation.

Official Action of Oct. 27, 2008, issued for the corresponding JP Patent Application No. 2003-124183 and English Translation.

Official Action of Dec. 1, 2008, issued for the corresponding JP Patent Application No. 2001-396473 and English Translation.

* cited by examiner

STRUCTURE OF PACKETIZED DATA

FIG.5

PMT1  (PID=0×11)

| VIDEO | | AUDIO | |
|---|---|---|---|
| PID OF ECM | PID OF ES | PID OF ECM | PID OF ES |
| 0×21 | 0×22 | 0×21 | 0×24 |

FIG.6

PAT  (PID=0X00)

| SERVICE | PID OF PMT |
|---------|------------|
| SV11    | 0X0011     |
| SV12    | 0X0012     |
| SV13    | 0X0013     |
| SV14    | 0X0014     |

| PID OF NIT |
|------------|
| 0X18       |

FIG.7

NIT (PID=0×18)

| TS | TRANSMISSION PARAMETERS | SERVICE LIST |
|---|---|---|
| TS1 | f1··· | SV11、SV12、SV13、SV14 |
| TS2 | f2··· | SV21、SV22、SV23、SV24 |
| ⋮ | ⋮ | ⋮ |

DIAGRAM OF RECEPTION DEVICE

FIG.10 BLOCK DIAGRAM OF RECEPTION / RECODING / REPRODUCTION DEVICE

CONVERTED STREAM RECORDED ON RECORDING MEDIUM

FIG.25

PMT1 (PID=0×0011)

PACKET ID CORRESPONDENCE

| | PID OF ES | PID OF ECM | |
|---|---|---|---|
| VIDEO | 0×0096 | 0×0082 | ES (V) 11 |
| | 0×0097 | 0×0082 | ES (V) 12 |
| AUDIO | 0×0098 | 0×0082 | ES (A) 11 |
| | 0×0099 | 0×0082 | ES (A) 12 |
| NAVIGATION DATA | 0×0092 | 0×0082 | NVT1 |
| | 0×0093 | 0×0082 | NVT2 |

ENTRY CONTENT

| VIDEO | AUDIO | NAVIGATION DATA |
|---|---|---|
| 0×0096 | 0×0098 | 0×0092 |//

ES (V) 11    ES (A) 11    NVT1

FIG.26

PAT (PID=0×0000)

| SERVICE | PID OF PMT |
|---------|------------|
| SV11 | 0×0011 |
| SV12 | 0×0012 |
| SV13 | 0×0013 |
| SV14 | 0×0014 |

FIG.27  NAVIGATION DATA NVT1

OBJECT TABLE

| INDEX | TYPE | X | Y | HANDLER | NORMAL CONDITION | FOCUS CONDITION |
|---|---|---|---|---|---|---|
| 0 | BUTTON | 500 | 200 | 0 | 0 | 1 |
| 1 | BUTTON | 500 | 400 | 1 | 2 | 3 |
| 2 | BUTTON | 500 | 600 | 2 | 4 | 5 |

HANDLER DEFINITION TABLE

| INDEX | INSTRUCTION (SCRIPT) |
|---|---|
| 0 | send_string(index 0, index 2) |
| 1 | send_string(index 1, index 2) |
| 2 | goto contents(index 1) |

HIPER LINK TABLE

| INDEX | VIDEO | AUDIO | NAVIGATION DATA |
|---|---|---|---|
| 0 | 0x0096 | 0x0098 | 0x0092 |
| 1 | 0x0097 | 0x0099 | 0x0093 |

BITMAP TABLE

| INDEX | DATA (BITMAP DATA) |
|---|---|
| 0 | ORDER FROM OSAKA CENTER |
| 1 | ORDER FROM OSAKA CENTER |
| 2 | ORDER FROM TOKYO CENTER |
| 3 | ORDER FROM TOKYO CENTER |
| 4 | GO TO CLOTHING SHOP |
| 5 | GO TO CLOTHING SHOP |

CHARACTER SEQUENCE TABLE

| INDEX | CHARACTER SEQUENCE |
|---|---|
| 0 | 06-6368-XXXX |
| 1 | 03-1234-XXXX |
| 2 | PRODUCT CODE:A-395 |

FIG.28

NAVIGATION DATA NVT2

OBJECT TABLE

| INDEX | TYPE | X | Y | HANDLER | NORMAL CONDITION | FOCUS CONDITION |
|---|---|---|---|---|---|---|
| 0 | BUTTON | 500 | 200 | 0 | 0 | 1 |
| 1 | BUTTON | 500 | 400 | 1 | 2 | 3 |
| 2 | BUTTON | 500 | 600 | 2 | 4 | 5 |

HANDLER DEFINITION TABLE

| INDEX | INSTRUCTION (SCRIPT) |
|---|---|
| 0 | send_string(index 0, index 2) |
| 1 | send_string(index 1, index 2) |
| 2 | goto_contents(index 0) |

HIPER LINK TABLE

| INDEX | VIDEO | AUDIO | NAVIGATION DATA |
|---|---|---|---|
| 0 | 0x0096 | 0x0098 | 0x0092 |
| 1 | 0x0097 | 0x0099 | 0x0093 |

BITMAP TABLE

| INDEX | DATA (BITMAP DATA) |
|---|---|
| 0 | ORDER FROM OSAKA CENTER |
| 1 | ORDER FROM OSAKA CENTER |
| 2 | ORDER FROM TOKYO CENTER |
| 3 | ORDER FROM TOKYO CENTER |
| 4 | GO TO DAILY NECESSITIES SHOP |
| 5 | GO TO DAILY NECESSITIES SHOP |

CHARACTER SEQUENCE TABLE

| INDEX | CHARACTER SEQUENCE |
|---|---|
| 0 | 06-6368-XXXX |
| 1 | 03-1234-XXXX |
| 2 | PRODUCT CODE:B-133 |

FIG.34 BLOCK DIAGRAM OF RECEPTION / RECODING / REPRODUCTION DEVICE

FIG.35 DETAILS OF AV DECODER 52

FLOW CHART OF PROGRAM THAT INTERPRETS AND EXECUTES THE NAVIGATION DATA

EXTERNAL APPEARANCE
REMOTE CONTROLLER

FIG.39

| | DATE AND TIME | TELEPHONE NUMBER | RESULT | MODE |
|---|---|---|---|---|
| 1 | 1998/8/1 | 06-123-XXXX | ○ | RECEPTION |
| 2 | 1998/8/10 | 03-9876-XXXX | ○ | RECEPTION |
| 3 | 1998/8/25 | 052-111-XXXX | × | REPRODUCTION |
| | | ---------- | | |

ONLINE LOG

FIG.41

CONVERTED PMT(PID=0×0011)

PACKET ID CORRESPONDENCE

| | PID OF ES | |
|---|---|---|
| VIDEO | 0×0096 | ES (V) 11 |
| | 0×0097 | ES (V) 12 |
| AUDIO | 0×0098 | ES (A) 11 |
| | 0×0099 | ES (A) 12 |
| NAVIGATION DATA | 0×0092 | NVT1 |
| | 0×0093 | NVT2 |

ENTRY CONTENT

| VIDEO | AUDIO | NAVIGATION DATA |
|---|---|---|
| 0×0096 | 0×0098 | 0×0092 |

ES (V) 11   ES (A) 11   NVT1

FIG.42

CONVERTED PAT (PID=0×0000)

| SERVICE | PID OF CONVERTED PMT | PID OF SIT |
|---------|----------------------|------------|
| SV11    | 0×0011               | 0×0018     |

CONVERTED STREAM RECORDED ON RECORDING MEDIUM

ES OF STATIONARY IMAGE

FIG. 46

NAVIGATION DATA NVT1

OBJECT TABLE

| INDEX | TYPE | X | Y | HANDLER | NORMAL CONDITION | FOCUS CONDITION |
|---|---|---|---|---|---|---|
| 0 | BUTTON | 500 | 200 | 0 | 0 | 1 |
| 1 | BUTTON | 500 | 400 | 1 | 2 | 3 |
| 2 | BUTTON | 500 | 600 | 2 | 4 | 5 |

HANDLER DEFINITION TABLE

| INDEX | INSTRUCTION (SCRIPT) |
|---|---|
| 0 | if MODE=REPRODUCTION<br>  then get_record_time Tr<br>    get_current_time Tc<br>    If Tc-Tr<10800<br>    then send_string(index0,index2)<br>    endif<br>if MODE=RECEPTION OR RECORDING<br>  then send_string(index0,index2)     } α |
| 1 | if MODE=REPRODUCTION<br>  then get_record_time Tr<br>    get_current_time Tc<br>    If Tc-Tr<10800<br>    then send_string(index1,index2)<br>    endif<br>if MODE=RECEPTION OR RECORDING<br>  then send_string(index1,index2)     } β |
| 2 | goto_contents (index1) |

HIPER LINK TABLE

| INDEX | VIDEO | AUDIO | NAVIGATION DATA |
|---|---|---|---|
| 0 | 0x0096 | 0x0098 | 0x0092 |
| 1 | 0x0097 | 0x0099 | 0x0093 |

BITMAP TABLE

| INDEX | DATA (BITMAP DATA) |
|---|---|
| 0 | ORDER FROM OSAKA CENTER |
| 1 | ORDER FROM OSAKA CENTER |
| 2 | ORDER FROM TOKYO CENTER |
| 3 | ORDER FROM TOKYO CENTER |
| 4 | GO TO CLOTHING SHOP |
| 5 | GO TO CLOTHING SHOP |

CHARACTER SEQUENCE TABLE

| INDEX | CHARACTER SEQUENCE |
|---|---|
| 0 | 06-6368-XXXX |
| 1 | 03-1234-XXXX |
| 2 | PRODUCT CODE:A-395 |

FIG.47

NAVIGATION DATA NVT2

OBJECT TABLE

| INDEX | TYPE | X | Y | HANDLER | NORMAL CONDITION | FOCUS CONDITION |
|---|---|---|---|---|---|---|
| 0 | BUTTON | 500 | 200 | 0 | 0 | 1 |
| 1 | BUTTON | 500 | 400 | 1 | 2 | 3 |
| 2 | BUTTON | 500 | 600 | 2 | 4 | 5 |

HANDLER DEFINITION TABLE

| INDEX | INSTRUCTION (SCRIPT) |
|---|---|
| 0 | if MODE=REPRODUCTION<br>  then get_record_time Tr<br>  get_current_time Tc<br>  if Tc-Tr<10800<br>    then send_string(index 0, index 2)<br>  endif<br>if MODE=RECEPTION OR RECORDING<br>  then send_string(index 0, index 2) |
| 1 | if MODE=REPRODUCTION<br>  then get_record_time Tr<br>  get_current_time Tc<br>  if Tc-Tr<10800<br>    then send_string(index 1, index 2)<br>  endif<br>if MODE=RECEPTION OR RECORDING<br>  then send_string(index 1, index 2) |
| 2 | goto_contents (index 0) |

HIPER LINK TABLE

| INDEX | VIDEO | AUDIO | NAVIGATION DATA |
|---|---|---|---|
| 0 | 0x0096 | 0x0098 | 0x0092 |
| 1 | 0x0097 | 0x0099 | 0x0093 |

BITMAP TABLE

| INDEX | DATA (BITMAP DATA) |
|---|---|
| 0 | ORDER FROM OSAKA CENTER |
| 1 | ORDER FROM OSAKA CENTER |
| 2 | ORDER FROM TOKYO CENTER |
| 3 | ORDER FROM TOKYO CENTER |
| 4 | GO TO DAILY NECESSITIES SHOP |
| 5 | GO TO DAILY NECESSITIES SHOP |

CHARACTER SEQUENCE TABLE

| INDEX | CHARACTER SEQUENCE |
|---|---|
| 0 | 06-6368-XXXX |
| 1 | 03-1234-XXXX |
| 2 | PRODUCT CODE:B-133 |

FIG.50

SCRIPT OF HANDLER DEFFINTION TABLE

```
IF CONDITION A
(RECORDING DATE AND TIME,
 REPRODUCTION DATE AND TIME)
    then go to content (index  0)
    else go to content (index  1)
endif
```

FIG.51

NAVIGATION DATA NVT1

OBJECT TABLE

| INDEX | TYPE | X | Y | HANDLER | NORMAL CONDITION | FOCUS CONDITION |
|---|---|---|---|---|---|---|
| 0 | BUTTON | 500 | 200 | 0 | 0 | 1 |
| 1 | BUTTON | 500 | 400 | 1 | 2 | 3 |
| 2 | BUTTON | 500 | 600 | 2 | 4 | 5 |

HANDLER DEFINITION TABLE

| INDEX | INSTRUCTION (SCRIPT) | CONDITION |
|---|---|---|
| 0 | send_string(index 0, index 2) | 3 |
| 1 | send_string(index 1, index 2) | 3 |
| 2 | goto_contents(index 1) | 0 |

CHARACTER SEQUENCE TABLE

| INDEX | CHARACTER SEQUENCE |
|---|---|
| 0 | 06-6368-XXXX |
| 1 | 03-1234-XXXX |
| 2 | PRODUCT CODE:A-395 |

HIPER LINK TABLE

| INDEX | VIDEO | AUDIO | NAVIGATION DATA |
|---|---|---|---|
| 0 | 0X0096 | 0X0098 | 0X0092 |
| 1 | 0X0097 | 0X0099 | 0X0093 |

BITMAP TABLE

| INDEX | DATA (BITMAP DATA) |
|---|---|
| 0 | ORDER FROM OSAKA CENTER |
| 1 | ORDER FROM OSAKA CENTER |
| 2 | ORDER FROM TOKYO CENTER |
| 3 | ORDER FROM TOKYO CENTER |
| 4 | GO TO CLOTHING SHOP |
| 5 | GO TO CLOTHING SHOP |

EXECUTION CONDITION TABLE

| INDEX | EXECUTION | TIME LIMIT |
|---|---|---|
| 0 | ALLOWED | — |
| 1 | DENIED | — |
| 2 | CONFIRMATION | — |
| 3 | CONDITIONAL | 23:59 ON 31ST AUGUST, 1998 |
| 4 | CONDITIONAL | 10800 MINUTES |

FIG.52   NAVIGATION DATA NVT2

OBJECT TABLE

| INDEX | TYPE | X | Y | HANDLER | NORMAL CONDITION | FOCUS CONDITION |
|---|---|---|---|---|---|---|
| 0 | BUTTON | 500 | 200 | 0 | 0 | 1 |
| 1 | BUTTON | 500 | 400 | 1 | 2 | 3 |
| 2 | BUTTON | 500 | 600 | 2 | 4 | 5 |

HANDLER DEFINITION TABLE

| INDEX | INSTRUCTION (SCRIPT) | CONDITION |
|---|---|---|
| 0 | send_string(index 0, index 2) | 3 |
| 1 | send_string(index 1, index 2) | 3 |
| 2 | goto_contents(index 0) | 0 |

CHARACTER SEQUENCE TABLE

| INDEX | CHARACTER SEQUENCE |
|---|---|
| 0 | 06-6368-XXXX |
| 1 | 03-1234-XXXX |
| 2 | PRODUCT CODE:B-133 |

HIPER LINK TABLE

| INDEX | VIDEO | AUDIO | NAVIGATION DATA |
|---|---|---|---|
| 0 | 0x0096 | 0x0098 | 0x0092 |
| 1 | 0x0097 | 0x0099 | 0x0093 |

BITMAP TABLE

| INDEX | DATA (BITMAP DATA) |
|---|---|
| 0 | ORDER FROM OSAKA CENTER |
| 1 | ORDER FROM OSAKA CENTER |
| 2 | ORDER FROM TOKYO CENTER |
| 3 | ORDER FROM TOKYO CENTER |
| 4 | GO TO DAILY NECESSITIES SHOP |
| 5 | GO TO DAILY NECESSITIES SHOP |

EXECUTION CONDITION TABLE

| INDEX | EXECUTION | TIME LIMIT | TIME LIMIT |
|---|---|---|---|
| 0 | ALLOWED | — | — |
| 1 | DENIED | — | — |
| 2 | CONFIRMATION | — | — |
| 3 | CONDITIONAL | 23:59 ON 31ST AUGUST, 1998 | — |
| 4 | CONDITIONAL | — | 10800 MINUTES |

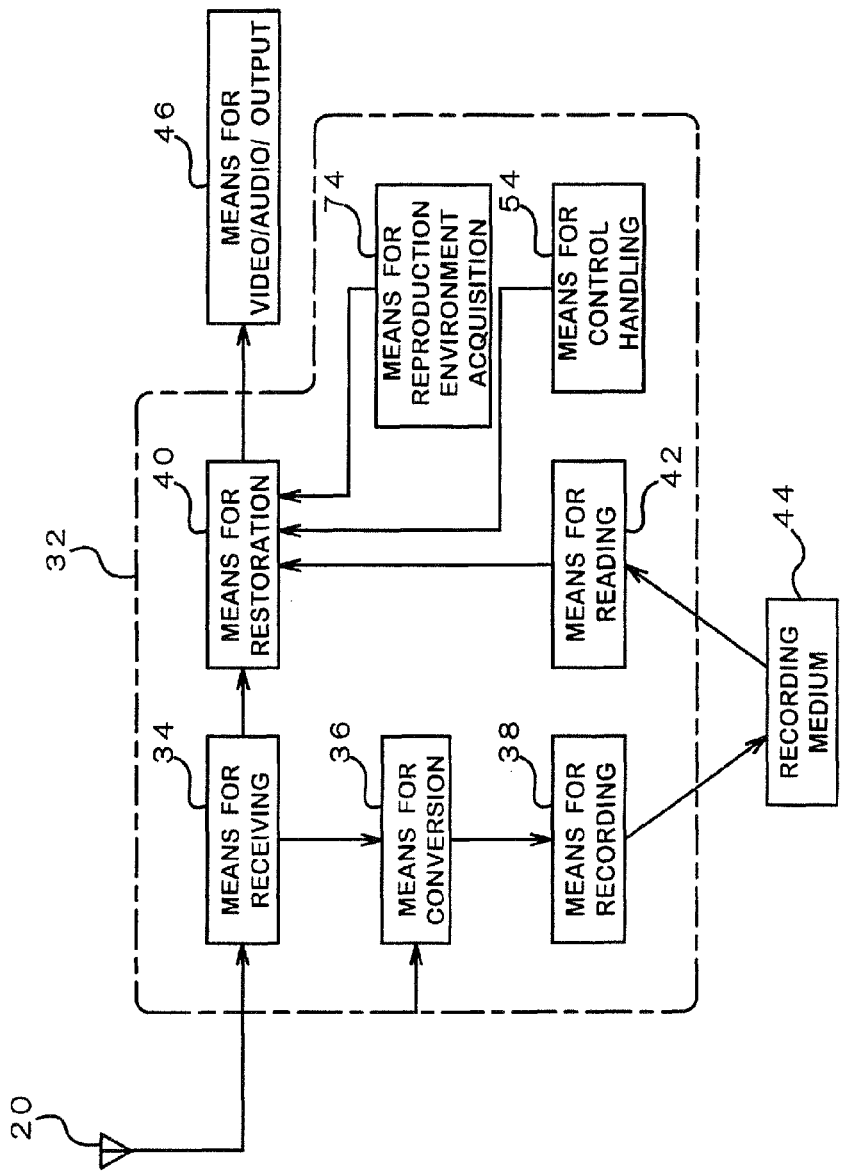
FIG.53 OVERALL LAYOUT DIAGRAM OF RECEPTION/RECORDING/REPRODUCTION DEVICE (SIXTH EMBODIMENT)

FIG.54

NAVIGATION DATA NVT1 (HTML VERSION)

HTML FILE

```
<html>
 <head>
  <script>
   function shopping_osaka() {//SCRIPT FOR ORDERING FROM OSAKA CENTER
     if (MODE == REPRODUCTION)    {
         Tr = get_record_time();
         Tc = get_current_time();
         if (Tc - Tr < 10800) {
             send_string("06-6368-XXXX, "PRODUCT CODE":A-395);
         }
      } else if   (MODE == RECEPTION || MODE == RECORDING) {
         send_string ("06-6368-XXXX, "PRODUCT CODE":A-395);
      }
   }                                                                              ⎫ 210
   function shopping_tokyo() {// SCRIPT FOR ORDERING FROM TOKYO CENTER
     if (MODE == REPRODUCTION) {
         Tr = get_record_time();
         Tc = get_current_time();
         if (Tc - Tr < 10800) {
             send_string("03-1234-XXXX, "PRODUCT CODE":A-395);
         }
      } else if   (MODE == RECEPTION || MODE == RECORDING) {
         send_string ("03-1234-XXXX, "PRODUCT CODE":A-395);
      }                                                                           ⎫ 220
   }
   function goto_clothing_store() {//SCRIPT FOR TRANSFERRING TO CLOTHING SHOP
     goto_contents("video:0x0097; audio:0x0099; navdata:0x0093");                 ⎫ 230
   }
  </script>
 </head>
 <body>
  <object id="id0" type="BUTTON" onclick="shopping_osaka();"
          style="left:500; top:200; normal_bitmap_file:bitmap0;
          focused_bitmap_file:bitmap1;" /> // BUTTON FOR ORDERING FROM OSAKA CENTER
  <object id="id1" type="BUTTON" onclick="shopping_tokyo();"
          style="left:500; top:400; normal_bitmap_file:bitmap2;
          focused_bitmap_file:bitmap3;" /> // BUTTON FOR ORDERING FROM TOKYO CENTER  ⎫ 200
  <object id="id2" type="BUTTON" onclick="goto_clothing_store();"
          style="left:500; top:600; normal_bitmap_file:bitmap4;
          focused_bitmap_file:bitmap5;" /> // BUTTON FOR MOVING TO CLOTHING SHOP
 </body>
</html>
```

BITMAP FILE

| bitmap 0 | ORDER FROM OSAKA CENTER | bitmap 2 | ORDER FROM TOKYO CENTER | bitmap 4 | GO TO CLOTHING SHOP |
|---|---|---|---|---|---|
| bitmap 1 | /ORDER FROM/ /OSAKA CENTER/ | bitmap 3 | /ORDER FROM/ /TOKYO CENTER/ | bitmap 5 | /GO TO/ /CLOTHING SHOP/ |

FIG.55

NAVIGATION DATA NVT2 (HTML VERSION)

HTML FILE

```
<html>
 <head>
  <script>
   function shopping_osaka() {//SCRIPT FOR ORDERING FROM OSAKA CENTER
      if (MODE == REPRODUCTION)   {
         Tr = get_record_time();
         Tc = get_current_time();
         if (Tc - Tr < 10800) {
            send_string("06-6368-XXXX,"PRODUCT CODE":A-395);
         }
      } else if   (MODE == RECEPTION || MODE == RECORDING) {
         send_string ("06-6368-XXXX,"PRODUCT CODE":A-395);
      }
   }
   function shopping_tokyo() {// SCRIPT FOR ORDERING FROM TOKYO CENTER
      if (MODE == REPRODUCTION) {
         Tr = get_record_time();
         Tc = get_current_time();
         if (Tc - Tr < 10800) {
            send_string("03-1234-XXXX,"PRODUCT CODE":A-395);
         }
      } else if   (MODE == RECEPTION || MODE == RECORDING) {
         send_string ("03-1234-XXXX,"PRODUCT CODE":A-395);
      }
   }
   function goto_clothing_store() {//SCRIPT FOR TRANSFERRING TO CLOTHING SHOP
      goto_contents ("video:0x0097; audio:0x0098; navdata:0x0092");
   }
  </script>
 </head>
 <body>
  <object id="id0" type="BUTTON" onclick="shopping_osaka();"
      style="left:500; top:200; normal_bitmap_file:bitmap0;
      focused_bitmap_file:bitmap1;" /> // BUTTON FOR ORDERING FROM OSAKA CENTER
  <object id="id1" type="BUTTON" onclick="shopping_tokyo();"
      style="left:500; top:400; normal_bitmap_file:bitmap2;
      focused_bitmap_file:bitmap3;" /> // BUTTON FOR ORDERING FROM TOKYO CENTER
  <object id="id2" type="BUTTON" onclick="goto_clothing_store();"
      style="left:500; top:600; normal_bitmap_file:bitmap4;
      focused_bitmap_file:bitmap5;" /> // BUTTON FOR MOVING TO CLOTHING SHOP
 </body>
</html>
```

BITMAP FILE

| bitmap 0 | ORDER FROM OSAKA CENTER | bitmap 2 | ORDER FROM TOKYO CENTER | bitmap 4 | GO TO CLOTHING SHOP |
|---|---|---|---|---|---|
| bitmap 1 | ORDER FROM OSAKA CENTER | bitmap 3 | ORDER FROM TOKYO CENTER | bitmap 5 | GO TO CLOTHING SHOP |

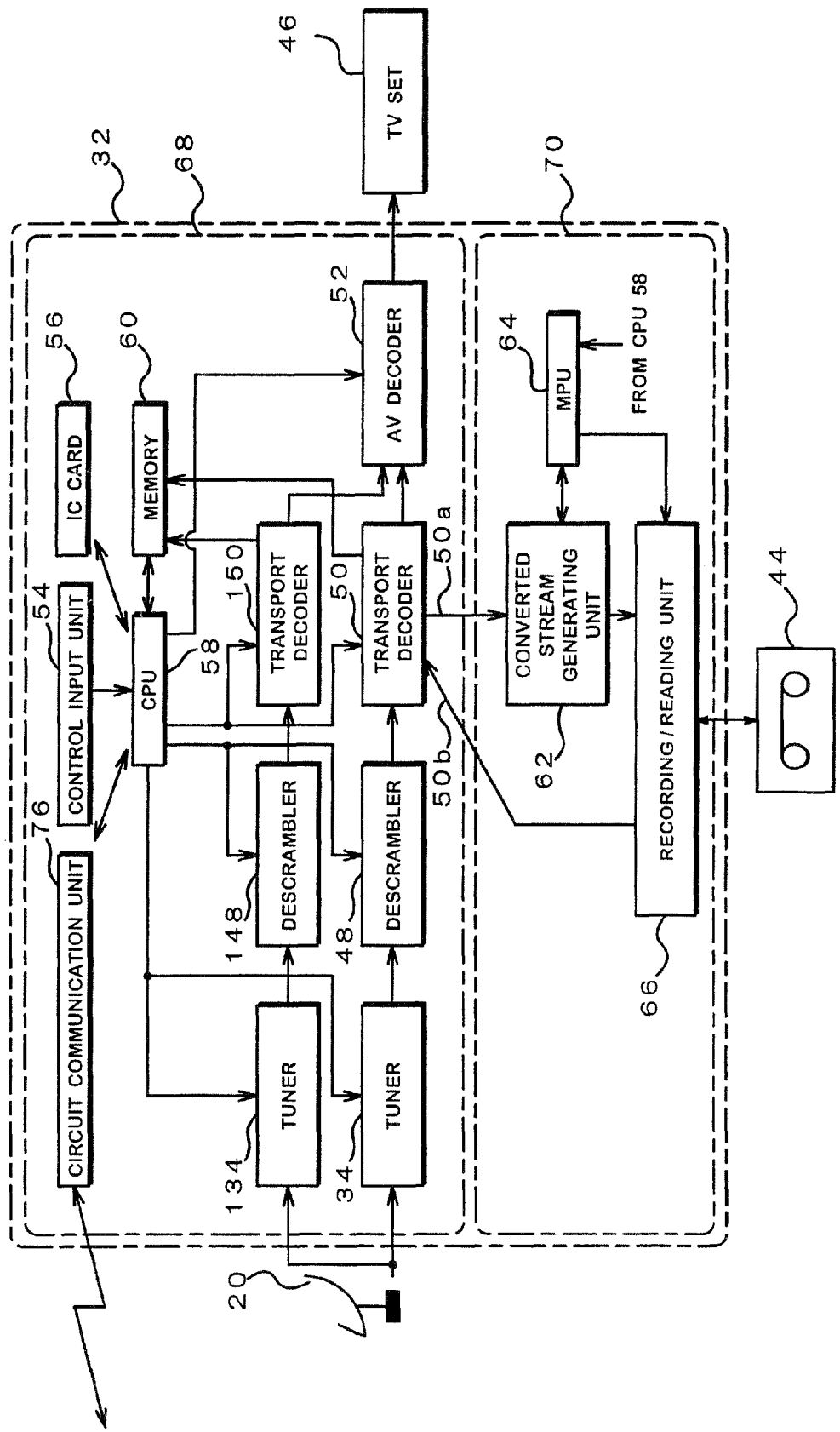
FIG.59 BLOCK DIAGRAM OF RECEPTION / RECODING / REPRODUCTION DEVICE

RECORDING/REPRODUCTION DEVICE AND METHOD FOR DIGITAL BROADCASTING

CROSS-REFERENCE TO RELATED APPLICATION

The entire disclosure of Japanese patent application number Hei 11-133419 filed on 24 Dec. 1998 including specification, claims, drawings and summary is incorporated by reference in its entirety.

BACKGROUND OF THE INVENTION

1. Field of the Invention

The present invention relates to a recording/reproduction device for digital broadcasting.

2. Description of the Related Art

Recording/reproduction devices for recording analogue TV broadcasts record a received NTSC signal. In the case of recording satellite digital transmissions also, conventional recording/reproduction devices recording an NTSC signal were employed. Specifically, they recorded the NTSC signal obtained by decoding and conversion performed by an STB (set-top box) for satellite digital broadcast reception.

However, this prior art technique had the problem that since recording of an NTSC signal was employed, it could not be implemented in reproduction of services provided by digital broadcasting.

SUMMARY OF THE INVENTION

An object of the present invention is to provide a recording/reproduction device and method etc. whereby recording/reproduction can be performed that solves the problem described above and makes use of the characteristics of digital broadcasting.

In a recording/reproduction device and a recording/reproduction method for digital broadcasts of according to the present invention a transport stream is received in which a plurality of services are packet-multiplexed; packets relating to a desired service are selected from the received transport stream to form a converted stream; this converted stream is recorded on a recording medium; the converted stream that is recorded on the recording medium is read; and this converted stream is received and used to reproduce and output service content.

Since recording is effected in a packet-multiplexed condition, the same functionality as on reception can be reproduced on reproduction. Also, since only packets relating to the desired service are selected to form the converted stream and recorded, the recording capacity of the recording medium can be effectively utilized.

In a recording for/reproduction device according to the present invention, the means for conversion generates a converted stream by selecting, of packets relating to the desired service in the transport stream, an elementary stream and PAT and PMT packets.

Consequently, since recording is effected with a converted stream being generated by selecting packets that are necessary for reproduction, the recording capacity of the recording medium can be effectively utilized.

With a recording/reproduction device according to the present invention, the means for conversion also supplies to the means for recording the environment information when the converted stream is generated and the means for recording records this on a recording medium as recording environment information together with the converted stream or as part of the converted stream; and the means for restoration compares the reproduction environment when the converted stream from the means for reading is reproduced with the recording environment information recorded on the recording medium, and alters the content of reproduction control in accordance with differences of these two environments.

Suitable reproduction can therefore be performed taking into account differences in the environment on reproduction and on recording onto the recording medium.

In a recording/reproduction device according to the present invention, the means for conversion supplies recording time information indicating the time at which recording was performed to the recording means as recording environment information; and the means for restoration compares reproduction time information indicating the time at which reproduction is performed with recording time information recorded on the recording medium and alters the content of reproduction control in accordance with the difference of these two.

Consequently, recording can be performed in suitable fashion taking into account the time difference between recording onto the recording medium and reproduction.

In a recording/reproduction device according to the present invention, the means for conversion acquires recording time information based on the TDT or PCR in the transport stream and supplies this to the means for recording. Since a TDT and PCR that were concurrently transmitted from the transmission end are taken as standard, recording of recording time information which is mutually common can be achieved at a plurality of recording/reproduction devices.

In a recording/reproduction device according to the present invention, the means for conversion supplies to the means for recording, as recording environment information, recording place information indicating the place where the recording was made; and the means for restoration compares the reproduction place information indicating the place where reproduction is being performed with the recording place information recorded on the recording medium and alters the content of reproduction control in accordance with differences of these two.

Reproduction can therefore be performed in suitable manner taking into account spatial offset between the recording onto the recording medium and reproduction.

In a recording/reproduction device according to the present invention, the means for conversion supplies recording device information indicating the device with which recording was performed to the recording means as recording environment information; and the means for restoration compares reproduction device information indicating the device with which reproduction is performed with recording device information recorded on the recording medium and alters the content of reproduction control in accordance with the difference of these two.

Reproduction can therefore be performed in suitable manner taking into account differences of the recording device and a reproduction device.

In a recording medium according to the present invention on which are recorded packet-multiplexed data of PAT and PMT and an elementary stream of video or audio or video/audio selected from packets relating to a desired service in a transport stream, said PMT is constituted by extracting from the PMT information in the transport stream only information associated with said elementary stream relating to the desired service.

Consequently, since it is arranged for packets required on reproduction to be selected and recorded, the recording capacity of the recording medium can be effectively utilized.

In a recording medium according to the present invention, on which are recorded packet-multiplexed data, further, recording environment information is recorded in packet-multiplexed form. Consequently, reproduction control can be performed based on this recording environment, when this is generated from this recording medium.

In a transmission device according to the present invention that transmits a transport stream including content data said transport stream includes instructions or data for changing the reproduction control content by comparing recording environment information and reproduction environment information.

Consequently, reproduction can be performed in suitable manner taking into account differences in recording onto the recording medium and the environment on reproduction at the receiving end, by also recording these instructions or data on the recording medium.

In a method of communication according to the present invention, at the receiving end, packets relating to a desired service are selected from the transport stream that is received and used to generate a converted stream, which is recorded on a recording medium; the service content is restored in receiving mode, in accordance with the transport stream that has been received, or, in reproduction mode, in accordance with the converted stream that has been read from said recording medium; and, at the receiving end, the content that is output is altered depending on whether [the current mode] is reception mode or reproduction mode.

Consequently, service content can be restored in an appropriate manner in reception mode and in reproduction mode, respectively.

In a reception for recording/for reproduction device according to the present invention, the means for restoration alters the control content in accordance with the reproduction environment on reproduction. Consequently, appropriate reproduction content can be realized in accordance with the reproduction environment.

In a recording medium according to the present invention on which are recorded packet-multiplexed data of PAT and PMT and an elementary stream of video or audio or video/audio selected from packets relating to a desired service in a transport stream wherein said PMT is constituted by extracting from the PMT information in the transport stream only information associated with said elementary stream relating to the desired service, said packet-multiplexed data includes conditions or instructions applied only on reproduction or conditions or instructions that are not applied only on reproduction.

Consequently, suitable service content can be reproduced in reproduction mode.

According to the present invention, in a transmission device that transmits a transport stream including content data, said transport stream includes conditions or instructions applied only on reproduction or conditions or instructions that are not applied only on reproduction.

Consequently, at the receiving end, suitable service content can be reproduced on reproduction by also recording these instructions or conditions on the recording medium.

In a transmission device according to the present invention that transmits a transport stream including content data, there is included a program script whose control content is different, depending on whether said transport stream is of reception mode or reproduction mode.

Consequently, suitable service content can be obtained respectively in accordance with reception mode or reproduction mode, by also recording these instructions or conditions on the recording medium at the reception end.

In a reception/recording/reproduction device and method of reception/recording/reproduction of the present invention, a packetized transport stream including interactive control data for realizing interactive capability is received; a converted stream including interactive control data is generated by selecting packets relating to a desired service from the received transport stream; the converted stream is recorded on a recording medium; the converted stream recorded on the recording medium is read; and a service content signal including images for control purposes is restored in reception mode by receiving the transport stream, and in reproduction mode by receiving a converted stream that is read from the recording medium, and the content of the service content signal that is output is interactively altered in accordance with control input from an operator, based on interactive control data in this stream.

Since recording is effected including also the interactive control data in the packet-multiplexed condition, interactive functionality can be restored even on reproduction. Also, since the converted stream that is recorded is created by selecting only packets relating to the desired service, the recording capacity of the recording medium can be effectively utilized.

In a device according to the present invention, in the transport stream, a plurality of mutually associated interactive control data form a group and this group is repetitively transmitted a plurality of times and the interactive control data comprise data for displaying control buttons having a display condition of selected condition and unselected condition, and comprise link information of image data or display data associated with the control buttons. Consequently, interactive functionality can be realized even without recording on the device all of the plurality of interactive control data constituting the group.

In a device according to the present invention, the means for conversion, at a time point when the service that is recorded is discontinued, generates a converted stream in which control data indicating discontinuity are inserted. Consequently, on reproduction, the point of discontinuity of the service can easily be discovered.

In a device according to the present invention, the means for restoration, when it discovers, from the converted stream that is read, control data indicating discontinuity, does not perform interactive processing based on navigation data recorded prior to the control data indicating this discontinuity. It is thereby possible to prevent inappropriate interactive processing from being executed on reproduction.

In a reception/recording/reproduction device and the reception/recording/reproduction method of claim 51 of the present invention, the environment on recording is recorded on the recording medium as recording environment information together with the converted stream or as part of the converted stream and, on reproduction, the reproduction environment when the converted stream that is read is reproduced and the recording environment information recorded on the recording medium are compared, and the content of the reproduction control is altered in accordance with the difference of these two environments.

Consequently, suitable reproduction can be performed taking into account the difference of the environment when reproduction is effected and when recording onto the recording medium.

In a device according to the present invention, the means for restoration alters the content of reproduction control in accordance with whether or not the content of the service content signal that is output is interactively altered, based on the differences of said environments. Consequently, it can be arranged for interactive content not to be reproduced that is not required on reproduction.

In a device according to the present invention, the means for restoration alters the content of reproduction control by evaluating the difference of reproduction environment information and recording environment information in accordance with a condition included in the interactive control data. It is thereby possible to restore suitable service content during both reproduction and recording, taking into account differences of the recording environment and reproduction environment.

In a device according to the present invention, there is further provided means for communication for performing communication with the outside and the means for restoration determines whether or not communication is performed by this means for communication in response to control input by an operator in accordance with the difference of the reproduction environment and the recording environment. Consequently, it is possible to suitably determine whether communication is to be performed with the outside during reproduction by taking into account the difference of the reproduction environment and recording environment.

In a device according to the present invention, there is further provided a log recording unit that records log information of communication performed by the means for communication in response to control input by the operator, and, in the log information recording unit, there are also recorded data for distinguishing communication in the reproduction mode and communication in the reception mode. Consequently, log information can be recorded and it is possible to identify whether this log information was logged under reception mode or under reproduction mode.

In a device according to the present invention, said recording environment or reproduction environment are respectively the recording time or reproduction time. Reproduction can therefore be performed in appropriate manner taking into consideration discrepancy of the time of recording onto the recording medium and the reproduction time.

In a device according to the present invention, said recording environment or reproduction environment are respectively the recording time or reproduction time and the means for conversion acquires the recording time from the TDT or PCR in the transport stream and supplies this to the means for recording as recording time information. Since a TDT and PCR that were concurrently transmitted from the transmission end are taken as standard, recording time information which is mutually common can be recorded at a plurality of recording/reproduction devices.

In a device according to the present invention, said recording environment or reproduction environment are respectively the recording time or reproduction time and there is further provided clock means that measures the current time, and the means for conversion acquires the recording time from the output of the clock means and supplies this to the means for recording as recording time information.

Consequently, when the reproduction time is acquired from the clock means of this device on reproduction, even if the clock means shows discrepancy from the standard at time, the difference of the recording time and reproduction time can be acquired with precision.

In a device according to the present invention, said recording environment or reproduction environment are respectively the place of recording or place of reproduction. Consequently, reproduction can be performed in suitable manner taking into account spatial offset of reproduction and recording onto the recording medium.

In a device according to the present invention, said recording environment or reproduction environment are respectively the device whereby recording was effected or the device whereby reproduction was effected. Consequently, reproduction can be performed in suitable manner taking into account the difference of the device on which recording was effected and the device on which reproduction is effected.

In a reception/recording/reproduction device according to the present invention, a converted stream including a program/script is recorded on a recording medium. Furthermore, it is arranged for the control content to be different, depending on whether [the current mode] is reception mode or reproduction mode, even in the case where the same program/script was executed. Consequently, suitable service content can be obtained depending on whether the current mode is reception mode or reproduction mode.

In a reception/recording/reproduction device according to the present invention, in reproduction mode, the current time point and the recording time point are compared and the content of control is arranged to be altered in accordance with this comparison. Consequently, suitable content can be reproduced in accordance with differences of the time point of reception and recording and of the current time point on reproduction.

In a basic program recording medium according to the present invention wherein a basic program is recorded, a basic program is recorded such as to make the control unit perform processing such that the recording environment information and reproduction environment read from the recording medium are compared and the control program or condition data included in interactive control data are interpreted and the control content in respect of the decoder or signal generating circuit or both of these is altered in accordance with differences in said two environments.

Consequently, suitable reproduction can be performed taking into account the difference of the environment when effecting reproduction and recording onto the recording medium.

In a basic program recording medium according to the present invention on which a basic program is recorded, a basic program is recorded for making the control unit perform processing whereby the control content is made different depending on whether the current mode is reception mode or reproduction mode, respectively, by interpreting intended portions contained in the program/script in which the result of execution is different depending on whether [the current mode] is reception mode or reproduction mode.

Consequently, suitable reproduction can be performed taking into account difference of the environment on recording onto the recording medium and on reproduction.

In a recording medium according to the present invention on which are recorded packet-multiplexed data of PAT and PMT and interactive control data and at least a selected elementary stream from packets relating to a desired service in a transport stream said PMT is constituted by extracting from all the PMT information in the transport stream only information associated with said elementary stream relating to the desired service and said interactive control data constitutes a group of a plurality of interactive control data that are mutually associated, these groups being recorded in repetitive fashion a plurality of times.

Consequently, on reproduction, interactive functionality can be realized without recording on the device all of the plurality of interactive control data constituting the group.

In a recording medium according to the present invention wherein is recorded a converted stream interactive control data included in this converted stream generate image signals for control purposes which are supplied to a signal generating circuit jointly with a basic program or interpreted by said basic program and perform control such as at least to alter interactive control data that is separated by the decoder under the control of control input from the operator, whereby processing is made to be performed to output from the signal generating circuit a service content signal having interactive capability.

Consequently, even during reproduction, service content having interactive capability can be realized.

In a recording medium according to the present invention, the interactive control data, jointly with said basic program or interpreted in said basic program, furthermore compares the recording environment information read from the recording medium and reproduction environment, and performs processing such as to alter the control content in respect of the decoder or signal generating circuit, or both of these, based on the difference of said two environments.

Suitable reproduction can therefore be performed taking into account the difference of environment on reproduction and recording to the recording medium.

In a recording medium according to the present invention on which is recorded a converted stream, the program/script included in this converted stream performs control processing jointly with said basic program or interpreted by said program, and said program/script includes a portion constituted so as to perform different control in reception mode and in reproduction mode.

Consequently, it is possible to perform suitable control in reception mode and in reproduction mode, respectively.

In a transmission device and a method of transmission according to claim 53 of the present invention, being a method of transmission wherein a transport stream including content data and interactive control data for realizing interactive capability are transmitted in multiplexed fashion, said interactive control data constitutes a group of a plurality of mutually associated interactive control data, these groups being repetitively transmitted a plurality of times and including in said interactive control data an instruction to alter the processing content at the receiving end as a result of comparison of the recording environment when recording was effected and the reproduction environment when reproduction was effected.

Consequently, reproduction can be performed in a suitable manner taking into account difference of the environments on recording and reproduction when recording and reproduction are performed at the receiving end.

A carrier wave according to the present invention carries a transport stream including interactive control data for realizing content and interactive capability, said interactive control data constituting a group of a plurality of interactive control data that are mutually associated, this group being transmitted in repetitive fashion a plurality of times, said interactive control data including an instruction to alter the processing content at the receiving end on comparing the recording environment when recording was performed with the reproduction environment when reproduction is performed.

Consequently, reproduction can be performed in an appropriate manner taking into account the difference of environment on recording and reproduction when recording and reproduction are performed at the receiving end.

In a carrier wave according to the present invention that carries a transport stream including content data and control data, the control data constitute a group of a plurality of mutually associated control data and these groups are repetitively transmitted a plurality of times, and the control data includes a portion whereby different control content is performed in reception mode and in reproduction mode.

Consequently, suitable content can be provided in reception mode and in reproduction mode respectively at the receiving end.

In a method of communication according to the present invention in which, at the transmission end, a transport stream including interactive control data for realizing interactive capability is transmitted; at the receiving end, packets relating to a desired service are selected from the transport stream that is received and used to generate a converted stream including interactive control data, which is recorded on a recording medium; the service content including images for control purposes is restored in receiving mode, in accordance with the transport stream that has been received, or, in reproduction mode, in accordance with the converted stream that has been read from the recording medium and the content that is output is interactively altered in accordance with control input from the operator based on interactive control data in this stream; and instructions or data of different processing content are included in receiving mode and reproduction mode in the interactive control data that is transmitted at the transmission end.

Suitable service content can therefore be restored respectively in receiving mode and reproduction mode.

In a transmission device according to the present invention that multiplexes and transmits a transport stream including interactive control data for realizing content data and interactive capability, said interactive control data constitute a group of a plurality of interactive control data that are mutually associated, this group being transmitted in a repetitive fashion a plurality of times, and said interactive control data include instructions or data of different processing content in reception mode and reproduction mode at the receiving end.

Consequently, suitable service content can be restored respectively when received at the receiving end, and further when recorded and reproduced.

In a reception/recording/reproduction device according to the present invention comprising: means for reception that receives a packetized transport stream including interactive control data for realizing an interactive capability; means for conversion that selects packets relating to a desired service from a received transport stream and generates a converted stream including interactive control data; means for recording that records a converted stream from the means for conversion on a recording medium; means for reading that reads a converted stream recorded on a recording medium; means for control handling that accepts a control input from an operator; and means for restoration that, in reception mode, receives a transport stream from the means for reception and that, in reproduction mode, receives a converted stream from the means for reading, and that restores a service content signal including images for control purposes and that interactively alters the content of the service content signal that is output in accordance with control input from the operator based on interactive control data in this stream, said means for restoration alters the control content in accordance with the reproduction environment on reproduction.

Suitable service content can therefore be restored depending on the reproduction environment.

In a device according to the present invention, the means for restoration evaluates the reproduction environment on reproduction in accordance with a condition included in the interactive control data, and alters the control content in accordance with the reproduction environment. Consequently, suitable service content can be reproduced depending on the reproduction environment when reproduction is performed.

In a device according to the present invention, the means for restoration alters the content of the reproduction control depending on whether or not the content that is output is interactively altered. It can therefore be arranged that interactive reproduction that is not required on reproduction is not performed.

A device according to the present invention further comprises means for communication for performing communication with the outside and the means for restoration determines whether or not communication using this means for communication is performed in response to control input of an operator, in accordance with the reproduction environment on reproduction. Whether or not to perform communication with the outside can therefore be appropriately determined in accordance with the reproduction environment on reproduction.

A device according to the present invention further comprises a log recording unit that records log information of communication made by the means for communication in response to control input by an operator wherein the log information recording unit records data identifying whether a communication is a communication made in reproduction mode or a communication made in reception mode. The log information can therefore be recorded and it is possible to identify whether this log information relates to reception mode or to reproduction mode.

In a recording medium according to the present invention on which are recorded packet-multiplexed data, of packets relating to a desired service in a transport stream, packet-multiplexed data of at least a selected elementary stream, PAT, PMT and interactive control data are recorded, and said PMT is constituted by extracting from all the PMT in the transport stream only information associated with said elementary stream relating to the desired service, and, in said interactive control data, a plurality of mutually associated interactive control data form a group, this group being repetitively recorded a plurality of times, said interactive control data includes conditions or instructions applied only on reproduction or conditions or instructions that are not applied only on reproduction.

Interactive functionality can therefore be realized on reproduction even if not all of the plurality of interactive control data forming the group are recorded on the device. Furthermore, suitable reproduction can be performed by means of a condition or instruction that is applied or is not applied only on reproduction.

In a recording medium according to the present invention wherein is recorded interactive control data for performing control jointly with a basic program or interpreted by said basic program in respect of a recording/reproduction device comprising: a conversion circuit that selects packets relating to a desired service from a supplied transport stream and outputs these as a converted stream including interactive control data; a recording unit that records a converted stream from the conversion circuit on a recording medium together with recording environment information; a reading unit that reads a converted stream recorded on a recording medium; a decoder that separates and outputs an elementary stream and interactive control data from the converted stream that is read; a signal generating circuit that receives the elementary stream from the decoder and instructions from a control unit and that generates a service content signal; a control unit that controls the operation of the decoder; a recording unit that records said basic program whereby the operation of the control unit is determined; and a control handling unit that accepts a control input from the operator; said interactive control data, jointly with said basic program or interpreted by said basic program, generates an image signal for control purposes and supplies this to the signal generating unit, whereby processing is made to be performed in which a service content signal having interactive capability is output from the signal generating circuit under control such that at least the interactive control data that are separated by the decoder are altered in accordance with control input from the operator, and said navigation program includes conditions or instructions applied only on reproduction or conditions or instructions that are not applied only on reproduction.

Consequently, suitable reproduction can be performed in accordance with conditions or instructions that are applied or are not applied only on reproduction.

In a carrier wave according to the present invention that carries a transport stream including interactive control data for realizing content and interactive capability, said interactive control data constituting a group of a plurality of interactive control data that are mutually associated, this group being transmitted in repetitive fashion a plurality of times, said interactive control data includes in said interactive control data conditions or instructions applied only on reproduction or conditions or instructions that are not applied only on reproduction.

Consequently, on reception or reproduction at the receiving end, interactive functionality can be realized without recording all of the plurality of interactive control data constituting the group on the device. Furthermore, suitable reproduction can be performed by conditions or instructions that are applied or that are not applied only on reproduction.

In the present invention, the term "means for receiving" means means for receiving a transport stream and is not restricted to wireless transmission but is a concept including reception of wired transmissions. Tuner 34 of FIG. 10 in the embodiment corresponds to this.

The "means for conversion" means means for converting a transport stream to a converted transport stream. In the embodiment, for example decoder 50 of FIG. 10, converted stream generating unit 62 and CPU 58 (in particular, steps S 24 and S 25) correspond to this.

The "converted stream" is a concept that designates a stream obtained by subjecting the transport stream for recording to any kind of processing and includes not only the stream as finally recorded, but also an intermediately generated stream. For example, in the embodiment, it includes the stream selected for output from terminal 50a of transport decoder 50.

The "means for recording" means means for recording on a recording medium. In the embodiment, recording/reading unit 66 corresponds to this.

The "means for reading" means means for reading from the recording medium. In the embodiment, the recording/reading unit 66 corresponds to this.

The "means for restoration" means means that restores a service content based on a transport stream or converted stream. In the embodiment, for example, TS decoder 50 and CPU 58 (in particular, steps S 32 to S 36) correspond to this.

The "recording time information" means information concerning the time when recording was made and is a concept including the time point, day, month, year, day of the week, and the distinction between working days and holidays etc. It is furthermore a concept including combinations of these.

"Elementary stream" means a stream obtained by packetizing video or audio, or both of these, constituting service content.

"Reproduction control" is a concept including control that is performed not just of reproduction itself but also in association with reproduction. For example, it includes control whereby communication is performed with the outside on reproduction.

"Taking an instruction as the subject of execution" is a concept including not just actually executing the instruction in question but also the case where the instruction is executed or is not executed depending on a condition.

"Basic program" means a program for interpreting other programs or data and executing these.

"Recording medium on which a program is recorded" means a recording medium such as ROM, RAM, a flexible disc, CD-ROM, memory card or hard disc on which a program is recorded. Also, it is a concept including communication media such as telephone circuits or carrier channels. It is a concept including not merely recording media such as a hard disc connected to a CPU whereby the recorded program is directly executed, but also recording media such as CD-ROMs on which is recorded a program that is executed after first installing it on the hard disk etc. Also, "program" as referred to herein means not just a program that is directly executable but also a program in source form, or a program that has been subjected to compression processing or an encrypted program etc. Also, the "navigation data" in the embodiment are included in the concept of "program".

While the novel features of the invention are set forth in a general fashion, both as to organization and content, along with other objects and features thereof from the following detailed description taken in conjunction with the drawings.

BRIEF DESCRIPTION OF THE DRAWINGS

FIG. 5 is a view showing the content of control data PMT 1;

FIG. 6 is a view showing that the content of control data PAT;

FIG. 7 is a view showing the content of control data NIT;

FIG. 25 is a view showing of the content of control data PMT 1;

FIG. 26 is a view showing the content of control data PAT;

FIG. 27 is a view showing the content of navigation data NVT 1;

FIG. 28 is a view showing content of navigation data NVT 2;

FIG. 39 is a view showing the content of a communication log recorded in memory 60;

FIG. 41 is a view showing the content of a conversion PMT;

FIG. 42 is a view showing the content of a conversion PAT;

FIG. 46 is a view showing the content of navigation data NVT 1;

FIG. 47 is a view showing the content of navigation data NVT 2;

FIG. 50 is a view showing another example of a script of a handler definition table;

FIG. 51 is a view showing the content of navigation data NVT 1;

FIG. 52 is a view showing the content of navigation data NVT 2; and

FIG. 53 is a view showing the overall layout of a reception/recording/reproduction device according to a sixth embodiment.

FIG. 54 is a view showing navigation data NVT 1 in HTML form in a seventh embodiment;

FIG. 55 is a view showing navigation data NVT 2 in HTML form in a seventh embodiment;

FIG. 59 is a block diagram of a reception/recording/reproduction device according to an eighth embodiment.

DESCRIPTION OF THE PREFERRED EMBODIMENTS

Figure 1:
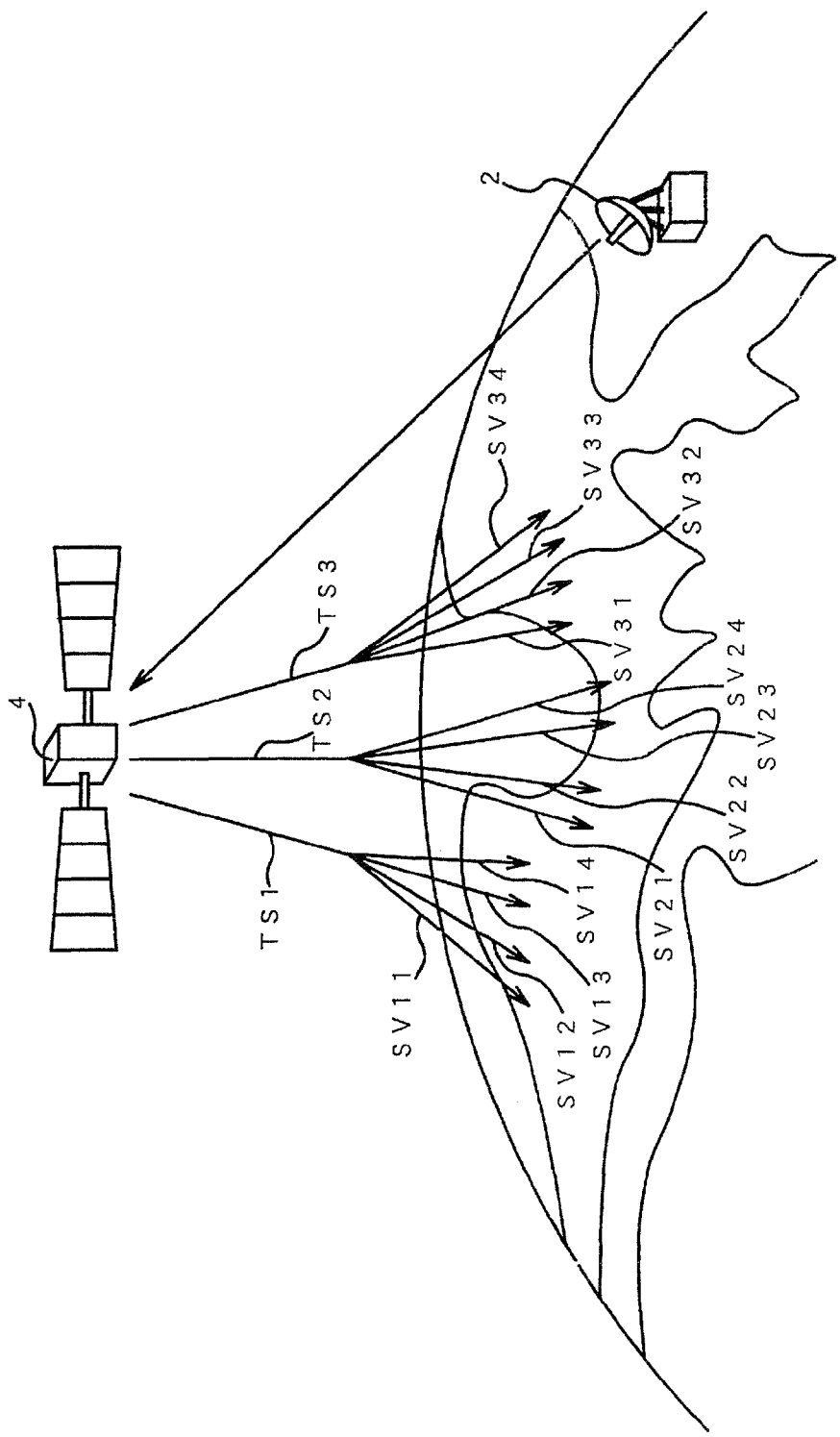
FIG. 1 is a view showing the transmission condition of electromagnetic waves in satellite broadcasting.

Contents
1. Outline of satellite broadcasting system
1.1. Electromagnetic wave transmission conditions in satellite broadcast
1.2. Construction of transmission device
1.3. Construction of transport stream
1.4. Construction of reception device
2. First embodiment
2.1. Reception/recording/reproduction device
2.1.1 Overall construction of reception/recording/reproduction device
2.1.2 Specific constructional example and operation of reception/recording/reproduction device
2.1.3 Other Embodiments
3. Second embodiment
3.1. Reception/recording/reproduction device
3.1.1 Overall construction of reception/recording/reproduction device
3.1.2 Specific constructional example and operation of reception/recording/reproduction device
3.1.3 Recording environment and reproduction environment
3.2. Other Embodiments
4. Third embodiment
4.1. Reception/recording/reproduction device
4.1.1 Overall construction of reception/recording/reproduction device
4.1.2 Specific constructional example and operation of reception/recording/reproduction device
4.1.3 Other reproduction environments etc.
4.2. Other Embodiments
5. Fourth embodiment
5.1. Outline of satellite broadcasting system having interactive capability
5.2. Reception/recording/reproduction device
5.2.1 Overall construction of reception/recording/reproduction device
5.2.2 Specific constructional example and operation of reception/recording/reproduction device
5.2.3 Other embodiments
6. Fifth embodiment
6.1. Transmission Device
6.2. Reception/recording/reproduction device
6.2.1 Overall construction of reception/recording/reproduction device
6.2.2 Specific constructional example and operation of reception/recording/reproduction device
6.2.3 Recording environment and reproduction environment
6.3. Other Embodiments
7. Sixth embodiment
7.1. Transmission Device
7.2. Reception/recording/reproduction device
7.2.1 Overall construction of reception/recording/reproduction device
7.2.2 specific constructional example and operation of reception/recording/reproduction device
7.2.3 Reproduction environment
8. Seventh embodiment
9. Ninth embodiment
10. Others A case where the present invention is applied to satellite broadcasting is described below. However, it could be applied to any system of broadcasting in which transmission is effected in the form of packets, such as groundwave broadcasts or wired broadcasts such as cable television. Before describing the embodiments of the present invention, first of all, an outline description of satellite broadcasting systems will be given.

1. Outline of Satellite Broadcasting Systems 1.1. Electromagnetic Wave Transmission Conditions in Satellite Broadcasting FIG. 1 shows diagrammatically the broadcast condition of electromagnetic waves in satellite broadcasting. Electromagnetic waves from a ground station 2 are transmitted towards the ground through satellite broadcast 4. A plurality of transport streams TS 1, TS 2, and TS 3 are transmitted from satellite broadcast 4. Each of these transport streams is distinguished by frequency or plane of polarization etc.

In transport stream TS 1a plurality of services (corresponding to the channels of groundwave broadcasting) SV 11, SV 12, SV 13, and SV 14 are packetized and multiplexed by time division. Likewise, in transport stream TS 2 services SV 21, SV 22, SV 23 and SV 24 are multiplexed and in transport stream TS 3 services SV 31, SV 32, SV 33 and SV 34 are multiplexed. In the transport stream, apart from the respective service screen data or voice data etc. there are also transmitted control data for indicating the program information, control data indicating the current time, and control data required by packetization etc. Although in FIG. 1 only three transport streams are shown, in fact, more transport streams would be transmitted. Furthermore, although in FIG. 1 four services are multiplexed on each transport stream, in fact more services would be multiplexed.

1.2. Construction of the Transmission Device

Figure 2:
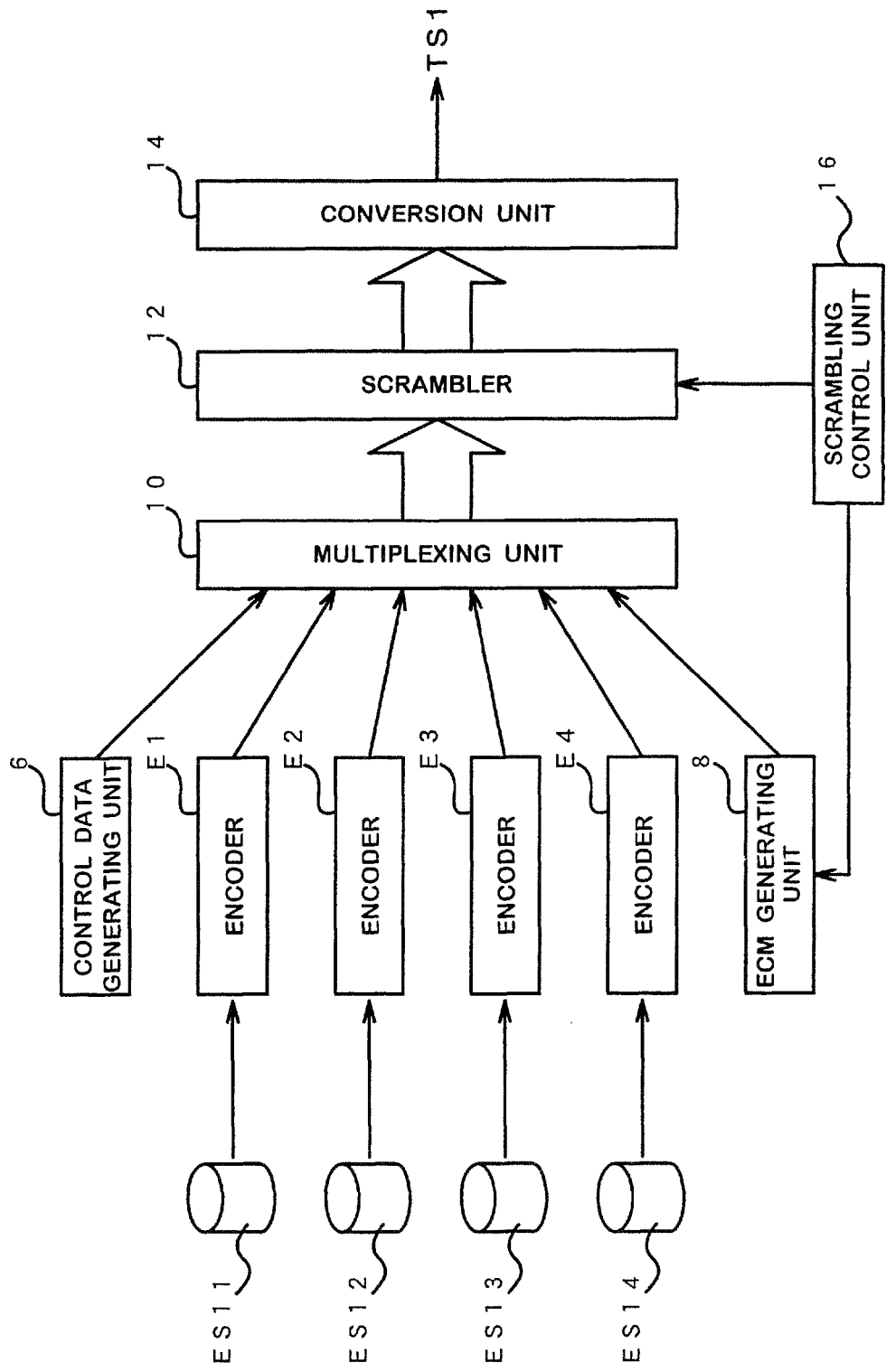
FIG. 2 is a view showing the layout of a transmission device in satellite broadcasting.

FIG. 2 shows the construction of a transmission device for generating and transmitting the above transport streams. Although this Figure shows only transport stream TS 1, the other transport streams TS 2 and TS 3 are also generated in the same way.

The image/voice data ES 11 of service SV 11 is compressed by encoder E 1 and supplied to multiplexing unit 10. Likewise, the image/voice data ES 12 of service SV 12 is compressed by encoder E 2 and supplied to multiplexing unit 10, the image/voice data ES 13 of service SV 13 is compressed by encoder E 3 and supplied to multiplexing unit 10, and the image/voice data ES 14 of service SV 14 is compressed by encoder E 4 and supplied to multiplexing unit 10.

Control data generating unit 16 generates control data for packet multiplexing, control data for indicating program information, and control data indicating the current time etc. The control data for packet multiplexing is provided to ensure correct identification of the image/voice data of the plurality of services which are packetized under time division.

Multiplexing unit 10 converts the control data, compressed image/voice data ES 11, ES 12, ES 13, and ES 14 into packets of fixed length under time division and outputs these as transport stream TS 1.

Scrambler 12 scrambles the output packets using a scrambling key supplied from scrambling key control unit 16. The scrambled transport stream TS 1 is demodulated in demodulating unit 14 and transmitted to the viewer through broadcasting satellite 4.

The scrambling key employed in scrambler 12 is encrypted in ECM generating unit 8 to produce ECM (entitlement control message) data. Specifically, ECM data is generated by further encrypting the key for decoding scrambling. Packets including this ECM data are created by multiplexing unit 54.

1.3. Construction of the Transport Stream

Figure 3:
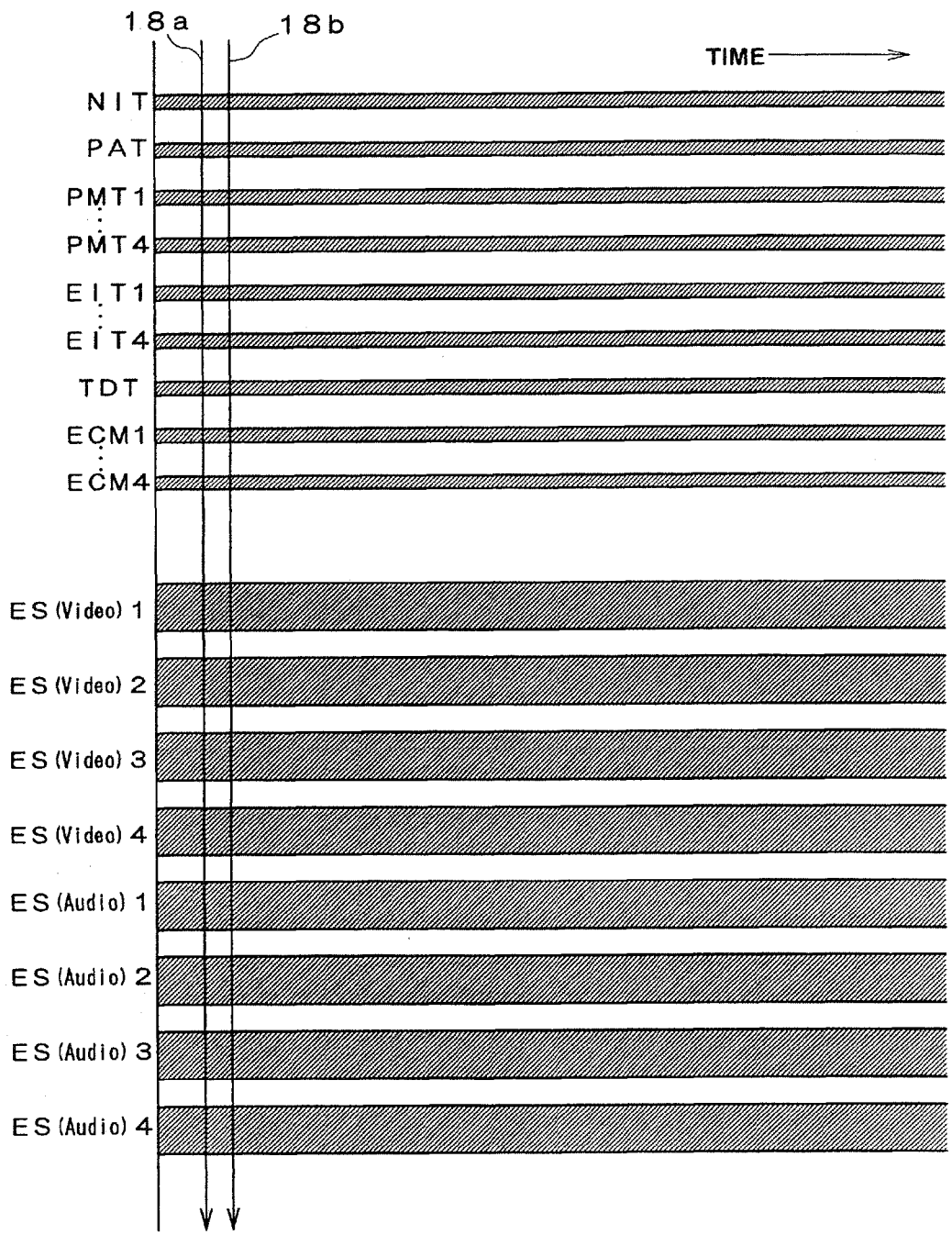
FIG. 3 is a view showing a transport stream that is transmitted in satellite broadcasting.

As shown in FIG. 3, in the transport stream TS 1 generated by the transmission device of FIG. 2, there are multiplexed video data ES (V) 1 and audio data ES (A) 1 of the service SV 11; video data ES (V) 2 and audio data ES (A) 2 of the service SV 12; video data ES (V) 3 and audio data ES (A) 3 of the service SV 13; and video data ES (V) 4 and audio data ES (A) 4 of the service SV 14.

Furthermore, control data NIT, PAT, PMT 1, PMT 2, PMT 3 and PMT 4 for packet multiplexing are also multiplexed. The multiplexed video/audio data of these services SV 11, SV 12, SV 13, and SV 14 can be separated by means of these control data.

Control data ECM 1, ECM 2, ECM 3, and ECM 4 for the scrambling key, control data EIT 1, EIT 2, EIT 3, and EIT 4 for indicating program information, and control data TDT for indicating the current time etc. are also multiplexed. Although not shown in the drawing, many other control data are also multiplexed.

Packetization is performed as shown by the vertical line 18 of FIG. 3. Specifically, packetization is performed in the order: control data NIT, PAT, PMT, EIT, TDT, ECM, video data ES (V), and audio data ES (A). When the packetization as far as audio data ES (A) 3 has been completed, packetization of control data NIT and of the subsequent items is again repeated (see vertical line 18*b*).

Figure 4:
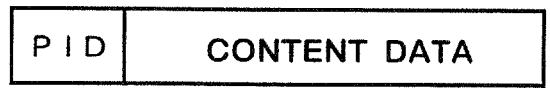
FIG. 4 is a view showing the layout of packetized data.

FIG. 4 shows the basic construction of the packetized data. The control data and video/audio data are also converted into the form of packets having a data construction as shown in FIG. 4. A packet ID (PID) is attached to the head of the packetized data. The packet ID is a code that is uniquely affixed to each packet to identify each packet. The content data is the packetized subject data (control data, video/audio data etc.).

FIG. 5 shows the data content of control data PMT 1 for packet multiplexing. In PMT 1 there are given video data ES (V) 1 of service SV 11, the packet ID of audio data ES (A) 1, and the packet ID of ECM 1 for descrambling these. In PMT 2, PMT 3, and PMT 4 there are likewise given packet IDs relating to respective services SV 12, SV 13 and SV 14.

As shown in FIG. 6, in the PAT there are likewise given a packet ID of PMT 1 corresponding to service SV 11, a packet ID of PMT 2 corresponding to service SV 12, a packet ID of PMT 3 corresponding to service SV 13, and a packet ID of PMT 4 corresponding to service SV 14.

As shown in FIG. 7, NIT describes for all the transport streams TS 1, TS 2, TS 3 a list of the transmission parameters such as frequency and plane of polarization and the services which are multiplexed in the corresponding transport stream. It is thereby possible to identify the frequency of the transport stream onto which a specific service is multiplexed.

1.4. Construction of the Receiving Device

Figure 8:
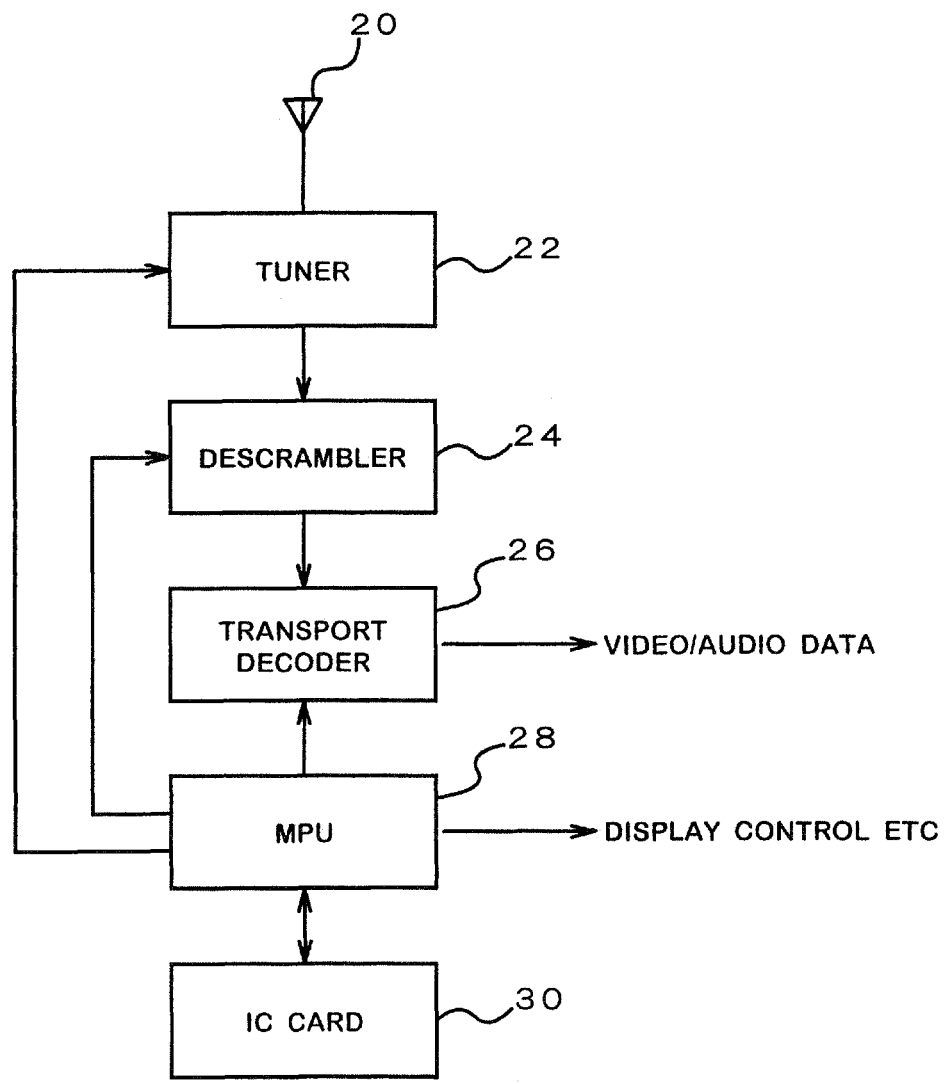
FIG. 8 is a view showing a typical layout of a reception device.

FIG. 8 shows an outline of a receiving device. A transport stream is selected by tuner 22 and the scrambling is descrambled by scrambler 24, and video/audio data ES relating to a desired service are separated by transport decoder 26. Microprocessor (MPU) 28 sends the ECM which it acquires to IC card 30 and receives the scrambling key which is restored by IC card 30. MPU 28 then sets this scrambling key in descrambler 24. The video/audio data ES can thereby be descrambled.

MPU 28 sets the packet ID of the video/audio data ES of the desired service in transport decoder 26. Transport decoder 26 thereby outputs the video/audio data ES of the service in question. Also, when the packet ID of the control data is set in transport decoder 26, the control data which is thereby separated is supplied to MPU 28.

Assuming that a service SV 33 of transport stream TS 3 is currently being received, the operation when an instruction to change over to a service SV 12 of transport stream TS 1 is supplied to MPU 28 will be described below. First of all, MPU 28 gets the NIT by controlling the transport decoder (i.e. by setting the packet ID of the control data NIT). It thereby ascertains that this NIT states that the service SV 12 which it is desired to receive is multiplexed on transport stream TS 1 (see FIG. 7).

Next, it controls tuner 8 so as to receive transport stream TS 1. Further, by controlling transport decoder 26, it acquires the PAT and PMT 2 and is thereby able to obtain the packet ID of the video data ES (V) 2 and audio data ES (A) 2 of the desired service SV 12, and to obtain the packet ID of their ECM.

Next, the video data ES (V) 2 and audio data ES (A) 2 of the desired service SV 12 are output from transport decoder 26 by setting these packet IDs in transport decoder 26. In parallel with this, MPU 28 acquires the scrambling key by sending the ECM obtained from transport decoder 26 to IC card 30 and sets this in descrambler 24. Descrambled video data ES (V) 2 and audio data ES (A) 2 can thereby be obtained. Changeover of the received service is performed as described above.

Also, when an instruction for program booking or to display program information is supplied to MPU 28, MPU 28 acquires an EIT by controlling transport decoder 26. It then effects control such as to display the program information by using the EIT which it has acquired.

Figure 9:
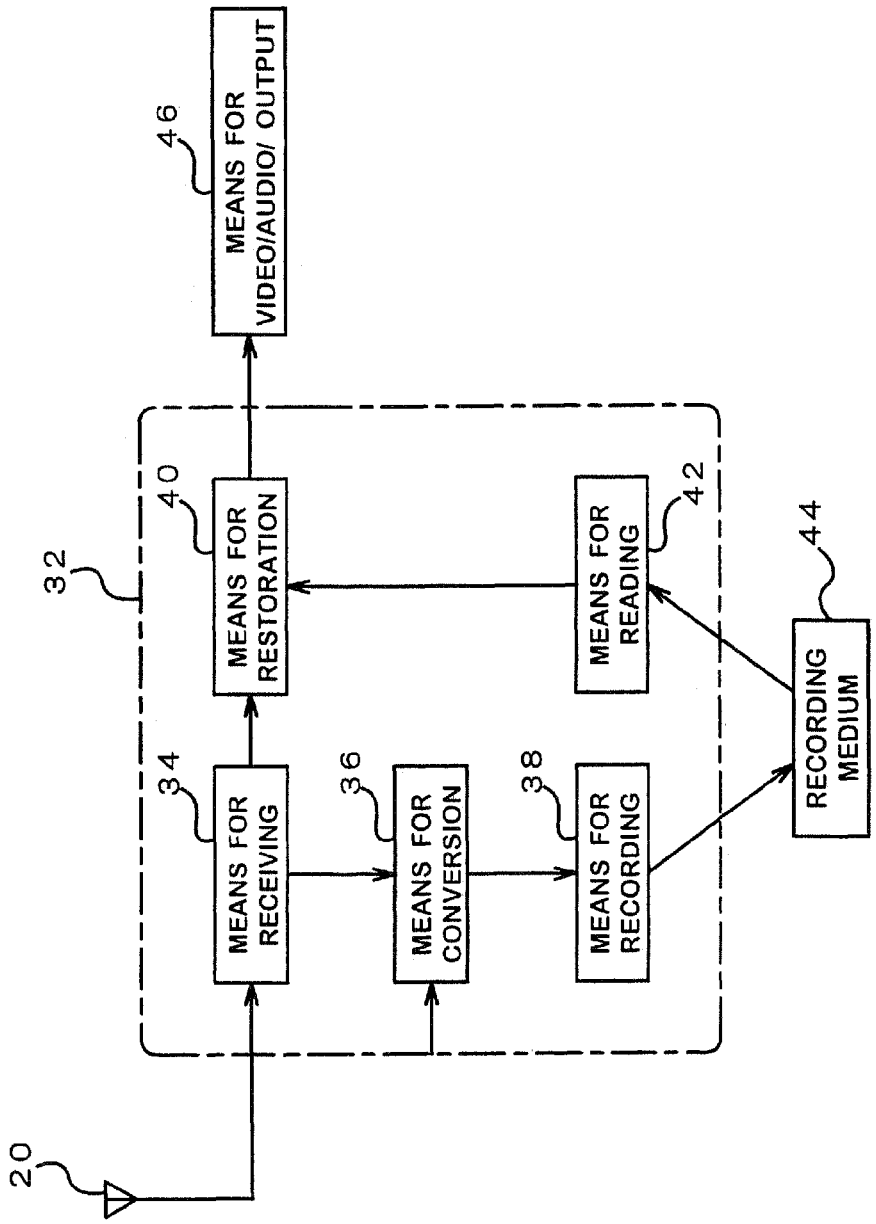
FIG. 9 is a view showing the overall layout of a reception/recording/reproduction device according to a first embodiment.

2. First Embodiment 2.1. Reception/Recording/Reproduction Device 2.1.1 Overall Construction of the Reception/Recording/Reproduction Device FIG. 9 shows the overall construction of a reception/recording/reproduction device 32 according to an embodiment of the present invention. The electromagnetic wave captured by antenna 20 is demodulated as a single transport stream by reception means 34. In reception mode, the transport stream from reception means 34 is supplied to restoration means 40. Restoration means 40 selects packets relating to the desired service from this transport stream and restores and outputs the service content signal (for example, a composite signal in the case of NTSC) in accordance with the content of the packet in question. Video/image output means 46 receives this service content signal and outputs video/images.

In recording mode, the transport stream from reception means 34 is supplied to conversion means 36. Conversion means 36 converts this transport stream to a packet multiplexed stream in a condition suitable for recording and outputs this as a converted stream. Conversion means 36 generates a converted stream by selecting packets relating to the desired service from the transport stream and, of these packets, selecting the packets that are needed on reproduction. Recording means 38 records this converted stream on a recording medium 44.

In reproduction mode, the converted stream is read from recording medium 44 by reading means 42. This converted stream that is thus read is supplied to restoration means 40.

Restoration means 40, in accordance with the content of this converted stream, restores and outputs the service content signal (for example a composite signal in the case of NTSC). Video/image output means 46 receives this service content signal and outputs video/images.

In this embodiment, instead of recording the service content signal from restoration means 40, as in the prior art device, recording is effected directly in packet condition. Consequently, since the recording includes the control data, recording/reproduction can be performed using the control data without impairing the function of the satellite broadcast. Also, since recording can be achieved in a condition with both video and audio digitally compressed, the capacity of the recording medium can be utilized in an effective manner.

Furthermore, since only packets relating to the desired service are selected from the transport stream and recorded, the capacity required for recording can be reduced. Furthermore, the capacity required for recording can be reduced since the packets required on reproduction are selected from the former packets and recorded.

Figure 10:
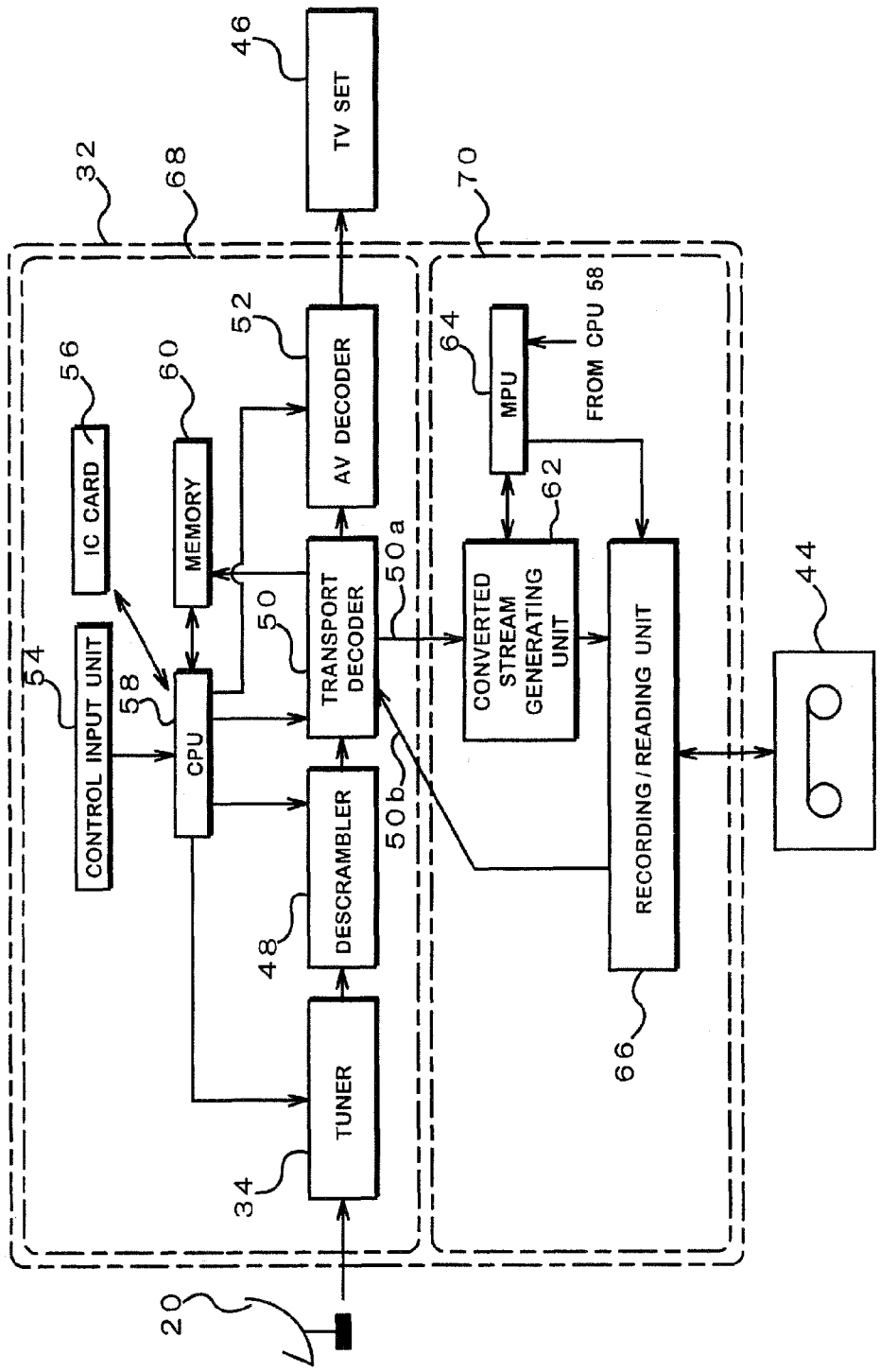
FIG. 10 is a block diagram of the case where the reception recording device of FIG. 9 is implemented using a CPU.

2.1.2 Specific Constructional Example and Operation of Reception/Recording/Reproduction Device FIG. 10 shows a block diagram of the case where the reception/recording/reproduction device 32 of FIG. 9 is implemented using a CPU. This reception/recording/reproduction device 320 comprises a reception unit 68 and recording/reproduction unit 70. CPU 58 exercises control over all units by means of a program stored in memory 60.

This device has three modes: reception mode, recording mode and reproduction mode. The operation of these respective modes is described below.

(1) Reception Mode

Figure 11:
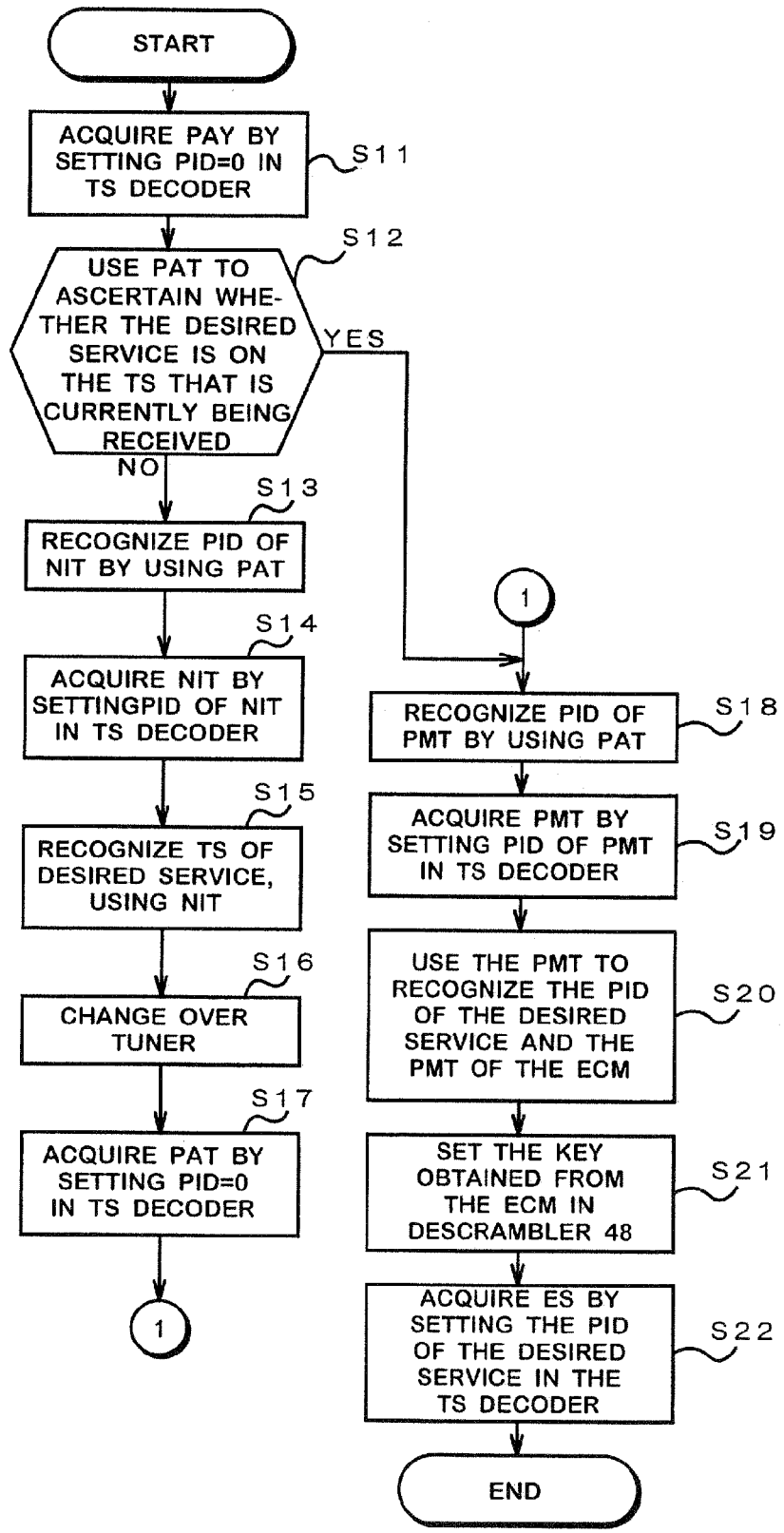
FIG. 11 is a flow chart of a program in reception mode.

The program for the reception mode, which is recorded in memory 60, is indicated by a flow chart in FIG. 11.

Assuming that service SV 13 of the transport stream TS 1 is currently being received, the operation which is performed when an instruction to change over to service SV 11 of transport stream TS 1 is supplied to CPU 58 is described below. The instruction to CPU 58 is supplied from a control panel or remote controller. Control input unit 54 shown in FIG. 10 is a photodetector unit that receives instructions from this control panel or remote controller.

First of all, CPU 58 sets the packet ID of the PAT in a register (not shown) for separation of control data of transport decoder (TS decoder) 50. The packet ID of the PAT is determined in fixed manner as "0x00". TS decoder 50 thereby records (step S 11) in memory 60 the content of the PAT which is thus separated. This PAT contains a table of the services that are multiplexed on the transport stream TS 1 that is currently being received (see FIG. 6). It is therefore possible for CPU 58 to ascertain that the desired service SV 11 is multiplexed on the transport stream TS 1 that is currently being received. That is, the processing of CPU 58 advances from step S 12 to S 18.

In step S 18, using the acquired PAT, the packet ID of the PMT of the desired service SV 11 is acquired. In this case, "0x11" is acquired (see FIG. 6). Next, CPU 58 sets the packet ID "0x11" of the PMT in the register of TS decoder 50 that is used for separating the control data. PMT 1 of service SV 11 can thereby be separated and its content extracted into memory 60 (step S 19).

FIG. 5 shows the PMT 1 of service SV 11. Using this PMT 1, CPU 58 can ascertain the packet ID "0x21" of the ECM data for obtaining the scrambling key of the video and audio data. It can likewise ascertain the packet IDs "0x22" and "0x24" of the video and audio data ES(V) 1 and ES(A) 1 (step S 20).

CPU 58 extracts the ECM by setting the packet ID "0x21" of the ECM in the register of TS decoder 50 that is used for control data separation. Furthermore, it supplies this ECM to IC card 56, and acquires the restored scrambling key. The scrambling key which is thus acquired is set in descrambler 48 (step S 21). The packets of the video data ES (V) 1 and audio data ES (A) 1 of service SV 11 are thereby put into descrambled condition. Also, CPU 58 sets the packet IDs "0x22" and "0x24" of the video data ES (V) 1 and audio data ES (A) 1 in the register of TS decoder 50 for ES separation (not shown) (step S 22). As a result, TS decoder 50 outputs the separated video data ES (V) 1 and audio data ES (A) 1 to AV decoder 52.

When the AV decoder receives this, it expands (removes) the compression and performs D/A conversion to generate a video composite signal. This signal is supplied to TV set 46, whence it is output as video and audio.

Processing in the reception mode is performed as described above. If, in step S 12, it is found that the desired service is not multiplexed in the transport stream that is currently being received, processing advances to step S 13. In step S 13, the packet ID of the NIT that is given in the PAT is acquired. This is used to acquire the NIT, from which it is ascertained in which transport stream the desired service is multiplexed (steps S 14, S 15).

CPU 58 changes over the setting of tuner 34 such that the transport stream in question is received (step S 16). After this, it acquires the PAT of the transport stream in question (step S 17). Subsequently, step S 18 and the steps subsequent thereto may be executed.

(2) Recording Mode

Figure 12:
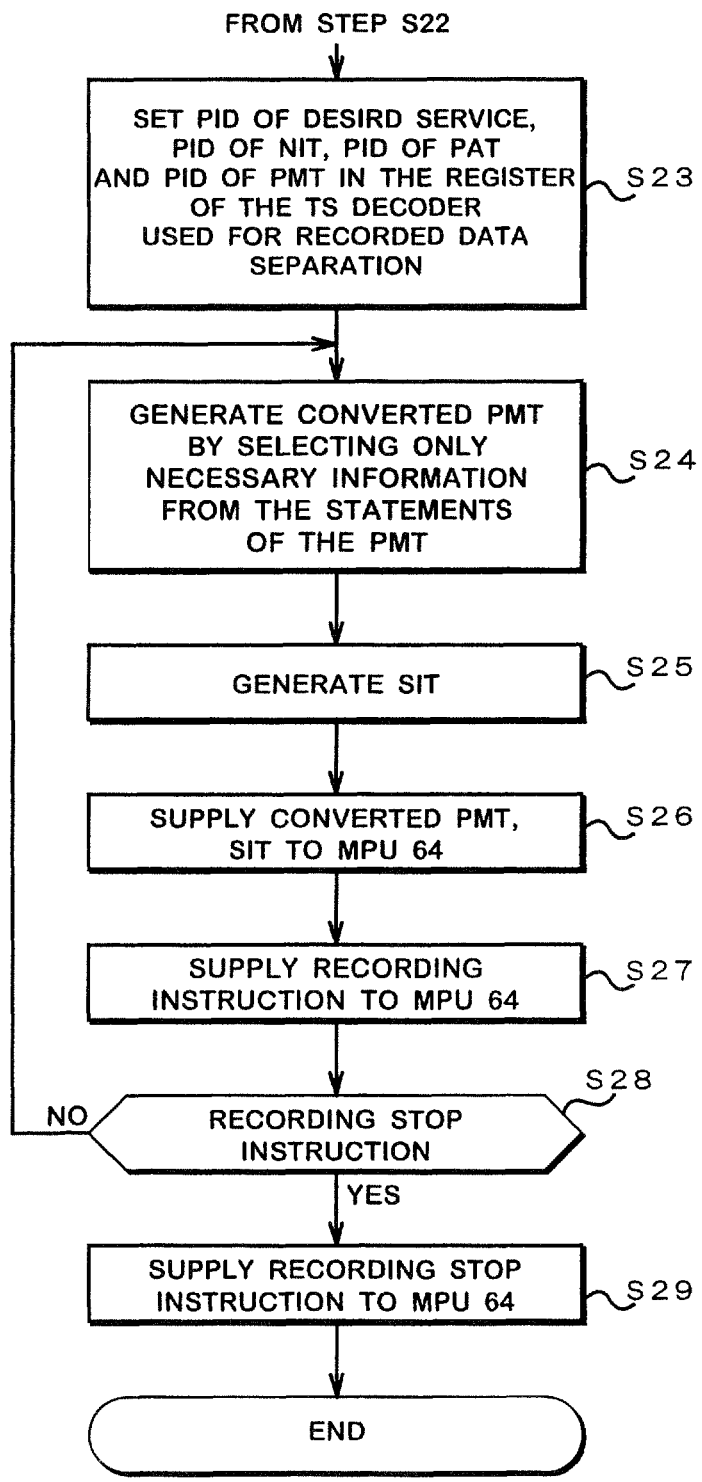
FIG. 12 is a flow chart of a program in recording mode.

FIG. 12 shows in the form of a flow chart the program of the recording mode which is recorded in memory 60. Steps S 11 to S 22 are the same as in the reception mode. Consequently, in FIG. 12, only step S 23 and the subsequent steps are shown. Recording mode is produced when a "record" instruction is supplied from control input unit 54.

First of all, in step S 23, CPU 58 sets in the register (not shown) of the TS decoder which is used for separation of recording data the packet ID of the video and audio data ES (V) 1 and ES (A) 1 of the desired service SV 11, the packet ID of the NIT, the packet ID of the PAT, and the packet ID of the PMT 1 of the desired service SV 11. TS decoder 50 is thereby able to output to converted stream generating unit 6-20 of recording/reproduction unit 70, still in packet condition, the video and audio data ES (V) 1 and ES (A) 1, PAT, PMT 1 and NIT.

CPU 58 acquires the PMT 1 that is recorded in memory 60 and generates a converted PMT 1 (step S 24) by selecting, of the information stated therein, only information relating to the desired service SV 11. For example, of the information contained in PMT 1, the packet ID of the ECM is not required on reproduction and so is removed. A converted PMT 1 is thereby obtained from which, of the information contained in PMT 1, information that is not related to recording/reproduction of the desired service SV 11 has been removed.

Next, CPU 58 generates control data SIT (step S 25) that gives information concerning the services and events (programs) contained in the recorded converted stream.

CPU 58 supplies to MPU 64 the converted PMT 1 and SIT generated as described above. MPU 64 supplies this to converted stream generating unit 62, which generates a converted stream.

Converted stream generating unit 62 receives the PAT from TS decoder 50 and thereby generates a converted PAT containing only information relating to the desired service SV 11, and replaces the PAT by this converted PAT. At this point, the packet ID of the NIT which is included in the PAT is changed to the packet ID of the SIT. Also, the PMT from TS decoder 50 is replaced by the converted PMT received from MPU 64. Furthermore, the NIT from TS decoder 50 is replaced by the SIT received from MPU 64. A converted stream in which are multiplexed the packets of the desired service ES, the SIT, converted PAT, and converted PMT is thereby obtained.

Figure 13:
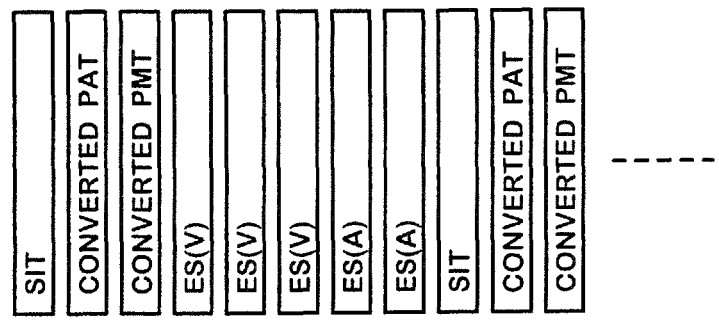
FIG. 13 is a view showing a converted stream recorded on a recording medium.

CPU 58 supplies a recording instruction to MPU 64 (step S 27). On receiving this, MPU 64 exercises control over recording/read unit 66 such that the converted stream is recorded onto magnetic tape 44. FIG. 13 shows diagrammatically the converted stream that is recorded.

When a recording stop instruction is supplied from control input unit 54, CPU 58 supplies this to MPU 64 (steps S 28, S 29). On receiving this, MPU 64 stops the recording that is being performed by recording/read unit 66.

It should be noted that, in the converted stream recorded on magnetic tape 44, control data is recorded however many times the packets are multiplexed, even though the content of the control data is the same. Reproduction can therefore be commenced at any point along the magnetic tape.

Figure 14:
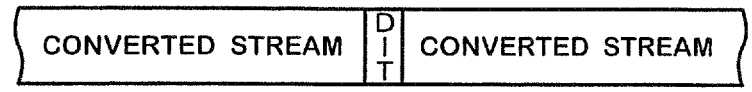
FIG. 14 is a view showing the condition in which control data DIT is inserted.

Also, if the service selection is changed during recording, the newly selected service will be recorded from the changeover. When this happens, converted stream generating unit 62 itself detects the discontinuity of information, and, in response thereto (or in response to an instruction from CPU 58), generates a control data DIT (Discontinuity Information Table) indicating the point of discontinuity of information. Furthermore, as shown in FIG. 14, this DIT is packet-multiplexed at the head of the changed service. Likewise, if new recording is performed, this DIT is attached to its head. A DIT is also attached if different programs in the same service are recorded continuously.

Although in the above description the converted stream generating unit 62 was provided in recording/reproduction device 70, it could be provided in reception device 68. If this is done, recording/reproduction device 70 records the converted stream that is output from reception device 68 directly.

(3) Reproduction Mode

Figure 15:
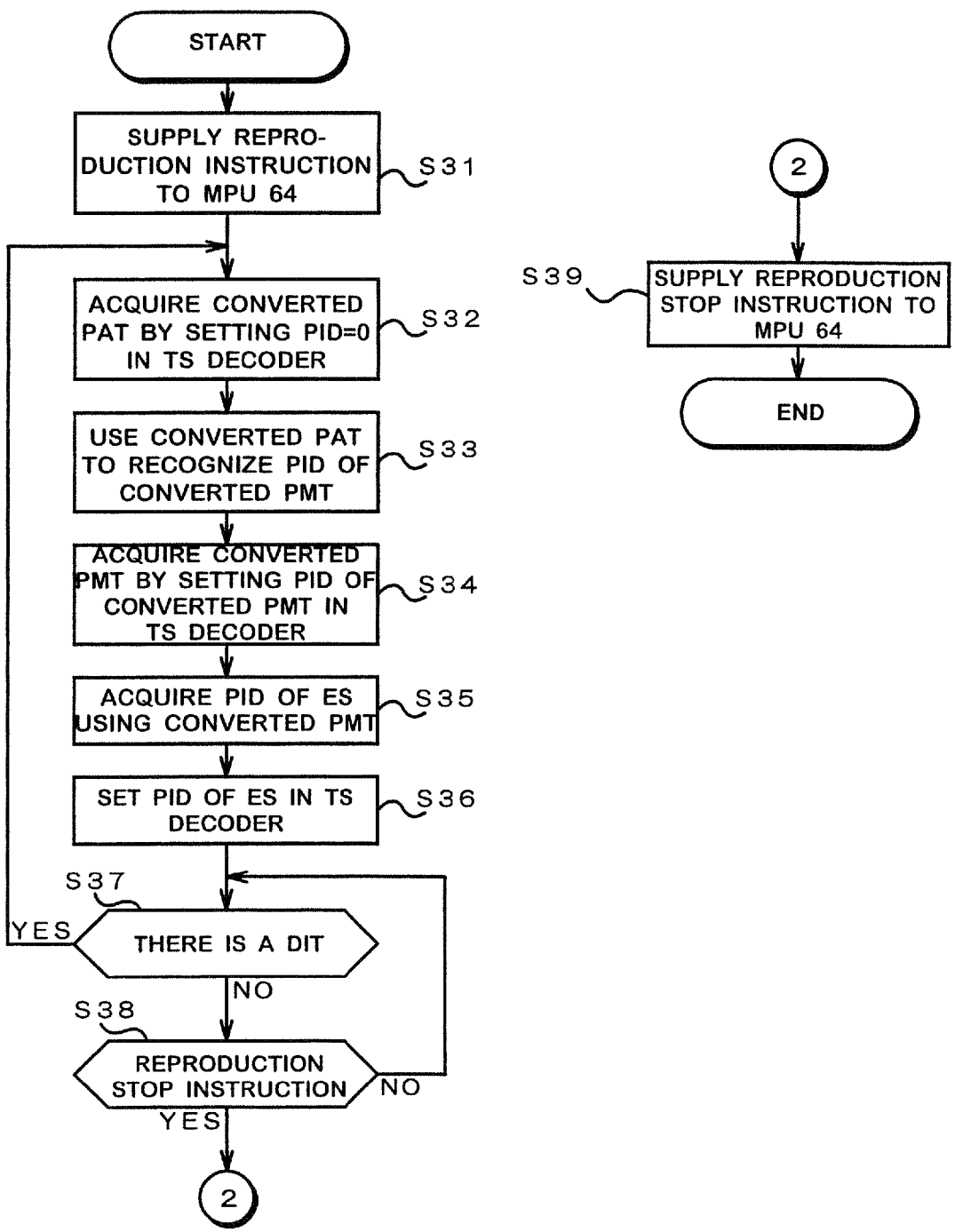
FIG. 15 is a flow chart of a program in reproduction mode.

FIG. 15 shows in the form of a flow chart the program of the reproduction mode that is recorded in memory 60. Reproduction mode is produced on receipt of a reproduction instruction from control input unit 54.

First of all, in step S 31, CPU 58 supplies a reproduction instruction to MPU 64. On receiving this, MPU 64 controls the recording/read unit 66 such that the converted stream is read from magnetic tape 44. This converted stream that has thus been read is supplied to TS decoder 50.

Next, it sets the packet ID "0x00" of the converted PAT in the register of TS decoder 50 provided for separation of control data; the converted PAT in the converted stream is thereby separated and stored in memory 60 (step S 32). The packet ID of the converted PMT is recognized from the description thereof given in this converted PAT (step S 33).

Further, the packet ID of the converted PMT is set in the register of TS decoder 50 provided for separation of control data, and the converted PMT is thereby separated from the converted stream and stored in memory 60 (step S 34). The packet ID of the video data ES (V) and audio data ES (A) is recognized from the description in this converted PMT (step S 35).

Next, CPU 58 sets the packet ID of the video data ES (V) and audio data ES (A) in the register of TS 50 for ES separation, and thereby separates these from the converted stream. The converted video data ES (V) and audio data ES (A) are output to AV decoder 52.

Once the AV decoder has received these, it expands (removes) the compression and performs D/A conversion to generate a video composite signal. This signal is supplied to TV set 46, whence it is output as video and audio.

If, during reproduction, the presence of a DIT is discovered in the converted stream, CPU 58 returns to step S 32 and executes the processing subsequent to the converted PAT (step S 37). This is because the DIT indicates a point of discontinuity in the recorded data.

If there is a reproduction stop instruction from control input unit 54, CPU 58 supplies this to MPU 64 (steps S 38, S 39). On receiving this, MPU 64 controls the recording/read unit 66 to stop reading from magnetic tape 44.

2.1.3 Other Embodiments

In the embodiment of FIG. 10, conversion means 36 is implemented by TS decoder 50, converted stream generating unit 62 and CPU 58 (in particular, steps S 24 and S 25). Also, restoration means 40 is implemented by TS decoder 50 and CPU 58 (in particular, steps S 32 to S 36). In this way, the construction can be simplified, since TS decoder 50 is common to both the conversion means and restoration means.

In the embodiment of FIG. 10, CPU 58 executes part of the converted stream generation (steps S 24, S 25), but this processing could also be performed by converted stream generating section 62. Further, in TS decoder 50, only selected packets are supplied to converted stream generating unit 62, but it would be possible to supply the transport stream from descrambler 48 directly to converted stream generating unit 62. In this case, converted stream generating unit 62 performs the selection of the necessary packets.

Furthermore, it should be noted that although in FIG. 10 it was shown as a reception/recording/reproduction device 32, it would be possible for the reception device to be constituted simply by a reception unit 68. In this case, there may be provided a recording data output terminal for extracting the output 50*a* of the TS decoder and a restoration data input terminal for receiving the converted stream 50*b* from recording/reproduction unit 70.

Also, the recording/reproduction device may be constituted solely by recording/reproduction unit 70. Further, it may be constituted by a reproduction device constituted solely by the reproduction function of recording/reproduction unit 70 and a recording device constituted solely by the recording function of recording/reproduction unit 70.

Also, although, in the above embodiment, the data was recorded in descrambled form, it would also be possible to record the data in scrambled form. In this case, it could be recorded together with the ECM data. In this case, the ECM data could be recorded directly, or could be recorded as part of the EIT data.

Figure 16:
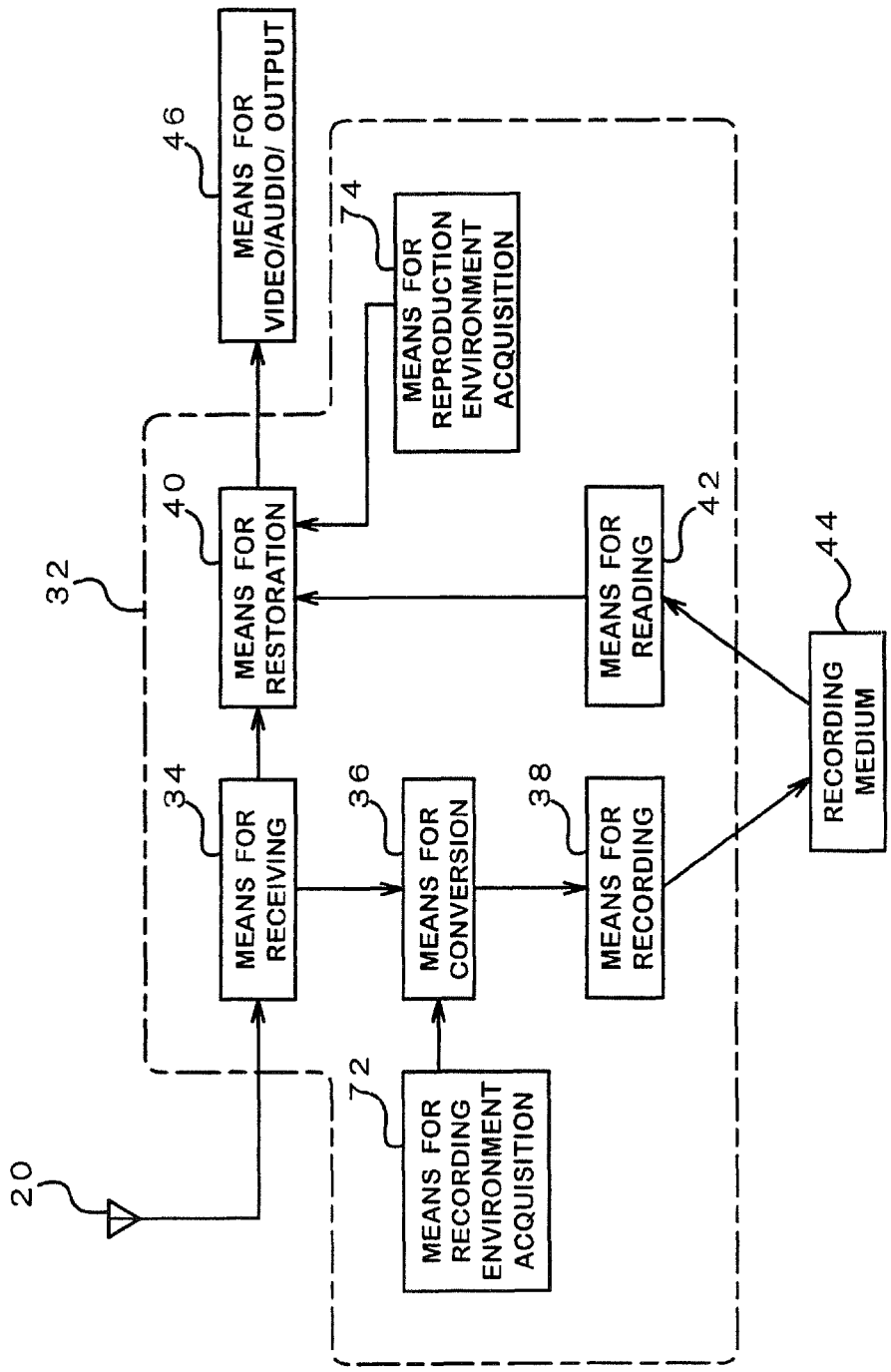
FIG. 16 is a view showing the overall layout of a reception/recording/reproduction device according to a second embodiment.

3. Second Embodiment 3.1. Reception/Recording/Reproduction Device 3.1.1 Overall Construction of the Reception/Recording/Reproduction Device FIG. 16 shows the overall construction of a reception/recording/reproduction device according to a second embodiment. In this embodiment, there is provided a recording environment acquisition means 72 that acquires the environment when the converted stream is created (i.e. the environment when recording); conversion means 36 generates a converted stream including this recording environment. Consequently, a converted stream including the recording environment is recorded on recording medium 44.

Reproduction environment acquisition means 74 acquires the environment on reproduction. Restoration means 40 compares the reproduction environment from reproduction environment acquisition means 74 and the recording environment which is read from the recording medium and alters the content of reproduction control in accordance with differences of the two environments.

Reproduction can therefore be performed in an appropriate manner in accordance with differences of the recording environment and reproduction environment.

3.1.2 Specific Constructional Example and Operation of the Reception/Recording/Reproduction Device The block diagram of FIG. 16 showing the case where reception/recording/reproduction device 32 is implemented using a CPU is similar to FIG. 10.

This device has three modes: reception mode, recording mode, and reproduction mode. Reception mode is the same as in the case of the first embodiment, so only the operation of the recording mode and reproduction mode will be described.

(1) Recording Mode

Figure 17:
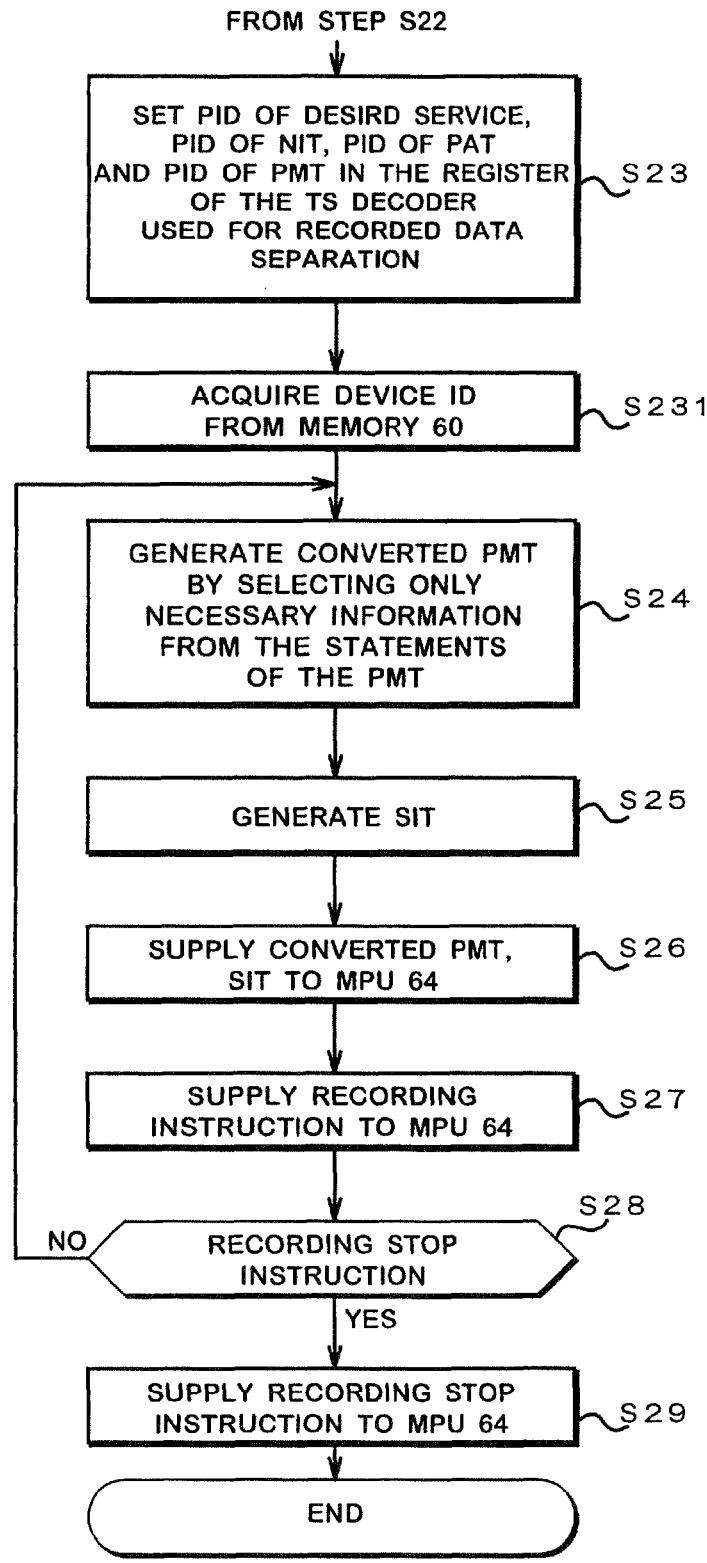
FIG. 17 is a flow chart of a program in recording mode.

The program of the recording mode, which is recorded in memory 60, is shown by a flow chart in FIG. 17. The basic processing is the same as in the case of FIG. 12. In step S 231, CPU 58 acquires the ID of its own device, which is recorded in memory 60. Furthermore, when the SIT is generated, CPU 58 includes this device ID in the description of the SIT (for example, in the descriptor region) (step S 25). The device ID constituting the recording environment is therefore included in the converted stream that is recorded on magnetic tape 44.

(2) Reproduction Mode

Figure 18:
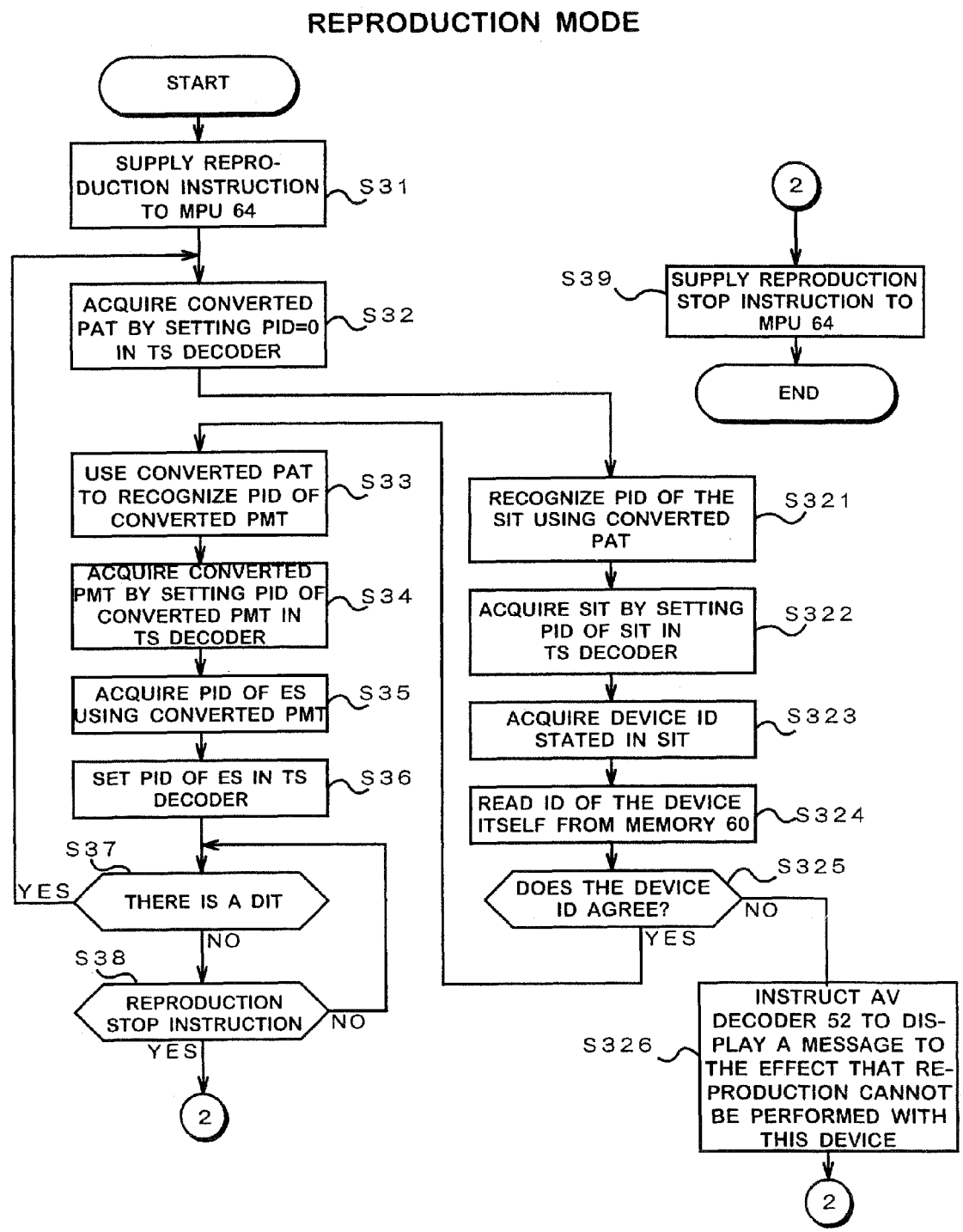
FIG. 18 is a flow chart of a program in reproduction mode.

FIG. 18 shows in the form of a flow chart the reproduction mode program that is recorded in memory 60. The basic processing is the same as in the case of FIG. 15. In step S 321, CPU 58 acquires the packet ID of the SIT, using the converted PAT. It sets this in the register of TS decoder 50 used for separation of control data and thereby acquires the SIT (step S 322). Next, CPU 58 acquires the device ID, which is given in the acquired SIT (step S 323). Also, it reads its own device ID, which is recorded in memory 60 (step S 324).

Further, it ascertains whether or not these device IDs coincide (step S 325). If they do coincide (i.e. if the device that performed recording onto magnetic tape 44 and the device that is reproducing this are the same), reproduction is performed by executing step S 33 and subsequent steps. If they do not coincide (i.e. if the device that performed recording onto magnetic tape 44 and the device that is reproducing this are different), a message to that effect is displayed (step S 326), and reproduction is terminated.

With this embodiment, tapes obtained by recording charged broadcasts such as pay-per-view can be prevented from being reproduced by devices other than the subscriber's device.

It should be noted that, although in this embodiment it was arranged that if the IDs did not coincide reproduction would not be performed, it would be possible to arrange for reproduction to be performed with altered content.

3.1.3 Recording Environment and Reproduction Environment

In the above embodiment, the device ID was employed as "recording and reproduction environment". However, the ID of an IC card could be employed. Furthermore, it could be arranged to record the type of device as "recording environment" and to compare this with the type of device employed on reproduction and then to perform reproduction with the recording data format etc. converted in accordance with this difference.

It should be noted that, in the above embodiment, the device employed for recording and the device employed for reproduction were taken as the recording environment and reproduction environment. However, the recording time and reproduction time could be taken as the recording environment and reproduction environment. Also, the recording place and reproduction place could be taken as the recording environment and reproduction environment.

Also, although, in the above embodiment, it was arranged to describe the recording environment in the SIT, it would be possible to describe this in the converted PAT or converted PMT etc.

3.2. Other Embodiments

In the above embodiment, the transport stream that is sent from the transmission device is the same as in the case of the first embodiment. However, it could be arranged for data indicating the degree of mismatch between the recording environment and reproduction environment and the content of action to be taken in order from cope with this to be included in the transport stream transmitted from the transmission device; in this way, the content of action to be taken by the recording/reproduction device at the receiving end can be altered in accordance with the mismatch of recording environment and reproduction environment.

Figure 19:
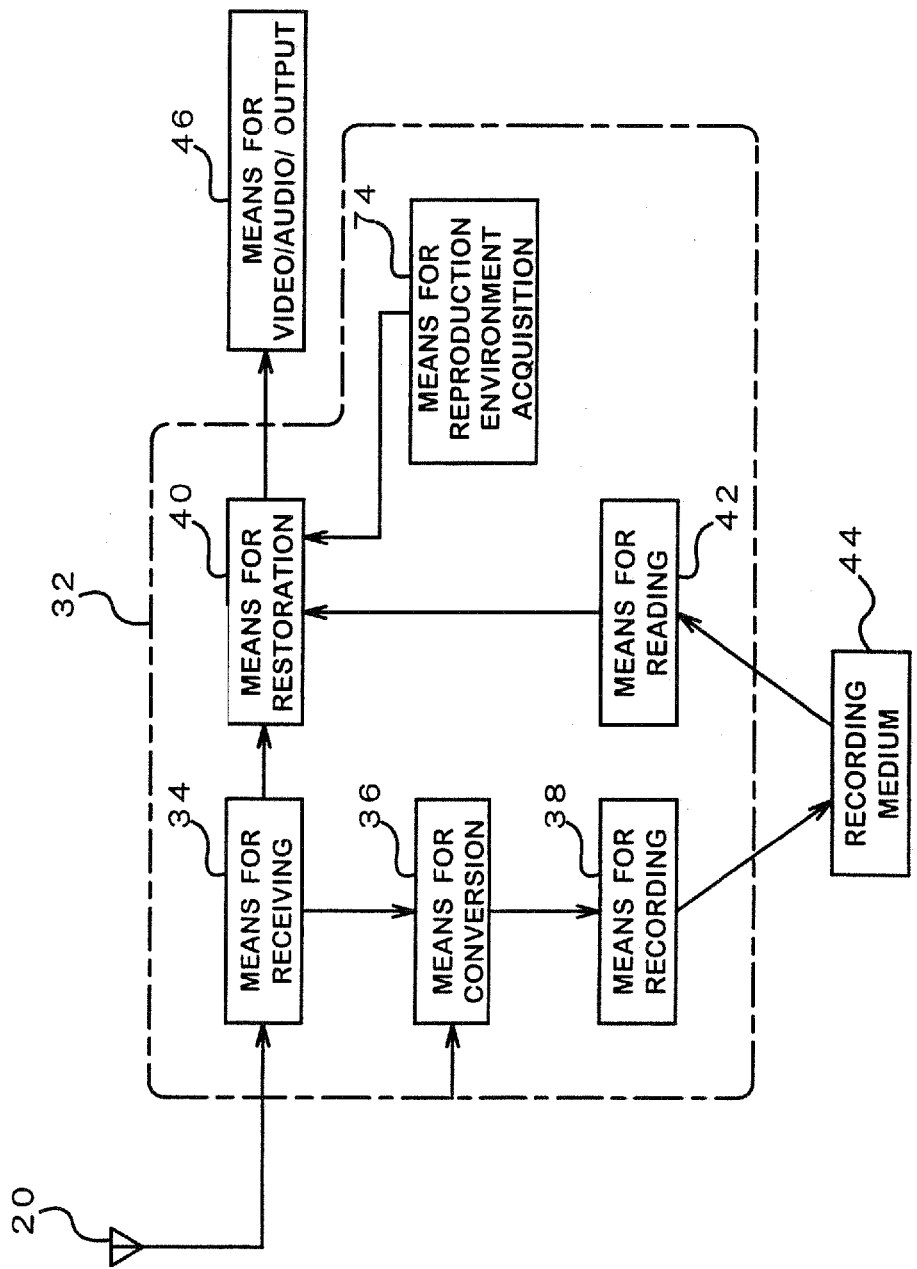
FIG. 19 is a view showing the overall layout of a reception/recording/reproduction device according to a third embodiment.

4. Third Embodiment 4.1. Reception/Recording/Reproduction Device 4.1.1 Overall Construction of the Reception/Recording/Reproduction Device FIG. 19 shows the overall construction of a reception/recording/reproduction device according to a third embodiment. In this embodiment, there is provided a reproduction environment acquisition means 74 that acquires the environment on reproduction. In reproduction mode, restoration means 40 outputs suitable reproduction content in accordance with the environment, taking into account this reproduction environment from the reproduction environment acquisition means 74.

4.1.2 Specific Constructional Example and Operation of Reception/Recording/Reproduction Device The block diagram of FIG. 19 illustrates the case where reception/recording/reproduction device 32 is implemented using a CPU, and is similar to FIG. 10.

This device has three modes: reception mode, recording mode and reproduction mode. Hereinbelow, reception mode, recording mode and reproduction mode will be described, together with their operation.

(1) Reception Mode

Figure 20:
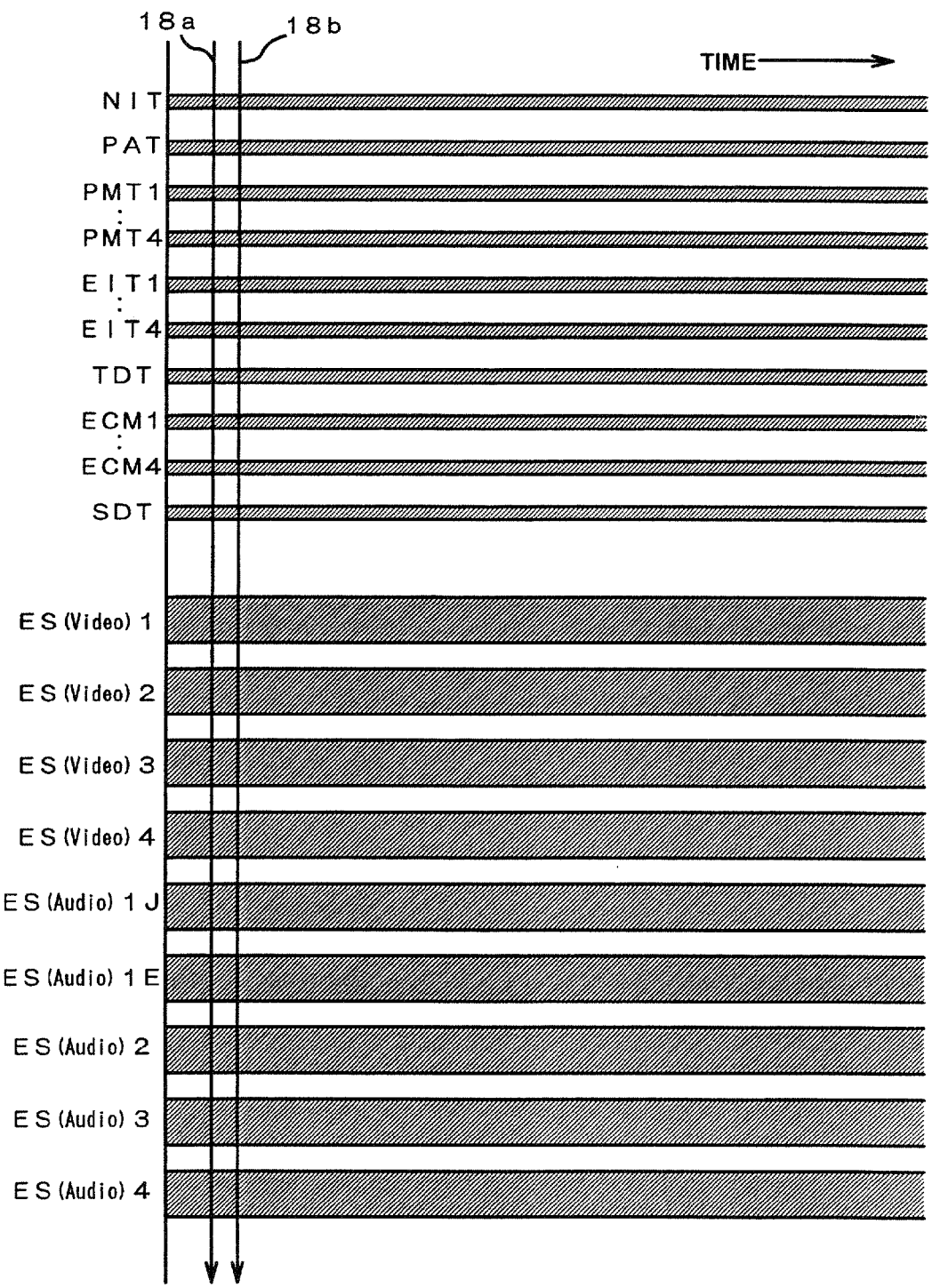
FIG. 20 is a view showing a transport stream of a bilingual broadcast.

This embodiment will be described taking as example the case of reception of a bilingual broadcast (for example English and Japanese). In the case of a bilingual broadcast, as shown in FIG. 20, as the audio data, two streams: ES (A) 1 J and ES (A) 1 E are multiplexed. ES (A) 1 J is Japanese-language audio and ES (A) 1 E is English-language audio.

Figure 21:
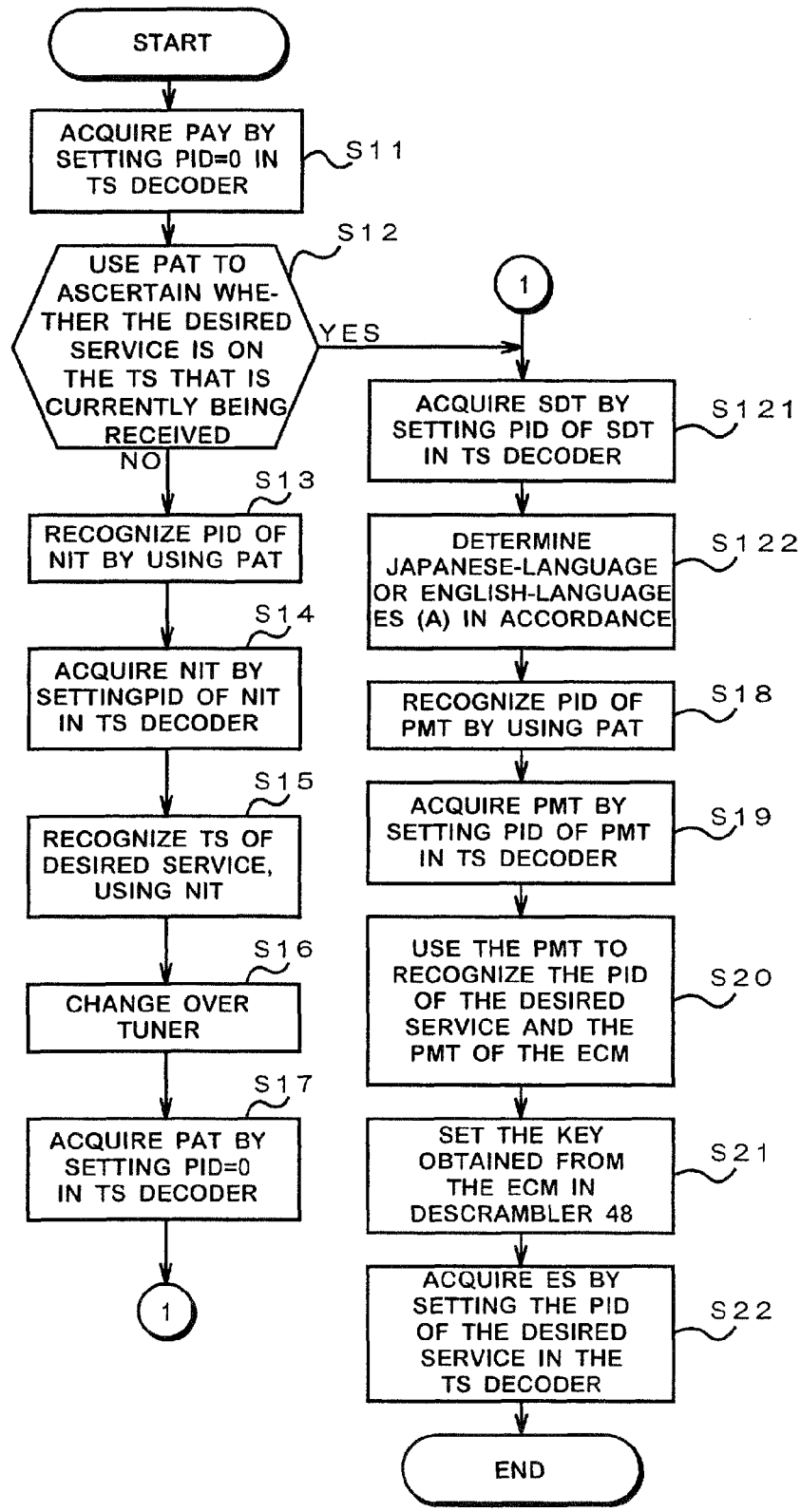
FIG. 21 is a flow chart of a program in reception mode.

FIG. 21 shows by means of a flow chart the program of the reception mode, which is recorded in memory 60. The basic processing is the same as in the case of FIG. 11. In step S 121, CPU 58 acquires the SDT by setting the PID of the SDT in the register of TS decoder 50 for control data separation. In the SDT (Service Description Table), the details of the various services that are multiplexed on this transport stream are given. Also, in the case of bilingual transmission, the SDT describes which packet ID the respective language streams correspond to, and which language is selected as default. CPU 58 acquires the packet ID of this default audio. In this case, it will be assumed that the packet ID of ES (A) 1 J is stated and this is acquired.

In step S 20, CPU 58 sets the packet ID of ES (V) 1 and the packet ID of ES (A) 1 J in TS decoder 50. As a result, the service is output using Japanese audio.

The operator can change over to service using the English-language audio by separating ES (A) 1 E under the control of CPU 58 by supplying an audio changeover instruction to control input unit 54.

(2) Recording Mode

Figure 22:
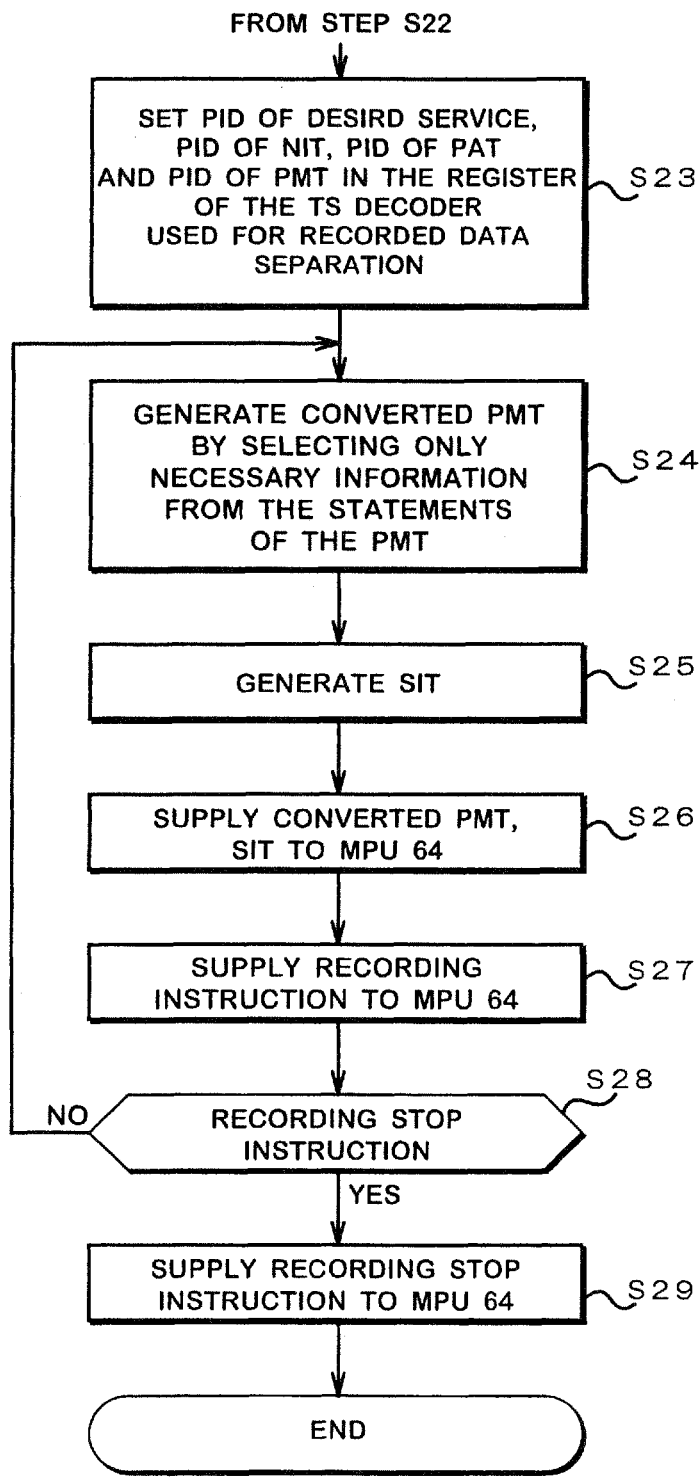
FIG. 22 is a flow chart of a program in recording mode.

FIG. 22 shows in the form of a flow chart the recording mode program that is recorded in memory 60. The basic processing content is the same as in the case of FIG. 12. However, in step S 23, output to recording/reproduction unit 70 is arranged to be performed with the packet IDs of both Japanese-language audio ES (A) and English-language audio ES (A) set. Consequently, both Japanese-language audio ES (A) and English-language audio ES (A) are recorded on magnetic tape 44. In step S 25, it is arranged for CPU 58 to include the packet ID of the Japanese-language ES (A) given in the SDT, and the packet ID of the English-language ES (A) in the description of the SIT.

(3) Reproduction Mode

Figure 23:
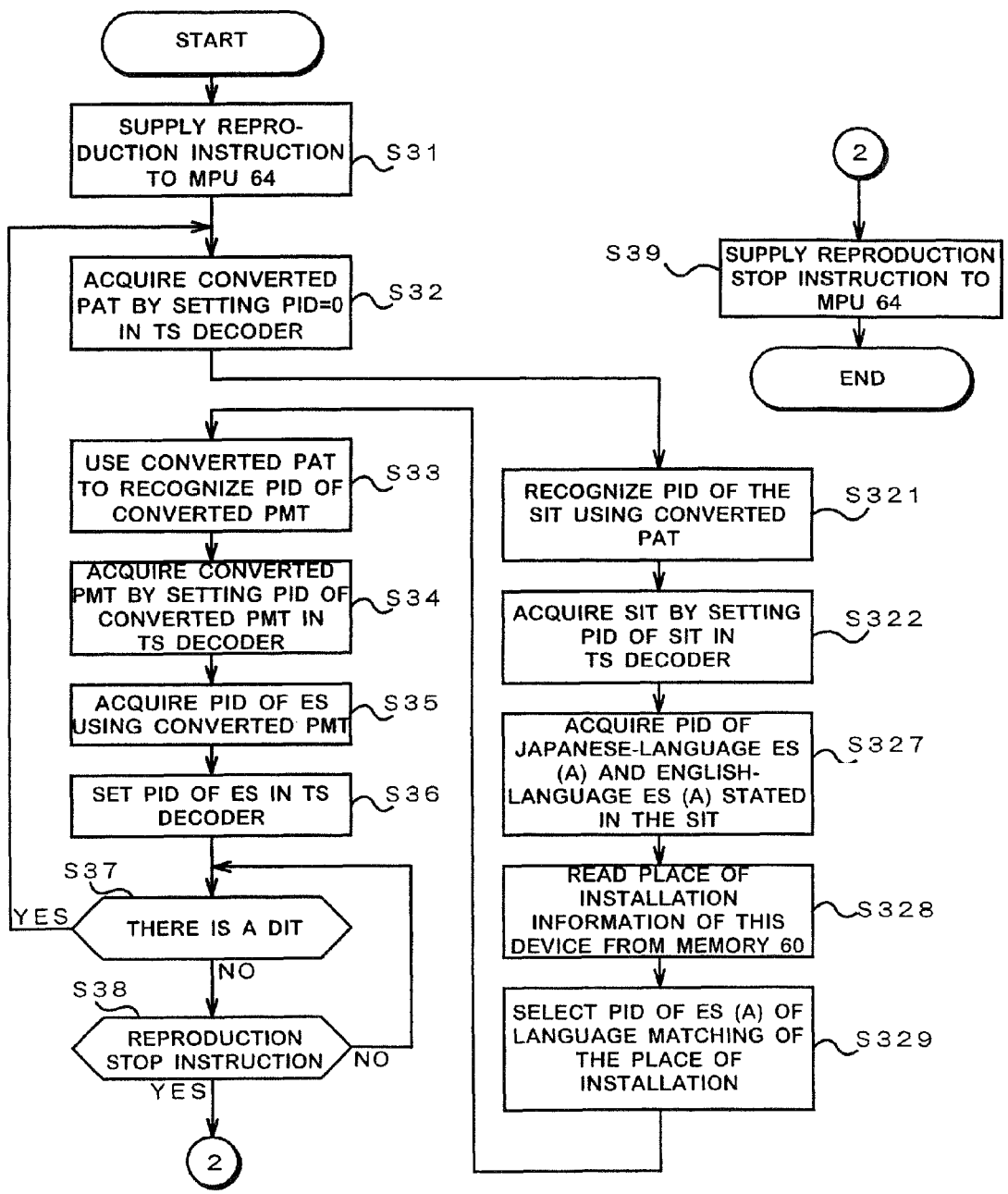
FIG. 23 is a flow chart of a program in reproduction mode.

FIG. 23 shows in the form of a flow chart the program of the reproduction mode which is recorded in memory 60. The basic processing content is the same as in the case of FIG. 15.

In steps S 321, S 322, and S 327, CPU 58 acquires the packet ID of the Japanese-language audio ES (A) and the packet ID of the English-language audio ES (A), and temporarily stores these in memory 60. Next, CPU 58 reads the information of the location of installation, which is recorded beforehand in memory 60 (step S 328). Let us assume that the location of installation of the device that is performing reproduction is the US.

Next, CPU 58 selects an appropriate language using a correspondence table (not shown) of location of installation and language which is recorded in memory 60. English is then selected and the packet ID of the English-language audio ES (A) is selected as default.

In step S 36, CPU 58 sets in TS decoder 50 the packet ID of this English-language audio ES (A). As a result, in the default condition, the service is output using English-language audio.

The operator can change over to service using the Japanese-language audio by separating the Japanese-language audio ES (A) under the control of CPU 58 by supplying an audio changeover instruction to control input unit 54.

4.1.3 Other Reproduction Environments Etc.

In the above embodiment, it was arranged to alter the content of reproduction using the location of installation of the reproduction device. However, the content of reproduction could be arranged to be altered in accordance with the reproduction environment such as the reproduction time or reproduction device (device ID or type of device).

Also, in the above embodiment, implementation of reproduction content in accordance with the reproduction environment was achieved by the provision of a reproduction environment acquisition means 74. However, instead of providing a reproduction environment acquisition means 74, it could be arranged to output reproduction content different from the reception mode, in response to the device being in reproduction mode.

4.2. Other Embodiments

In the above embodiment, data indicating the reproduction environment and the content to be processed in accordance therewith were stored beforehand in memory 60 of the reception/recording/reproduction device. It can therefore be arranged for the processing content at the recording/reproduction device at the receiving end to be changed in accordance with the reproduction environment in accordance with these data by sending these data from the transmission device included in the transport stream.

5. Fourth Embodiment 5.1. Outline of Satellite Broadcasting System Having Interactive Capability Before describing the fourth embodiment, an outline of a broadcast system having interactive capability will be described.

The layout of the transmission device is the same as in the case of FIG. 2. However, it differs in that control data generating unit 6 also generates navigation data, to be described.

Figure 24:
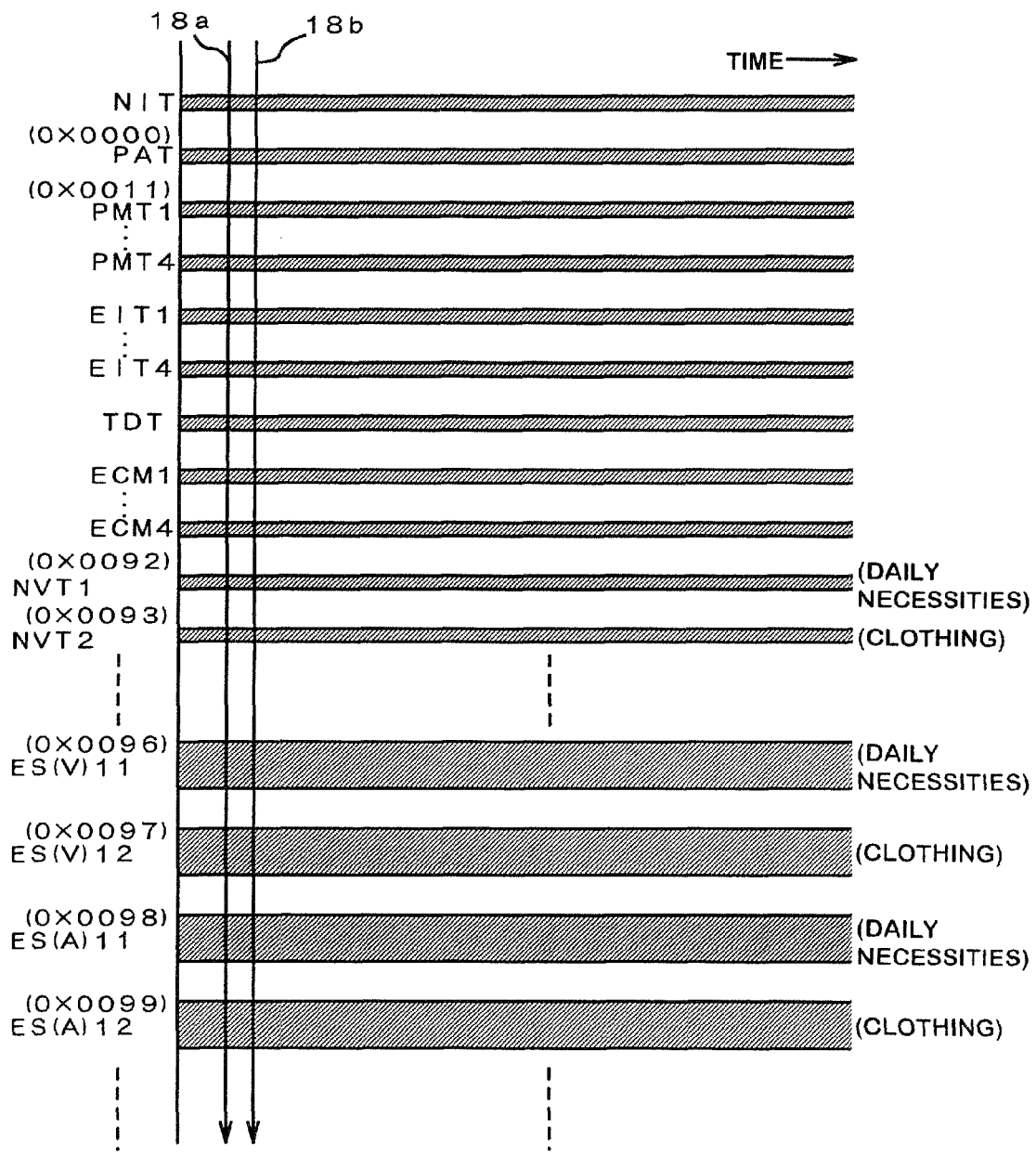
FIG. 24 is a view showing a transport stream according to a fourth embodiment.

FIG. 24 shows the data construction of a transport stream that is sent from a transmission device in a broadcasting system having interactive capability. This Figure shows the video ES (V) 11, ES (V) 12, audio ES (A) 11, and ES (A) 12 of a service SV 11; the video and audio elementary streams of the other services are not shown. The point of difference from the data construction of FIG. 3 is that two video/audio ES's are included in a single service SV 11. Interactive changeover of these two video/audio ES's can be performed by operation by the operator at the receiving end using the navigation data NVT 1 and NVT 2, which constitute interactive control data. Also, it is arranged that the auxiliary display can be altered in interactive manner by operation by the operator at the receiving end using navigation data NVT 1 and NVT 2.

FIG. 25 shows the content of PMT 1 of service SV 11. The control data PMT 1 describes the packet ID of each content (video, audio, navigation data) and the packet ID of the ECM data for obtaining the key for descrambling this content. Furthermore, since all of the video, audio and navigation data have a plurality of contents, the content that is to be initially output is given as the entry content. The packet ID of this control data PMT 1 itself is "0x0011".

FIG. 26 shows the content of the control data PAT. In control data PAT, there are given the packet IDs of the PMTs relating to the services SV 11, SV 12, SV 13 and SV 14 that are multiplexed on this transport stream TS 1. It is thereby possible to ascertain that the packet ID of service SV 11 is "0x0011". It should be noted that the packet ID of this control data PAT itself is fixed as "0x0000".

FIG. 27 and FIG. 28 show the content that is given in navigation data NVT 1 and NVT 2. The same content of this set of navigation data NVT 1 and NVT 2 is repeatedly sent at prescribed intervals. Interactive alteration of the service content is executed as shown in FIG. 29 to FIG. 32 in response to operation by the operator using navigation data NVT 21 and NVT 2. The details will be described later.

Figure 33:
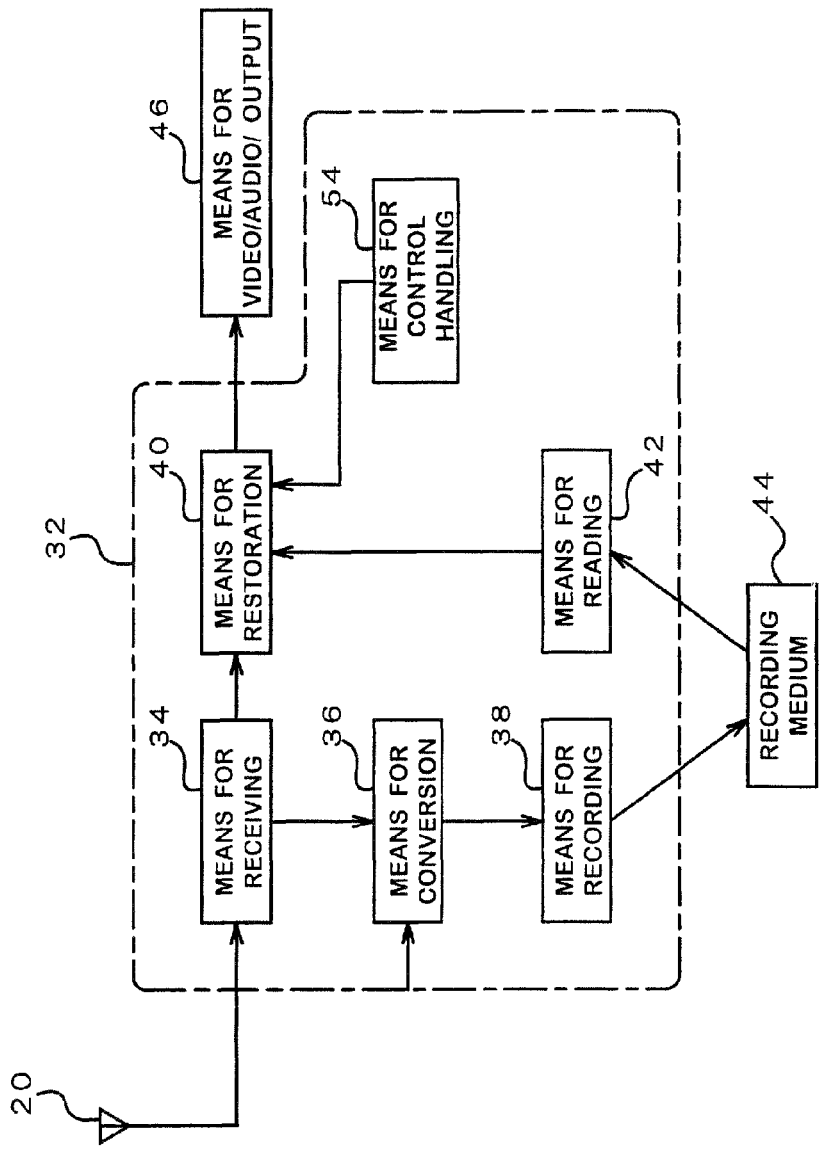
FIG. 33 is a view showing the overall layout of a reception/recording/reproduction device according to a fourth embodiment.

5.2. Reception/Recording/Reproduction Device 5.2.1 Overall Construction of the Reception/Recording/Reproduction Device FIG. 33 shows the overall construction of a reception/recording/reproduction device 32 according to this embodiment. Electromagnetic waves captured by antenna 20 are demodulated as a single transport stream by reception means 34. In reception mode, the transport stream from reception means 34 is supplied to restoration means 40. Restoration means 40 selects packets relating to a desired service from this transport stream and, in accordance with the content of these packets, restores and outputs a service content signal (for example a composite signal such as NTSC). Video/image output means 46 receives this service content signal and outputs video/images.

Also, restoration means 40 interactively alters the content of the service signal that is output in accordance with the navigation data, in response to control input from a control handling means 54.

In recording mode, the transport stream from reception means 34 is supplied to conversion means 36. Conversion means 36 converts this transport stream into a packet-multiplexed stream in a condition suitable for recording and outputs this as a converted stream. Conversion means 36 generates the converted stream by selecting from the transport stream packets relating to the desired service and, of these packets, selecting only the packets that are needed for reproduction. If the desired service includes navigation data, conversion means 36 generates a converted stream including the navigation data. Recording means 38 records this converted stream on recording medium 44.

In reproduction mode, the converted stream is read from recording medium 44 by reading means 42. This converted stream that is thus read is supplied to restoration means 40. Restoration means 40, in accordance with the content of this converted stream, restores and outputs a service content signal (for example a composite signal such as NTSC). Video/image output means 46 receives this service content signal and outputs video/images.

Also, restoration means 40 interactively alters the content of the service signal that is output in accordance with the navigation data, in response to control input from control handling means 54.

In this embodiment, instead of recording the service content signal from restoration means 40, as in the prior art device, it is arranged that recording is effected directly in the packet condition. Consequently, since recording can be performed including the control data, recording and reproduction can be performed using the control data without adversely affecting the function of the satellite broadcast. In particular, since the navigation data is also recorded, even on reproduction, a service with interactive capability can be restored.

With the conventional device, in the case of a system in which recording is effected with a video composite signal, even if the service has interactive capability, only fixed content in accordance with the control input can be recorded when recording. However, with this embodiment, recording can be effected while maintaining interactive capability.

Also, since recording can be performed in a condition with both video and audio digitally compressed, the capacity of the recording medium can be utilized in an effective manner. Furthermore, the capacity needed for recording can be reduced since only packets relating to the desired service are selected for recording from the transport stream. In addition, the capacity needed for recording can be reduced, since, from these packets, only the packets that are necessary when reproducing are selected and recorded.

Figure 34:
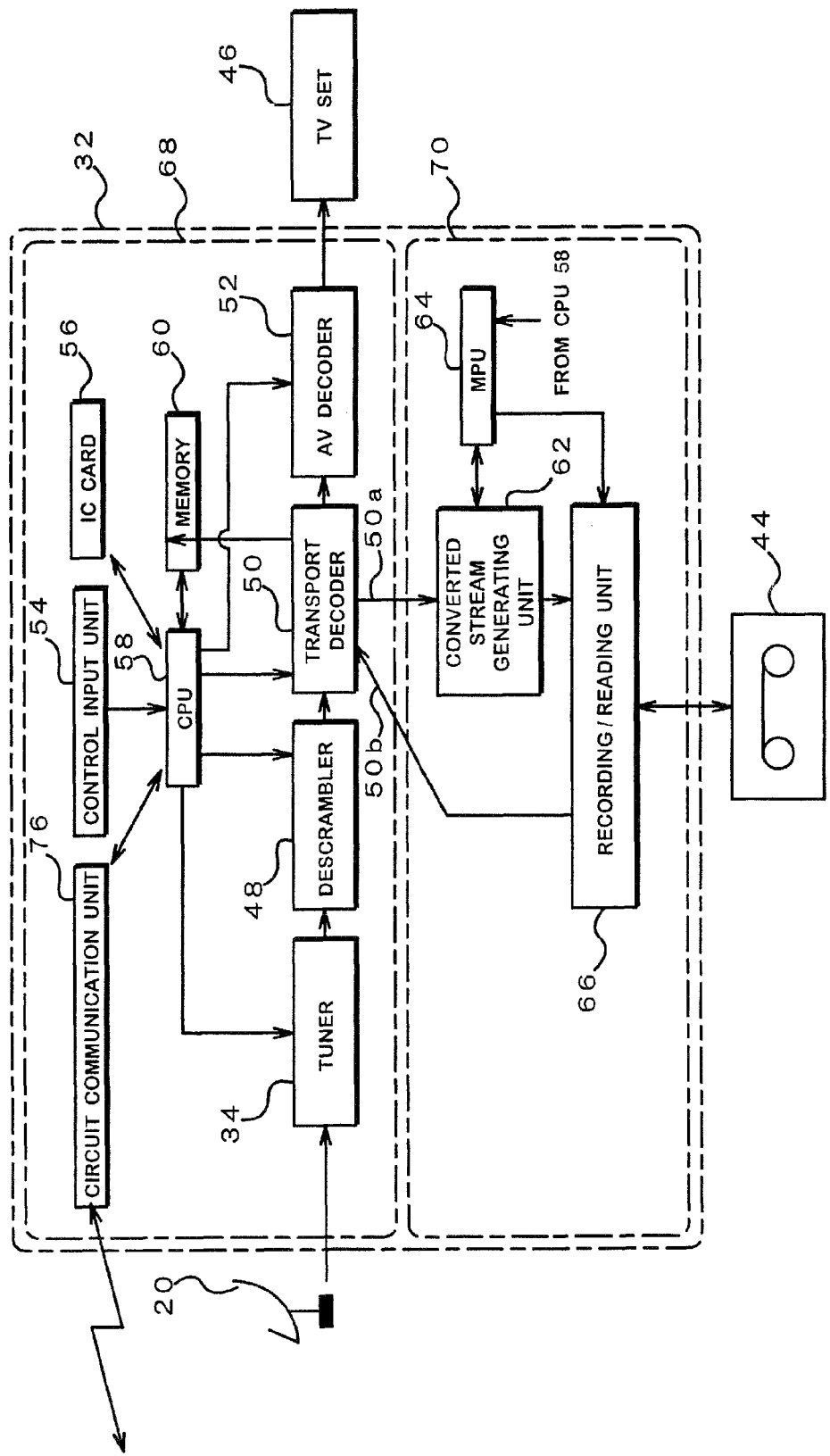
FIG. 34 is a view showing a hardware construction in the case where the reception/recording/reproduction device of FIG. 33 is implemented using a CPU.
Figure 35:
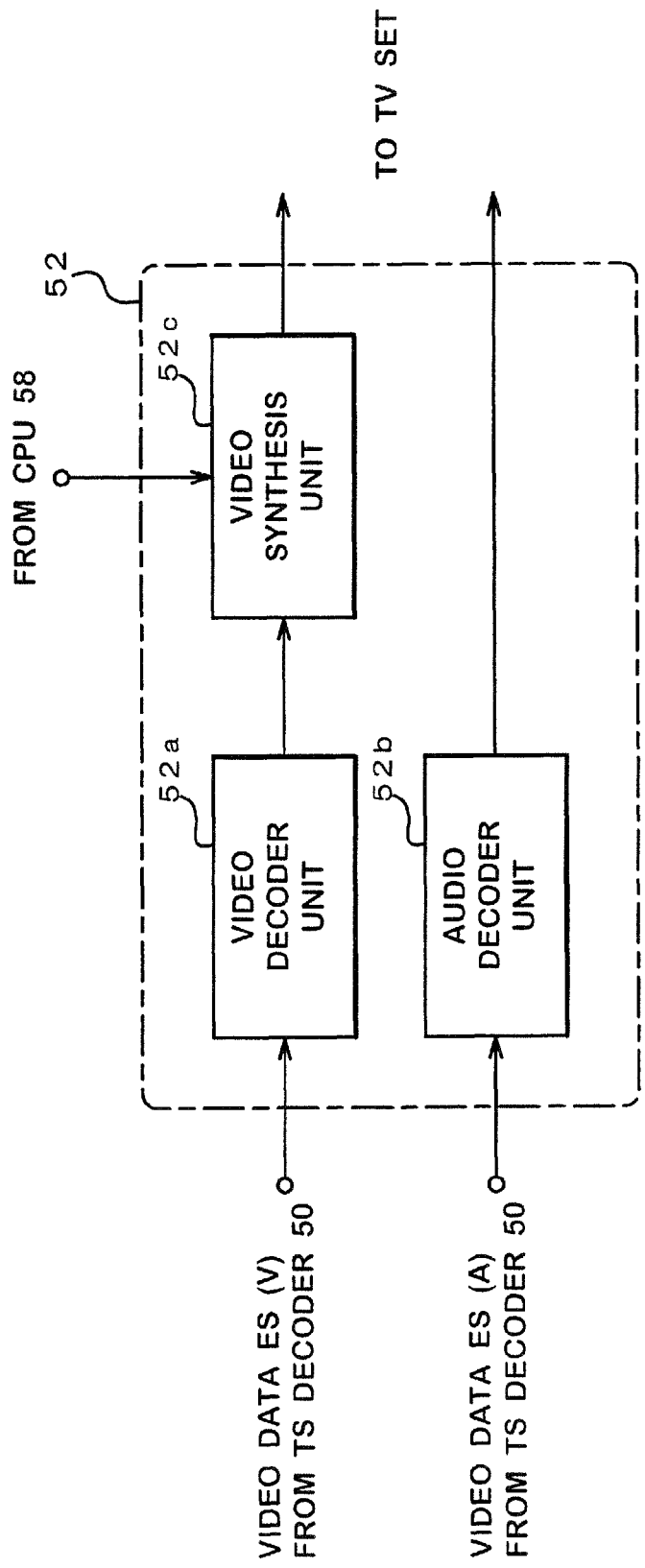
FIG. 35 is a view showing details of AV decoder 52.

5.2.2 Specific Constructional Example and Operation of Reception/Recording Reproduction Device FIG. 34 shows a block diagram of the case where the reception/recording/reproduction device 32 shown in FIG. 33 is implemented using a CPU. This reception/recording/reproduction device 32 comprises a reception unit 68 and recording/reproduction unit 70. CPU 58 exercises control of the various units in accordance with a program that is recorded in memory 60.

This device has three modes: reception mode, recording mode and reproduction mode. The operation of these respective modes is described below.

(1) Reception Mode

Let us assume that a transport stream as shown in FIG. 24 is incoming. And let us also assume that service SV 11 contains video data ES (V) 11, ES (V) 12, and audio data ES (A) 11 and ES (A) 12, and that video data ES (V) 11 and audio data ES (A) 11 have as content tele-shopping relating to daily necessities, while video data ES (V) 12 and audio data ES (A) 12 have as content tele-shopping relating to articles of clothing.

Figure 36:
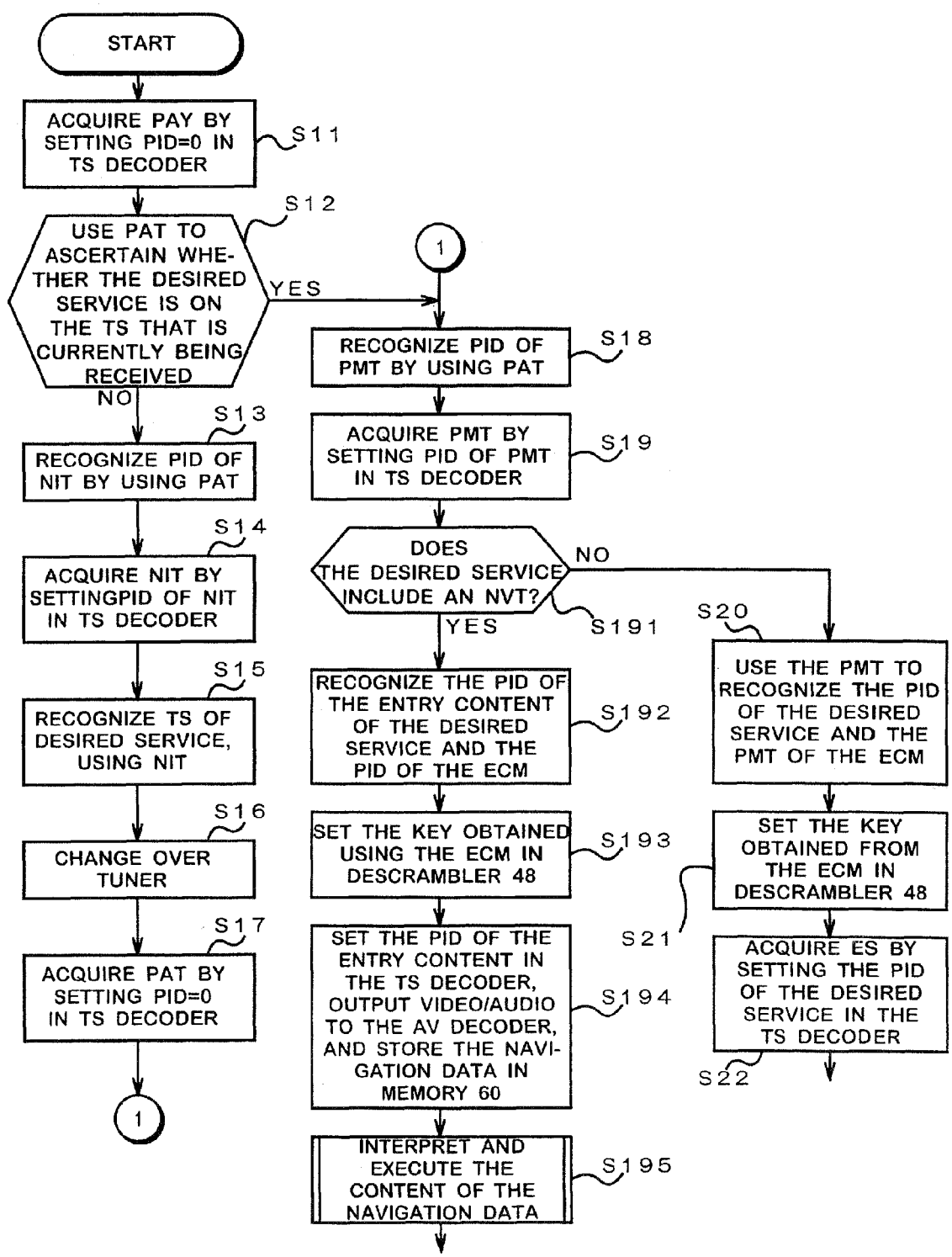
FIG. 36 is a flow chart of a program in reception mode.

The program of the reception mode, which is recorded in memory 60, is shown in FIG. 36 by a flow chart.

Assuming that service SV 13 of transport stream TS 1 is currently being received, the operation when an instruction to change over to service SV 11 of transport stream TS 1 is supplied to CPU 58 is described below. This instruction to CPU 58 is supplied from a control panel or remote controller. The control input unit 54 shown in FIG. 34 is a photodetector unit that receives an instruction from this control panel or remote controller.

First of all, CPU 58 sets the packet ID of the PAT in the register (not shown) of transport decoder (TS decoder) 60 used for control data separation. The packet ID of the PAT is fixed as "0x0000". TS decoder 50 thereby records the content of the separated PAT in memory 60 (step S 11). In this PAT there is given a table of the services that are multiplexed in the transport stream TS 1 that is currently being received (see FIG. 26). CPU 58 therefore learns that the desired service SV 11 is multiplexed on the transport stream TS 1 that is currently being received. That is, CPU 58 advances from the processing of step S 12 to S 18.

In step S 18, the packet ID of the PMT of the desired service SV 11 is acquired, by using the acquired PAT. Thus, "0x0011" is acquired (see FIG. 26). Next, CPU 58 sets the packet ID "0x0011" of the PMT in the register of TS decoder 50 used for control data. It is thereby able to separate the PMT 1 of service SV 11, and extract its contents into memory 60 (step S 19).

The PMT 1 of service SV 11 is shown in FIG. 25. Based on this PMT 1, CPU 58 ascertains whether or not navigation data NVT is included in the service SV 11 (i.e. whether this service is a service possessing interactive capability) (step S 191). If it does not contain an NVT, the same processing as in the case of FIG. 11 is performed, and the content of the service is output from TV set 46 (steps S 20, S 21, S 22).

If, as shown in FIG. 25, an NVT is included, CPU 58 recognizes (step S 192) from the content of PMT 1 the entry content constituted by the video, audio and navigation data packet IDs and the packet IDs of their ECM. Thus the packet ID "0x0096" of the video data ES (V) 11, the packet ID "0x0098" of audio data ES (A) 11, the packet ID "0x0092" of the navigation data NVT 1 and the packet ID "0x0082" of their ECM data are recognized.

Next, CPU 58 acquires the ECM data by setting the packet ID "0x0082" of the ECM in the register of the TS decoder 50 that is used for control data separation. Further, this ECM data is supplied to IC card 56, and the scrambling key that is restored by IC card 56 is thereby acquired. The thus-acquired scrambling key is set in descrambler 48 (step S 193). By this means, the packets of the video data ES (V) 11, ES (V) 12, audio data ES (A) 11 and ES (A) 12 and the navigation data NVT 1 and NVT 2 of service SV 11 are put in descrambled condition.

Also, CPU 58 sets the packet IDs "0x0096" and "0x0098" of the video and audio data ES (V) 11 and ES (A) 11 in the register of TS decoder 50 used for ES separation (not shown) (step S 194). TS decoder 50 thereby outputs the separated video and audio data ES (V) 11 and ES (A) 11 to AV decoder 52.

Figure 29:
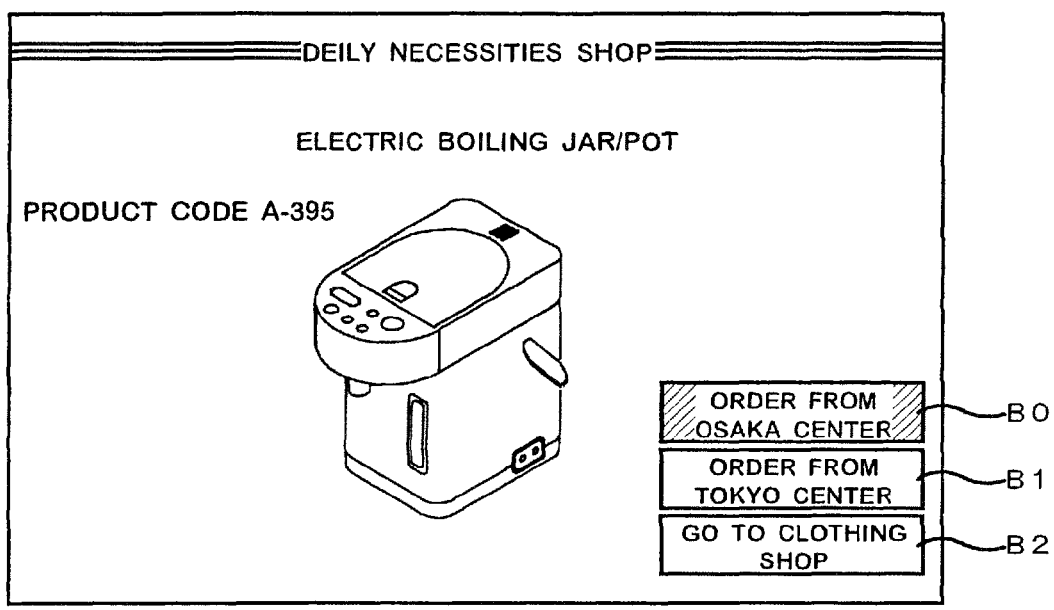
FIG. 29 is a view showing a screen for tele-shopping for daily necessities displayed on a television set 46.

When the AV decoder receives this, it expands (removes) the compression, and performs D/A conversion to generate a video composite signal. This signal is supplied to TV set 46, whence it is output as video and audio. Video of tele-shopping for daily necessities is thereby displayed as shown in FIG. 29. The buttons B0, B1, B2 at the bottom right of the screen are displayed by subsequent navigation data and are not contained in the video and audio data ES (V) 11, ES (A) 11.

Also, in step S 194, CPU 58 sets the packet ID "0x0092" of the navigation data NVT 1 in the register of TS decoder 50 for control data separation (not shown). In this way, the navigation data NVT 1 is temporarily stored in memory 60. At this point, it will be assumed that the navigation data NVT 1 as shown in FIG. 27 is acquired.

Next, the navigation data that has been thus recorded is decoded and executed (step S 195).

Figure 37:
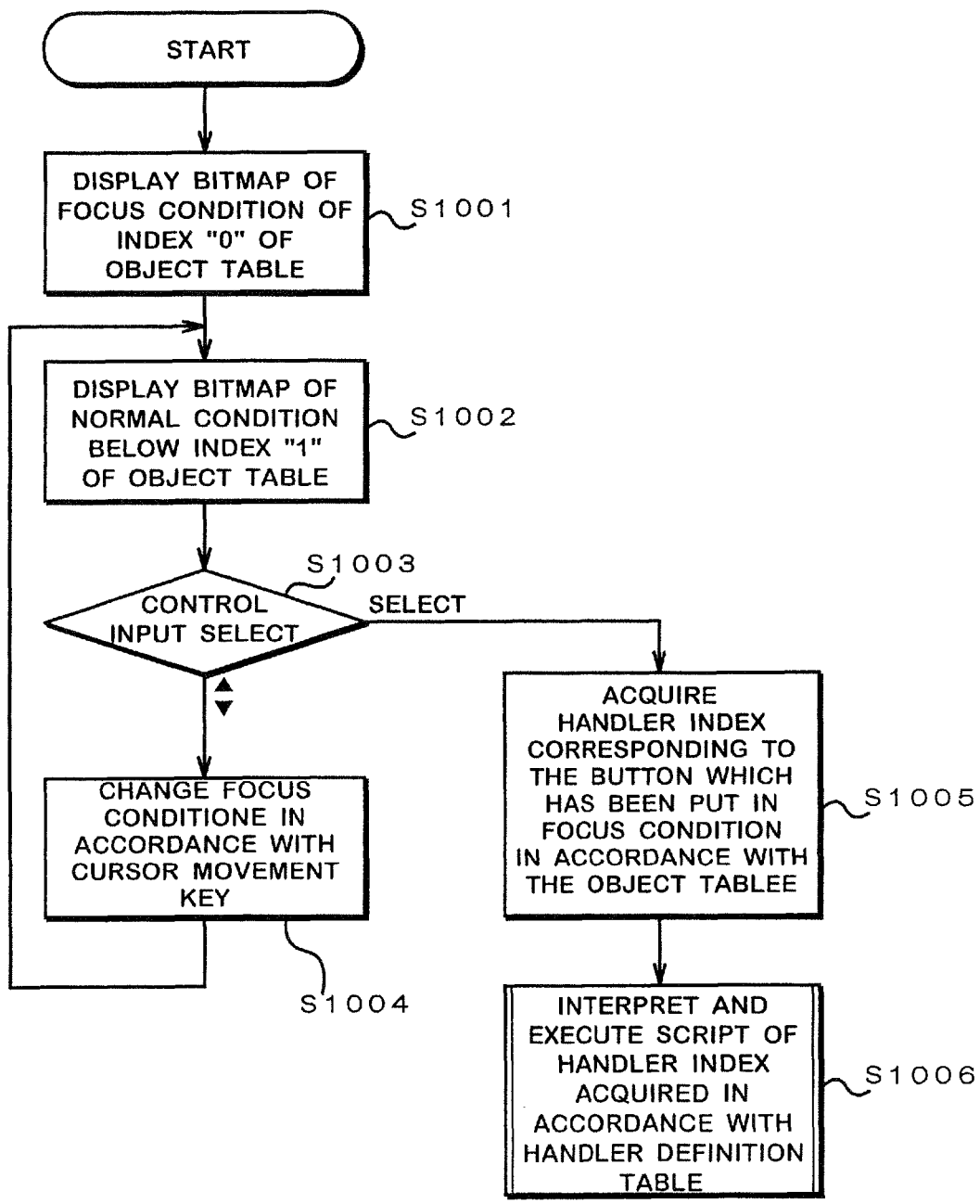
FIG. 37 is a flow chart of a program (base program) that interprets and executes navigation data.

FIG. 37 shows a flow chart of a program whereby the navigation data recorded in memory 60 is interpreted and executed.

First of all, from the object table of navigation data NVT 1 of FIG. 27, the item of object index number "0" is read and, based on the information that is indicated there, a button is displayed on the screen (step S 1001). That is, bitmap data indicated in the bitmap table is displayed at the position of X co-ordinate "500" and Y co-ordinate "200". This is pre-set so as to display a bitmap of the focus condition in regard to the object of index number "0". Consequently, at this point, it is controlled so as to display the data of bitmap index number "1" (highlighted display: "Order from Osaka center").

Specifically, CPU 58 supplies to video synthesis unit 52*c* of AV decoder 52 the data of bitmap index number "1" (highlighted display: "Order from Osaka center"). In this way, video synthesis unit 52*c* generates image data in which a highlighted display "Order from Osaka center" is superimposed on the video data of ES (V) 11. Consequently, a button B0 is displayed on the TV set 46 as shown in FIG. 29.

In the same way, button B1 of FIG. 29 is displayed in accordance with the information of index "1" of the object table of navigation data NVT 1 of FIG. 27. That is, for object indexes other than object index "0", the data of the bitmap index in the normal condition is displayed. That is, the display processing of "Order from Tokyo center", which is not highlighted, is performed (step S 1002).

Furthermore, in the same way, based on the information of index "2" of the object table, the display processing of button B2 "Go to clothes shop" (unhighlighted display) of FIG. 29 is performed (step S 1002).

In the above way, as shown in FIG. 29, a display is obtained with buttons B0, B1, and B2 superimposed on the product description video. As will be clear from the screen, display is effected in a condition with the button B0 "Order from Osaka center" selected. Corresponding to this, CPU 58 stores the information that object index "0" is the currently selected object.

Figure 38:
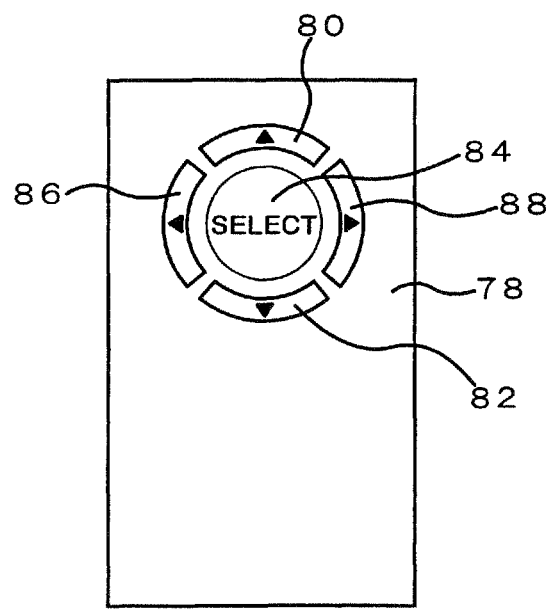
FIG. 38 is a view showing the external appearance of a remote controller device 78.

Next, if from remote controller 78 shown in FIG. 38 (or the control Panel itself), key 82 which moves the cursor downwards is pressed, the control input unit 54 receives this and communicates it to CPU 58. CPU 58 identifies the control input (step S 1003) and, if this is the "key to move the cursor downwards", proceeds to step 1004.

In step S 1004, in accordance with the object table of navigation data NVT 1, the number of the currently selected object is incremented, so that the object index "1" is put into selected condition. That is, in respect of object index "1", the bitmap shown in the focus condition column is displayed, while for the other object indexes "0" and "2", the bitmap indicated in the normal condition column is displayed.

Figure 30:
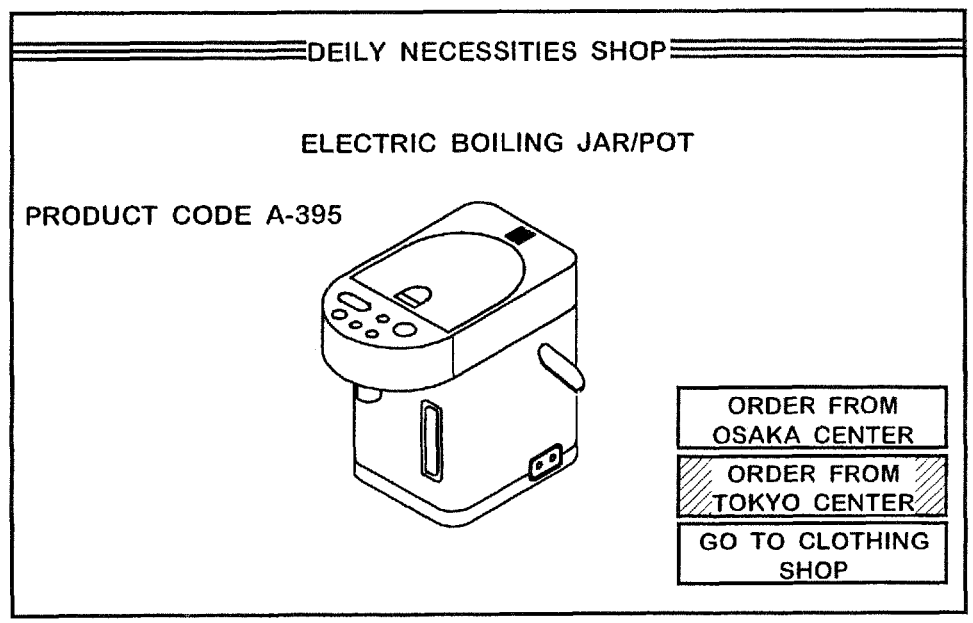
FIG. 30 is a view showing a screen for tele-shopping for daily necessities displayed on a television screen 46.

In this way, the screen of TV set 46 is changed as shown in FIG. 30. That is, button B1 "Order from Tokyo center" is put in selected condition.

Figure 31:
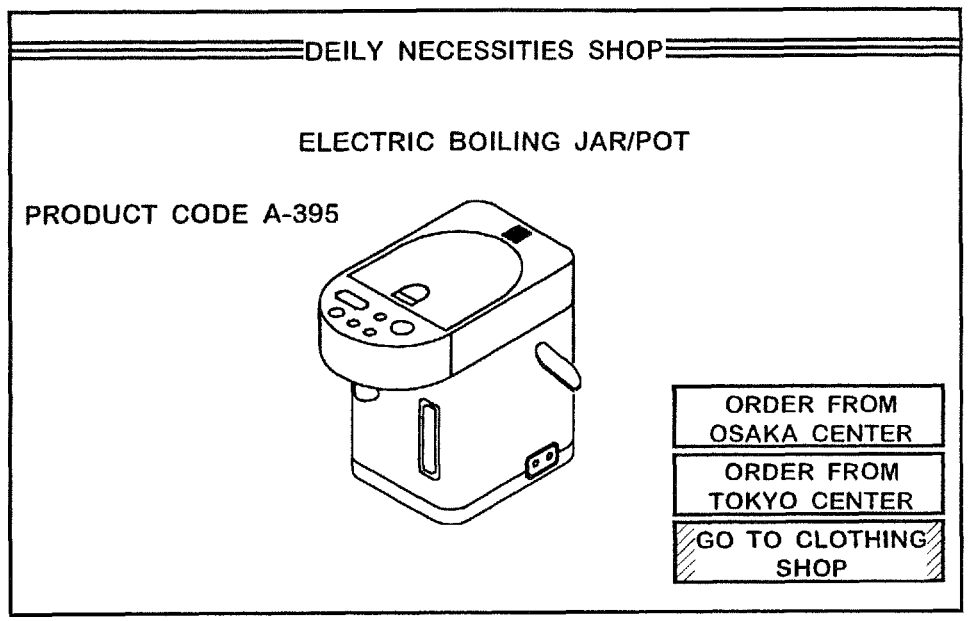
FIG. 31 is a view showing a screen for tele-shopping for daily necessities displayed on a television set 46.

Furthermore, when the operator presses the key 82 to move the cursor downwards, as shown in FIG. 31, the screen display is put in a condition in which button B2 "Go to clothes shop" is selected. Also, when, from the condition of FIG. 31, the key 80 to move the cursor upwards is pressed, the screen display returns to the condition shown in FIG. 30.

Although, in the above embodiment, only operation of cursor keys 80, 82 was illustrated, if the object indexes are arranged two-dimensionally, control can be performed using the left and right keys 86, 88 as well.

In the condition of FIG. 31, if the selection button 84 of remote controller 78 is pressed, CPU 58 advances from step S 1003 to S 1005. In step S 1005, CPU 58, referring to navigation data NVT 1, acquires the handler index that is given in the handler column of the object index that is in the currently selected condition. Thereupon, since object index "2" is selected, it acquires the handler index "2" of the handler column.

Furthermore, referring to the handler definition table, it acquires and executes the script corresponding to handler index "2" (step S 1006). Thereupon, it acquires "go to contents (index 1)". "Go to contents ( )" is an instruction to change over to contents having the index number within the brackets ( ) displayed in the hyper link table. Consequently, changeover to the contents (tele-shopping for clothing) of hyper link index "1" displayed in the hyper link table is performed.

At hyper link index "1" of the hyper link table, there are given the respective packet IDs "0x0097", "0x0099" and "0x0093" of the video, audio and navigation data constituting the link targets. CPU 58 sets the packet IDs "0x0097" and "0x0099" in the register of TS decoder 50 for ES separation and sets the packet ID "0x0093" in the register thereof for control data separation.

In this way, TS decoder 50 outputs video data ES (V) 12 and audio data ES (A) 12 to the AV decoder. As a result, TV set 46 displays the video of tele-shopping for clothing shown in FIG. 32, and outputs the audio thereof.

Also, the navigation data NVT 2 shown in FIG. 28 is separated by TS decoder 50 and stored in memory 60 in place of navigation data NVT 1. The processing shown in FIG. 37 is performed in regard to this navigation data NVT 2, with the result that buttons B10, B11 and B12 are displayed as shown in FIG. 32.

Figure 32:
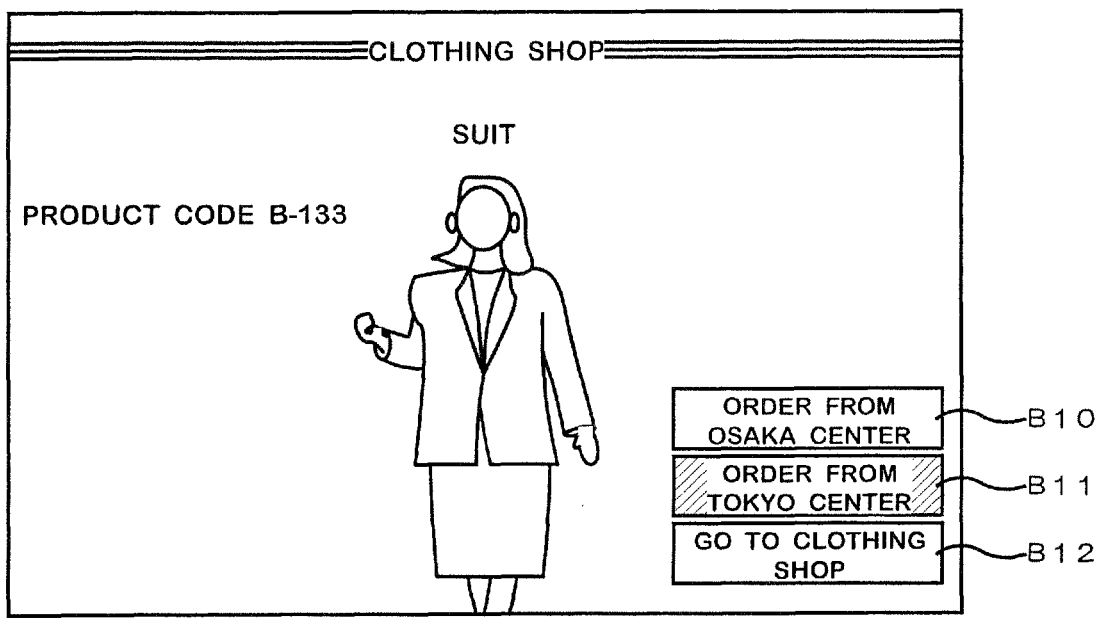
FIG. 32 is a view showing a screen for tele-shopping for daily necessities displayed on a television screen 46.

When the operator presses the selection button 84 (see FIG. 38) in the condition with button B10 "Order from Osaka center" selected, as shown in FIG. 32, an order from purchase a product displayed on the screen can be made. The processing for this is described below.

When the selection button 84 is pressed, CPU 58 advances from the processing of step S 1003 to step S 1005. In step S 1005, in accordance with the object table of navigation data NVT 2 (see FIG. 28), the handler index is acquired from the handler column of the index that is currently in selected condition. Thereupon, since object index "0" is in selected condition, handler index "0" is acquired.

Next, CPU 58 executes the script corresponding to the handler index "0" of the handler definition table. That is, it executes "send_strin (index1, index2)". "Send_string (A, B)" is an instruction to telephone the telephone number of index "A" of a string table and to transmit the string of index "B". Consequently, CPU 58 thereupon acquires "06-6368-XXXX" corresponding to string index "0" of the string table and telephones "06-6368-XXXX" by controlling the circuit communication unit 76 shown in FIG. 34. This telephone number is the telephone number of the Osaka handling center for this tele-shopping. When the line is connected, CPU 58 sends the "product code: B-133" corresponding to the string index "2" of the string table. At this point, CPU 58 acquires the ID for specifying the product purchaser from IC card 56 or memory 60, and sends this also.

CPU 58 records, in the form of an online log in memory 60, whether or not the above communication proceeded smoothly. An example of such a recording is shown in FIG. 39. If communication succeeded, this is indicated by "O"; if it was unsuccessful, an "X" is recorded. CPU 58 records the time at which communication took place by acquiring control data TDT included in the transport stream and/or its own calendar or clock etc.

It is possible to ascertain whether or not an order from purchase a product has been correctly made by displaying this log.

Processing in reception mode is executed as described above. Although not described in the above, in this embodiment, the products that are described by video data are arranged to be changed with time. Consequently, it is arranged to transmit navigation data of different content corresponding thereto (for example, with different product code at index "2" of the string table).

(2) Recording Mode

Figure 40:
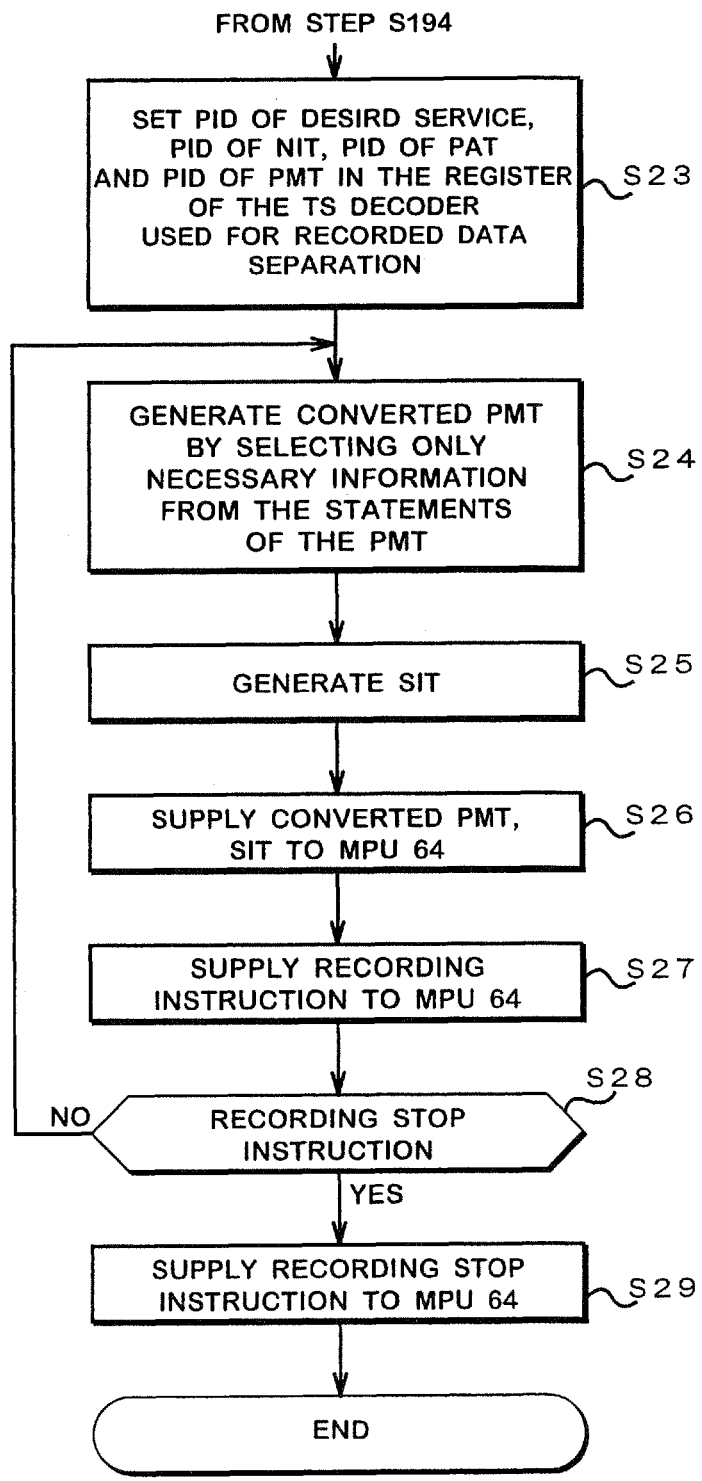
FIG. 40 is a flow chart of a program in recording mode.

FIG. 40 shows the program for recording mode which is recorded in memory 60, in the form of a flow chart. Steps S 11 to S 22 and S 192 to S 195 are the same as in the case of reception mode. The processing when recording a service that does not contain navigation data i.e. the processing subsequent to step S 22 is as shown in FIG. 12. FIG. 40 shows the processing in the case where a service is recorded that contains navigation data i.e. the recording processing that is performed in parallel with step S 195. In FIG. 40, processing proceeds utilizing the information (packet ID) that was acquired in reception mode. However, when recording mode is executed independently of reception mode, it is necessary to acquire the desired service PID and control data PID etc. by processing identical with that of reception mode.

In step S 23, CPU 58 sets in the register of TS decoder 50 that is used for recorded data separation (not shown) the packet ID of the ES of the service that is desired to be recorded, the packet ID of the navigation data NVT, the packet ID of the NIT, the packet ID of the PAT, and the packet ID of the PMT. If service SV 11 is to be recorded, the respective packet IDs shown in FIG. 25, FIG. 26 and FIG. 7 are set. For the video data, audio data, and navigation data, the packet IDs for both tele-shopping for necessities and tele-shopping for clothing are set.

In this way, TS decoder 50 outputs to converted stream generating unit 62 of recording/reproduction unit 70 the video and audio data ES (V) 11, ES (V) 12, ES (A) 11, ES (A) 12, the PAT, PMT 1, and NIT directly in packet condition.

CPU 58 generates a converted PMT 1 (step S 24) by acquiring the PMT 1 that is recorded in memory 60 and selecting, of the information that is given therein, only information relating to the desired service SV 11. For example, of the information contained in PMT 1, the packet ID of the ECM is not needed during reproduction and so is removed. FIG. 41 shows the converted PMT that is thus obtained.

Next, CPU 58 generates control data SIT (step S 25) describing the information of the services and events (programs) contained in the recorded converted stream.

CPU 58 supplies the converted PMT 1 and SIT generated as described above to MPU 64. MPU 64 supplies these to converted stream generating unit 62, which generates a converted stream.

Converted stream generating unit 62 receives the PAT from TS decoder 50 and thereby generates a converted PAT including only information relating to the desired service SV 11, and replaces the PAT by this converted PAT. At this point, the packet ID of the NIT included in the PAT is converted to the packet ID of the SIT. The converted PAT is shown in FIG. 42. Also, the PMT from the TS decoder 50 is substituted by the converted PMT received from MPU 64. Furthermore, the NIT from TS decoder 50 is substituted by the SIT received from MPU 64.

In this way, a converted stream is obtained in which are packet-multiplexed the desired service ES, navigation data NVT, SIT, converted PAT and converted PMT.

Figure 43:
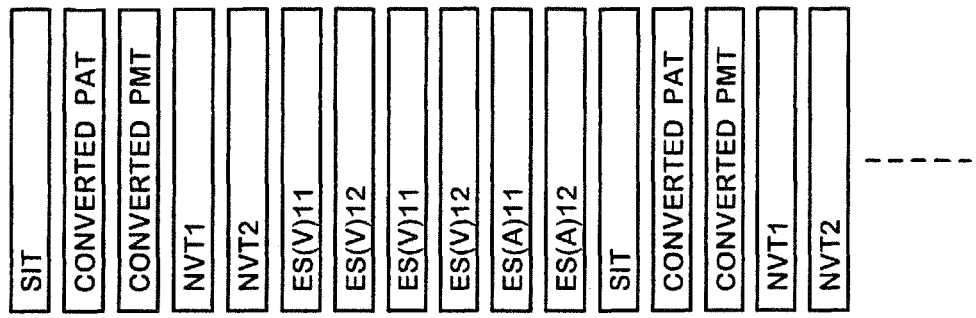
FIG. 43 is a view showing in diagrammatic form a converted stream recorded on a recording medium.

CPU 58 supplies a recording instruction to MPU 64 (step S 27). On receipt of this, MPU 64 controls recording/reading unit 66 to record the converted stream on magnetic tape 44. FIG. 43 shows a diagrammatic representation of the recorded converted stream.

When a recording stop instruction is supplied from control input unit 54, CPU 58 supplies this to MPU 64 (steps S 28, S 29). On the receipt of this, MPU 64 stops the recording that is being performed by recording/reading unit 66.

It should be noted that, in the converted stream recorded on magnetic tape 44, control data and navigation data are recorded however many times the packets are multiplexed, even though their content is the same. Reproduction can therefore be performed at any point along the magnetic tape.

Also, if the service selection is changed during recording, the newly selected service will be recorded from the changeover. When this happens, converted stream generating unit 62 itself detects the discontinuity of information, and, in response thereto (or in response to an instruction from CPU 58), generates a control data DIT (Discontinuity Information Table) indicating the point of discontinuity of information. Furthermore, as shown in FIG. 14, this DIT is packet-multiplexed at the head of the changed service. Likewise, if new recording is performed, this DIT is attached to its head. A DIT is also attached if different programs in the same service are recorded continuously.

That is, all of the video, audio and navigation data included in the service SV 11 are recorded irrespective of changes in the reception screen that are performed under the control of navigation data NVT 2 1, NVT 2 (changes as shown in FIG. 29 to FIG. 32).

Although in this embodiment the converted stream generating unit 62 was provided in the recording/reproduction device 70, it could be provided in the reception device 68. In this way, recording/reproduction device 70 may record this converted stream that is output from reception device 68 directly.

(3) Reproduction Mode

Figure 44:
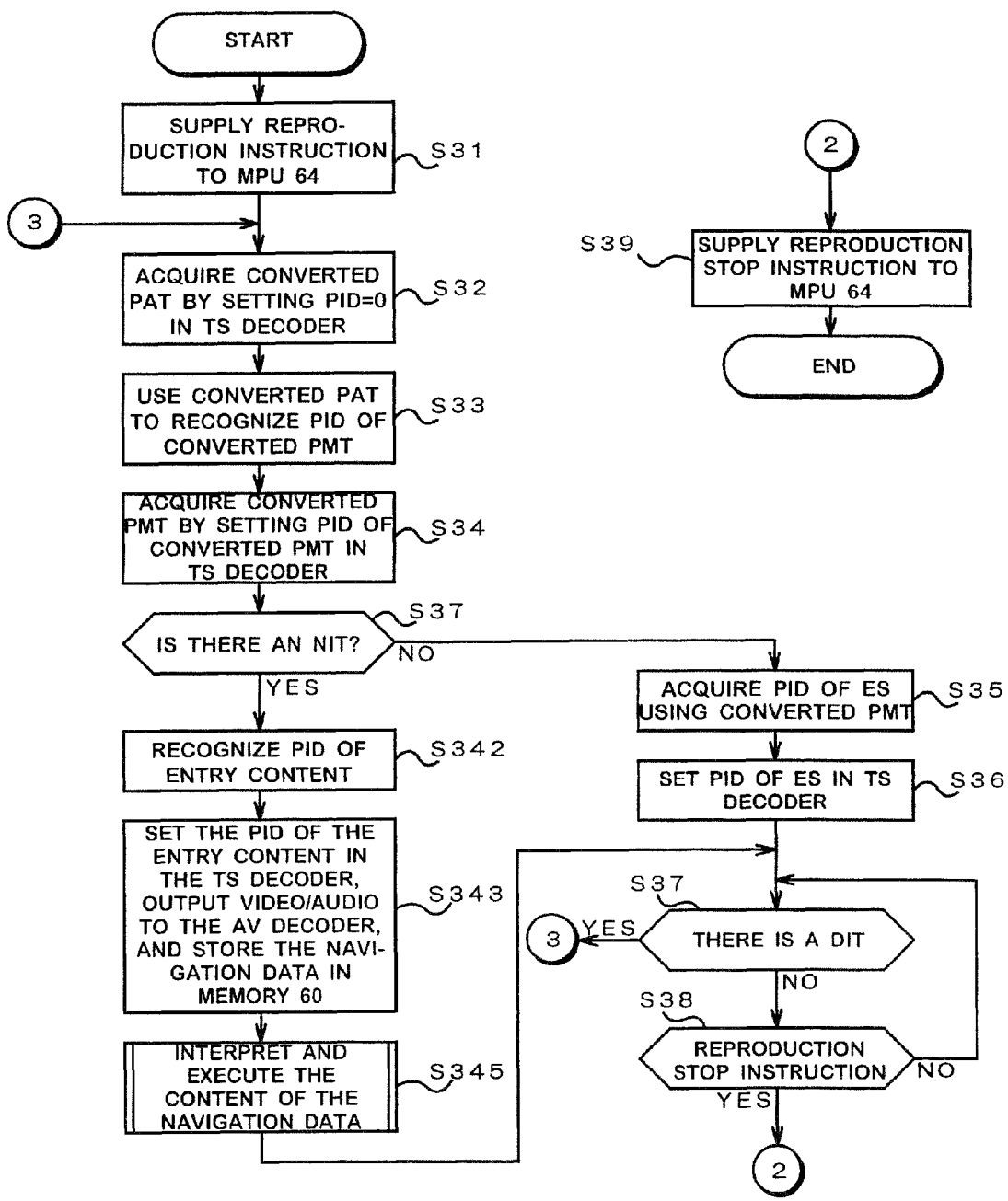
FIG. 44 is a flow chart of a program in reproduction mode.

FIG. 44 shows in the form of a flow chart the program for reproduction mode that is recorded in memory 60. Reproduction mode is activated when a reproduction instruction is supplied from control input unit 54. Hereinbelow, the description will be given under the assumption that data recorded in recording mode described above is reproduced.

First of all, in step S 31, CPU 58 supplies a reproduction instruction to MPU 64. On receiving this, MPU 64 controls the recording/reading unit 66 to read the converted stream from magnetic tape 44. This converted stream that is thus read is supplied to TS decoder 50.

Next, by setting the converted PAT packet ID "0x0000" in the register of TS decoder 50 used for control data separation, the converted PAT is separated from the converted stream, and stored in memory 60 (step S 32). Using the description in this converted PAT, the converted PMT packet ID "0x0011" is recognized (step S 33).

Furthermore, the converted PMT packet ID "0x0011" is set in the register of TS decoder 50 used for control data separation and the converted PMT thereby separated from the converted stream and stored in memory 60 (step S 34). The description of this converted PMT is used to ascertain whether or not navigation data NVT is included in the service that is to be reproduced (step S 341). The processing if navigation data NVT is not included is the same as in the case of FIG. 23.

If navigation data is included, processing advances to step S 342. In step S 342, the description of the converted PMT is used to recognize the packet ID of the entry content. The packet IDs "0x0096", "0x0098" and "0x0092" of the video data ES (V) 11, audio data ES (A) 11 and navigation data NVT 1 are then recognized (step S 342).

Next, CPU 58 sets the packet IDs of the video data ES (v) 11 and audio data ES (A) 11 in the register of the TS decoder 50 used for ES separation, and sets the packet ID of the navigation data NVT 1 in the register used for control data separation.

In this way, TS decoder 50 separates the video data ES (V) 11 and audio data ES (A) 11 from the converted stream. The separated video data ES and (V) 11 and audio data ES (A) 11 are then output to the AV decoder 52 (step S 343).

When the AV decoder 52 receives these, it expands (removes) the compression and performs D/A conversion, to generate a video composite signal. This signal is supplied to TV set 46, whence it is output as video and audio. Video can therefore be obtained as shown in FIG. 29.

Also, TS decoder 50 separates navigation data NVT 1 from the converted stream and temporarily stores it in memory 60 (step S 343). This navigation data NVT 1 is then interpreted and executed (step S 345). This partial processing is the same as the processing of FIG. 37 in reception mode. Consequently, as shown in FIG. 29, buttons B0, B1 and B2 are displayed, with button B0 in a selected condition.

Subsequently, when cursor movement buttons 80, 82 of remote controller 78 are pressed, the selected button is altered as shown in FIG. 29, FIG. 30 and FIG. 31. Also, when selection button 84 is pressed in the condition of FIG. 31, as shown in FIG. 32, the content is altered to the clothing tele-shopping content. Further, in the condition where button B10 of FIG. 32 is selected, when selection button 84 is pressed, a telephone call is made to the Osaka center, and an order for the product is placed. The log of this process is recorded in memory 60 as shown in FIG. 39.

It should be noted that the distinction between communication made in reception mode and communication made in reproduction mode is recorded in the "mode" column.

As described above, even in reproduction mode, just as in reception mode, the content can be interactively altered under control performed by the operator.

If, during reproduction, CPU 58 discovers the presence of a DIT in the converted stream, it returns to step S 32, and performs the following processing of the converted PAT (step S 37). This is because the DIT indicates a point of discontinuity of the recorded data. It also stops the display of the image (button B0 etc.) for control purposes that was displayed in accordance with the navigation data and ensures that interactive processing based on the currently stored navigation data is not performed.

When there is a reproduction stop instruction from control input unit 54 such as remote controller 38, CPU 58 supplies this to MPU 64 (steps S 38, S 39). On receiving this, MPU 64 controls recording/reading unit 66 so that reading from magnetic tape 44 is stopped.

5.2.3 Other Embodiments

In the embodiment of FIG. 34, the conversion means 36 was implemented by TS decoder 50, converted stream generating unit 62 and CPU 58 (in particular, steps S 24 and S 25). Also, restoration means 40 was implemented by TS decoder 50 and CPU 58 (in particular, steps S 32, S 33, S 34, S 342, S 343 and S 345). Since TS decoder 50 is thus shared by both the conversion means and the restoration means, the construction can be simplified.

Although, in the embodiment of FIG. 34, CPU 58 executed part of the generation of the converted stream (steps S 24, S 25), these processing steps could be performed by converted stream generating unit 62. Furthermore, although only packets selected in TS decoder 50 were supplied to converted stream generating unit 62, it would be possible to arrange for the transport stream from descrambler 48 to be applied directly to converted stream generating unit 62. In this case, converted stream generating unit 62 performs selection of the necessary packets.

It should be noted that although in FIG. 34 this was shown by reception/recording/reproduction device 32, the reception device could be constituted solely by a reception unit 68. In this case, there may be provided a data output terminal for recording for extracting the output 50a of the TS decoder and a data input terminal for restoration for accepting converted stream 50b from recording/reproduction unit 70.

Also, a recording/reproduction device could be constituted solely by recording/reproduction unit 70. Further, this could be a reproduction device constituted solely by the reproduction function of recording/reproduction unit 70 and a recording device constituted solely by the recording function of recording/reproduction unit 70.

Also, while, in the above embodiment, descrambled data were recorded, it could be arranged to record data still in scrambled condition. In this case, the ECM data may be recorded directly, or may be recorded as part of the EIT data.

Also, although in the above embodiment the case where two sets of video/audio and two sets of navigation data were employed was illustrated, it would also be possible to employ three or more sets of video/audio and the three or more sets of navigation data. Also, it would be possible to use a single set of navigation data in respect of a plurality of video/audio [streams], or to employ a plurality of sets of navigation data in respect of a single video/audio [stream].

In the above embodiment, when performing reception or reproduction by repeated transmission of a single set of navigation data (recorded repetitively and sequentially), linkage was implemented by storing all THE mutually linked navigation data in memory 60 (recording device having random access capability). The capacity of memory 60 can thereby be reduced. In particular, this is beneficial when a large number of navigation data are linked.

In contrast, in the case where the number of linked navigation data items is small, or where memory 60 has spare capacity, all the mutually linked navigation data may be stored in memory 60. The repetition frequency with which repeated transmission of navigation data is performed can thereby be reduced. Also, link processing can be performed rapidly.

Figure 45:
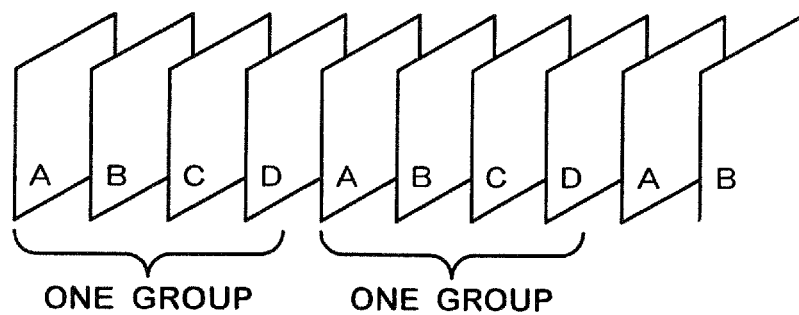
FIG. 45 is a view showing the case of transmission of a stationary image.

Although, in the above embodiment, the video data was transmitted as video and it was arranged to receive, record and reproduce this, it would be possible to transmit the video data as static images and to receive, record and reproduce these. In this case, as shown in FIG. 45, a set of stationary pictures A, B, C, D are transmitted in repeated fashion as video data ES. By describing the mutual linkage relationships of these plurality of stationary pictures A, B, C, D in the object table and hyper link table of the navigation data, a service having interactive capability can be implemented in the same way as in the case of the video described above.

6. Fifth Embodiment 6.1. Transmission Device

The basic construction of a transmission device in this embodiment is as shown in FIG. 2. However, the navigation data that is generated by control data generating unit 6 is different from that of the fourth embodiment. In this embodiment, the navigation data includes a statement to vary the processing content in accordance with differences in the two environments found by comparing the recording environment at the receiving end when recording was made and the reproduction environment when reproduction was effected.

Taking as an example the navigation data described in the previous embodiment, in this embodiment, for example navigation data NVT 1, NVT 2 as shown in FIG. 46 and FIG. 47 are transmitted from the transmission device. In each of these navigation data NVT 1, NVT 2, the contents of the scripts which are given in the handler definition table are different from those of FIG. 27 and FIG. 28. The details of these scripts are given in the processing of the reception device.

Figure 48:
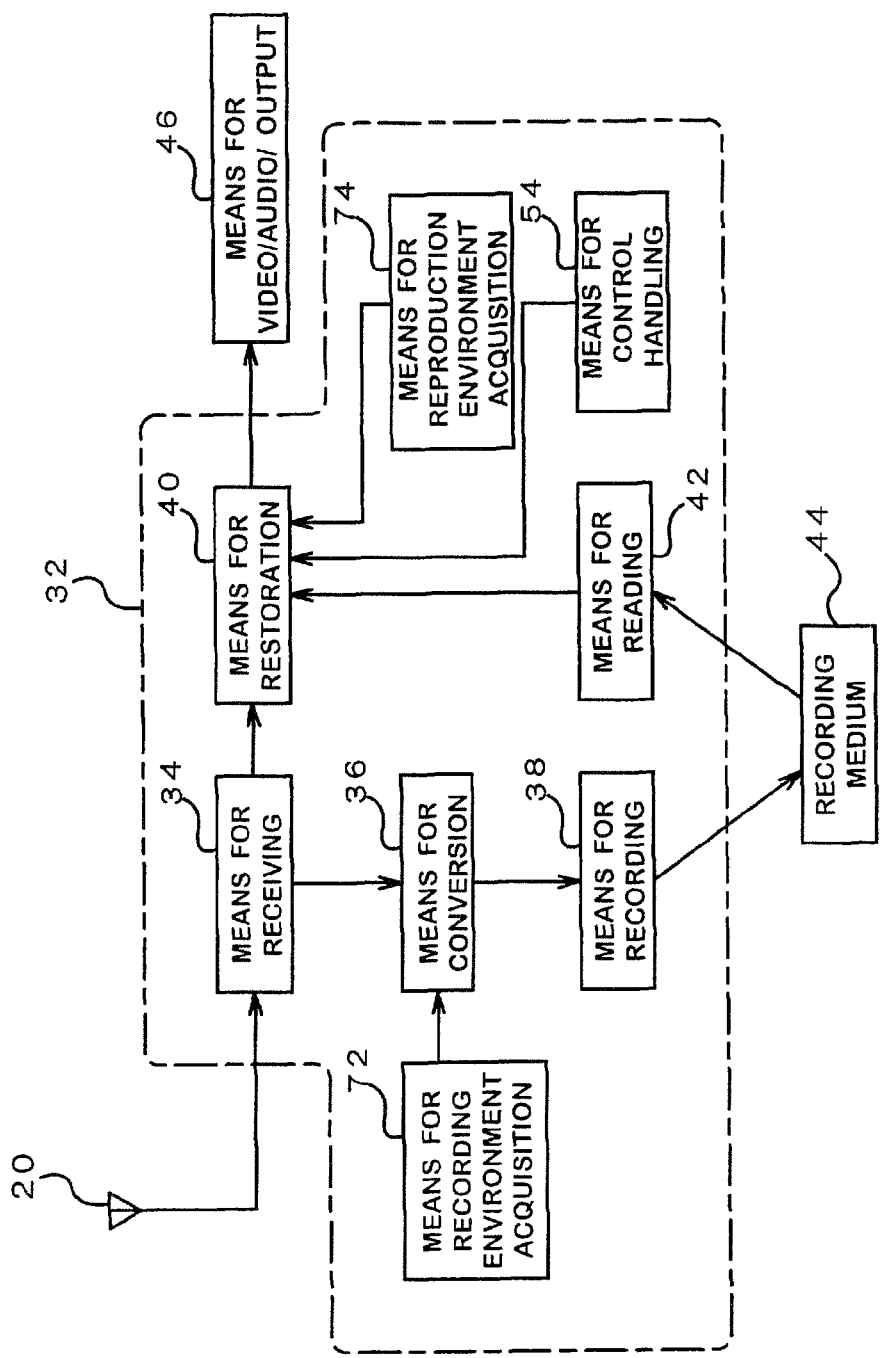
FIG. 48 is a view showing the overall construction of a reception/recording/reproduction device according to a fifth embodiment.

6.2. Reception/Recording/Reproduction Device 6.2.1 Overall Construction of Reception/Recording/Reproduction Device FIG. 48 shows the overall construction of a reception/recording/reproduction device according to this embodiment. In this embodiment, there is provided a recording environment acquisition means 72 that acquires the environment when the converted stream is created (i.e. the environment on recording), and the conversion means 36 generates a converted stream including this recording environment. Consequently, the converted stream that is recorded onto recording medium 44 includes the recording environment.

Reproduction environment acquisition means 74 acquires the environment on reproduction. Restoration means 40 compares the reproduction environment obtained from the reproduction environment acquisition means 74 with the recording environment that is read from the recording medium, and changes the content of reproduction control in response to differences of these two environments.

Reproduction can therefore be performed in an appropriate manner in accordance with the differences between the recording environment and reproduction environment.

6.2.2 Specific Constructional Example and Operation of the Reception/Recording/Reproduction Device A block diagram of the case where the reception/recording/reproduction device 32 shown in FIG. 48 is implemented using a CPU is identical with FIG. 34.

This device has three modes: reception mode, recording mode and reproduction mode. Hereinbelow, the operation of reception mode, recording mode and reproduction mode will be described.

(1) Reception Mode

The processing in reception mode is the same as in FIG. 36. However, the content of the navigation data that is interpreted and executed in step S 195 is different.

The description will be given taking as an example the case of tele-shopping described in the previous embodiments. Just as in the previous embodiments, a transport stream TS 1 as shown in FIG. 24 is incoming. It will be assumed that navigation data NVT 1, NVT 2 as shown in FIGS. 46 and 47 are incoming.

Let us assume that, with the screen in the condition shown in FIG. 32, the selection button 84 of remote controller 78 is pressed. The condition of FIG. 32 is a condition in which buttons are displayed in accordance with navigation data NVT 2 and button B10 is selected. CPU 58 therefore acquires the handler index "0" that is given in the handler column of index "0" of the object table of navigation data NVT 2 of FIG. 47. It then gets the script corresponding to handler index "0" of the handler definition table, and executes this.

The first line of this script is an "if" statement. If the condition stated after the "if" statement is fulfilled, the script after "then" is executed; if it is not fulfilled, the script after "then" (up to "endif") is ignored. In this case, the condition is that mode=reproduction i.e. whether the system is in reproduction mode or not. The CPU 58 stores in memory 60 the current operating mode, which is changed over in response to control input from control input unit 54. CPU 58 therefore evaluates the condition in accordance with this.

Since the system is currently in reception mode, the "if" condition of the first line is not fulfilled, so processing shifts to execution of the next "if" statement. The condition here is whether the system is in reception mode or not. Since the system is currently in reception mode, the script after the "then" is executed. That is, send_string(index 1, index 2) is executed. A telephone call is thereby made to the Osaka center, and an order for product "B-133" is made.

(2) Recording Mode

Figure 49:
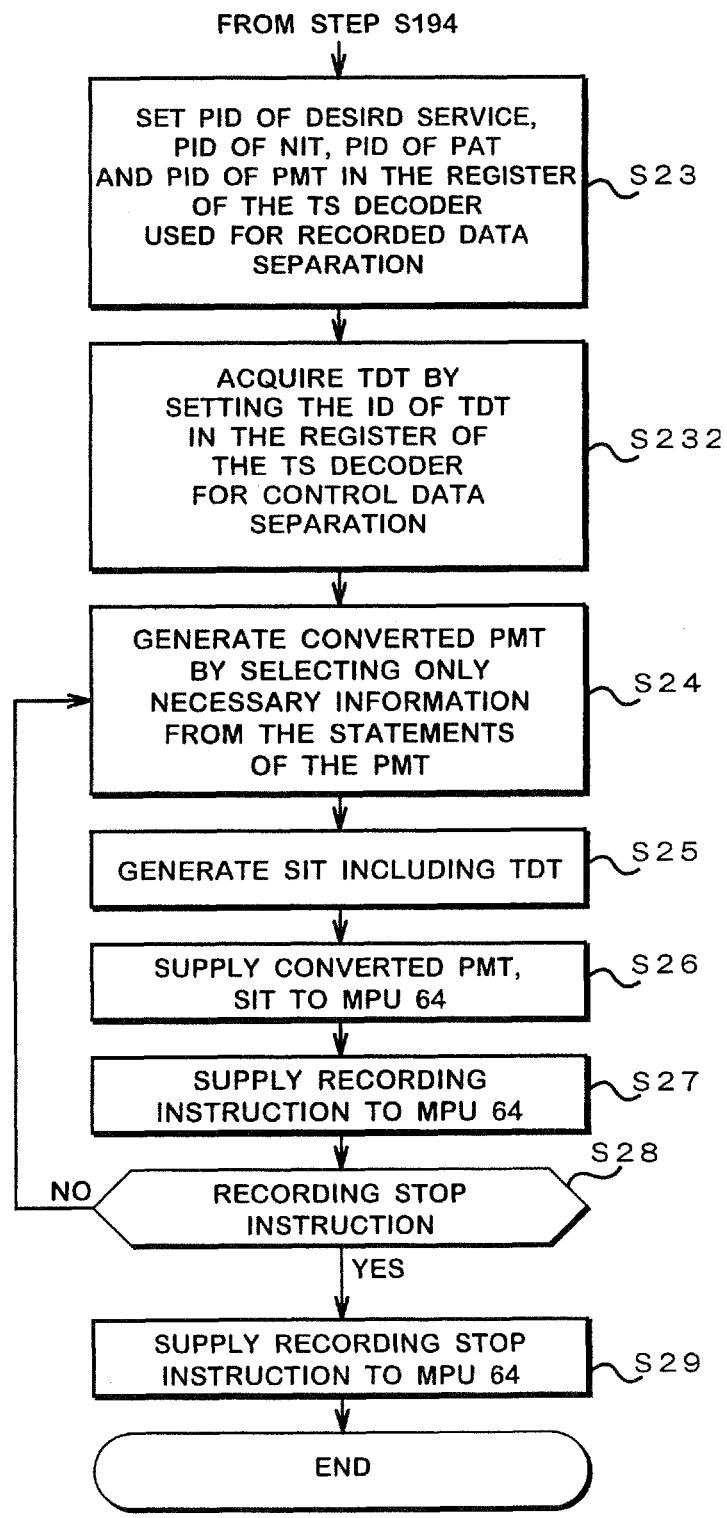
FIG. 49 is a flow chart of a program in recording mode.

FIG. 49 shows in the form of a flow chart the recording mode program which is recorded in memory 60. The basic processing is the same as in the case of FIG. 40. At step S 232, CPU 58 sets the packet ID (given in the NIT) of the control data TDT (time and date table) that indicates the current time and date in the register of TS decoder 50 used for control data separation. The content of the TDT is thereby stored in memory 60. TDTs are sent frequently, and CPU holds only newest TDT in the memory 60.

Next, CPU 58, when the SIT is generated, includes the content of the TDT i.e. the current time and date in the description of the SIT (for example, the descriptor region) (step S 25). Consequently, the recording time and date are included as the recording environment in the converted stream that is recorded on magnetic tape 44.

It should be noted that the recording time could also be extracted and recorded by a calendar device or clock device incorporated in the device.

(3) Reproduction Mode

The processing in reproduction mode is the same as in FIG. 44. However, the content of the navigation data that is interpreted and executed in step S 345 is different. It will now be assumed that the tele-shopping service described above is recorded on magnetic tape 44.

Just as in the case of the description of the reception mode, let us assume that selection button 84 of remote controller 78 is pressed when the condition shown in FIG. 32 is being reproduced. The condition of FIG. 32 is a condition in which buttons are displayed in accordance with the navigation data NVT 2 and button B10 is selected. CPU 58 therefore acquires handler index "0", which is given in the handler column of the index "0" of the object table of navigation data NVT 2 of FIG. 47. Next, it gets and executes the script corresponding to handler index "0" of the handler definition table.

The system is currently in reproduction mode, so the "if" condition of the first line is satisfied, and the script after the "then" of the second line is executed. First of all, CPU 58 executes "get_record_time Tr". This is an instruction to acquire the recording time recorded on magnetic tape 44 and to insert this in variable Tr. CPU 58 acquires the SIT by setting the packet ID of the SIT in the register of TS decoder 50 used for control data separation. Furthermore, it extracts the recording time information which is included as the content of this SIT, and stores this in memory 60 as variable Tr.

Next, it executes "get_current_time Tc". This is an instruction to get the current time and to insert it in variable Tc. CPU 58 acquires the current time and date from a calendar device and clock device (not shown) which are incorporated, and stores these in memory 60 as variable Tc.

Further, in the "if" statement of the next line, a decision is made as to whether or not, at the current date and time Tc, 10800 minutes or more have elapsed after the recording time and date Tr. If no more than 10800 minutes have elapsed, "send_string(index0, index2)" is executed, the Osaka center is telephoned, and a product order is placed. If more than 10800 minutes have elapsed, "send_string(index0, index2)" is not executed.

As described above, with this embodiment, it can be arranged that even if a product purchasing order operation such as tele-shopping was performed during reproduction, if the order period (10800 minutes in the case described above) has expired, the product order is not made.

It is possible to arrange that if an order was not executed even though the operation for making a product order was performed, a message to that effect is displayed on the screen of TV set 46. This may also be specified by a script of the navigation data.

By using a script as shown in FIG. 50, it is possible to specify that if the relationship between the recording time and date and reproduction time and date satisfies condition A linkage is effected to content index "0" but, if this is not satisfied, linkage is effected to content index "1". That is, even though the same operation is performed (for example actuation of the handler), it is possible to arrange for linkage to be effected to different content, in accordance with the difference of recording time and date and reproduction time and date. In this way, on reproduction, suitable content can be output corresponding to the discrepancy with respect to the recording date and time.

Although in the above embodiment the condition for performing execution or not was stated in the script as an "if" statement, it would be possible to provide an execution condition table as in the sixth embodiment, illustrated below.

6.2.3 Recording Environment and Reproduction Environment

In the embodiment described above, the date and time were employed as the recording and reproduction environment. However, it would be possible to employ just the recording date or time. It would also be possible to employ the day of the week or whether or not the day is a holiday.

In the above embodiment, the recording date and time and reproduction date and time were used as the recording environment and reproduction environment. However, the device used for recording and the device used for reproduction could be used as the recording environment and reproduction environment. For example, the type of device could be recorded as the recording environment and compared with the type of recording device and type of reproduction device in the navigation data and a statement provided whereby reproduction is effected with the recording data format etc. converted in accordance with the difference thereof. Also, the place of recording or place of reproduction could be used as recording environment or reproduction environment.

Also, although, in the above embodiment, the recording environment was given in the SIT, it could be given in the converted PAT or converted PMT etc.

6.3. Other Embodiments

In the above embodiment, it was arranged for data indicating the degree of discrepancy between the recording environment and the reproduction environment and the processing content to deal with this to be transmitted included in the transport stream from the transmission device, and for the reception/recording/reproduction device at the receiving end to alter its processing content in accordance with this data in accordance with the discrepancy of the recording environment and reproduction environment. It is therefore possible to flexibly determine, from the transmission end, the degree of discrepancy of the recording environment and reproduction environment and the processing content to deal with this. However, as in the case of the second embodiment of FIG. 16, it is possible to prepare at the reception/recording/reproduction device information regarding the degree of discrepancy of the recording environment and reproduction environment and the processing content to deal with this.

In the above embodiment, a single set of navigation data is repeatedly transmitted (repeatedly sequentially recorded). Furthermore, in this navigation data, there are described images for control purposes to make it possible to distinguish which condition is selected, as well as links or display data of video/audio corresponding to the selected condition. Thus, an example of a service having interactive capability has been described. However, the method of implementing interactive capability is not restricted to the above and can be applied to any service having interactive capability wherein the processing content can be changed by recording the environment on a recording medium during recording and comparing this with the environment on reproduction.

7. Sixth Embodiment 7.1. Transmission Device

The basic construction of a transmission device in this embodiment is as shown in FIG. 2. However, the navigation data generated by control data generating unit 6 is different from that of the fifth embodiment. In this embodiment, the navigation data contains a statement to alter the processing content in accordance with the reproduction environment on reproduction.

Taking the example of the tele-shopping described in the previous embodiments, in this embodiment, navigation data NVT 1 and NVT 2 for example as shown in FIG. 51 and FIG. 52 are transmitted from the transmission device. In each of the navigation data NVT 1, NVT 2, a condition column is provided in the handler definition table, and a condition execution table corresponding to this is newly added. The details of these execution conditions are described in the processing of the reception device.

7.2. Reception/Recording/Reproduction Device 7.2.1 Overall Construction of the Reception/Recording/Reproduction Device FIG. 53 shows the overall construction of a reception/recording/reproduction device according to this embodiment. In this embodiment, there is provided a reproduction environment acquisition means 74 that acquires the environment on reproduction. In reproduction mode, restoration means 40 outputs appropriate reproduction content depending on the environment in question, by taking into account the reproduction environment obtained from the reproduction environment acquisition means 74.

Consequently, suitable reproduction can be achieved, in accordance with the reproduction environment.

7.2.2 Specific Constructional Example and Operation of Reception/Recording/Reproduction Device The block diagram of the case where the reception/recording/reproduction device 32 shown in FIG. 53 is implemented using a CPU is identical with FIG. 34.

This device has three modes: reception mode, recording mode and reproduction mode. Hereinbelow, the operation of reception mode, recording mode, and reproduction mode will be described.

(1) Reception Mode

Processing in reception mode is the same as in FIG. 36. However, the content of the navigation data that are interpreted and executed in step S 195 is different.

This will be described taking as an example the tele-shopping described in the preceding embodiments. Let us assume that navigation data NVT 1 and NVT 20 as shown in FIG. 51 and FIG. 52 are being transmitted from the transmission device.

With the screen in the condition shown in FIG. 32, let us assume that the selection button 84 of remote controller 78 is pressed. In the condition of FIG. 32, buttons are displayed in accordance with the navigation data NVT 2, and button B10 is in selected condition. Consequently, CPU 58 acquires the handler index "0" given in the handler column of index "0" of the object table of navigation data NVT 2 of FIG. 52. Next, it gets the script and conditions corresponding to handler index "0" of the handler definition table.

Since "0" is given in the condition column, a condition is acquired corresponding to execution condition index "3" of the execution condition table. That is, the time limit "23:59 on 31 Aug. 1998" is obtained. CPU 58 acquires the current date and time from the TDT in the transport string or the incorporated calendar device/clock device etc. (reception time acquisition means) and determines whether or not the current time has passed the aforementioned execution time limit.

If the execution time limit has not been passed, the script corresponding to handler index "0" of the handler definition table is executed. A telephone call is therefore made to the Osaka center, and an order for a product is made.

If the execution time has passed, the above script is not executed and no order is made.

(2) Recording Mode

The processing for recording mode is the same as in FIG. 40.

(3) Reproduction Mode

The processing in reproduction mode is the same as in the case of FIG. 44. However, the content of the navigation table that is interpreted and executed in step S 345 is different. The following description assumes that the tele-shopping service described above is recorded on magnetic tape 44.

As in the case of the description of the reception mode, let us assume that that the selection button 84 of remote controller 78 is pressed when the condition shown in FIG. 32 is being reproduced. In the condition of FIG. 32, buttons are displayed in accordance with the navigation data NVT 2 and button B10 is selected. CPU 58 therefore acquires the handler index "0" that is given in the handler column of index "0" of the object table of navigation data NVT 2 of FIG. 47.

Next, it gets the script and conditions corresponding to handler index "0" of the handler definition table. Since "0" is given in the condition column, the condition corresponding to execution condition index "3" of the execution condition table is acquired. That is, the fact that the execution time-limit is "23:59 on 31 Aug. 1998" is obtained. CPU 58 acquires the current date and time from the TDT in the transport stream or an incorporated calendar device or clock device etc. (reception time acquisition means), and determines whether the current date and time has passed the aforementioned execution time limit.

If the execution time limit has not been passed, the script corresponding to handler index "0" of the handler definition table is executed. A telephone call is therefore made to the Osaka center, and an order for a product is made.

If the execution time limit has passed, the above script is not executed, and no order is made.

As described above, with this embodiment, even though the operation for making a product purchase order such as tele-shopping is performed during reproduction, if the time limit for making an order (23:59 on 31 Aug. 1998 in the above case) has passed, it can be arranged that no product order is made.

It should be noted that if, notwithstanding that the operation for making a product order has been performed, no product order has been made, a message to that effect may be arranged to be displayed on the screen of TV set 46. This also may be stated in the script of the navigation data.

Although, in the above embodiment, the condition for whether execution is performed was stated in the execution condition table, it would be possible for this to be given in the script as an "if" statement, as in the case of the fifth embodiment.

7.2.3 Reproduction Environment

In the above embodiment, the date and time were employed as the recording and reproduction environment. However, it would be possible to employ only the date of recording or only the time. It would also be possible to employ the day of the week or whether or not the day is a holiday.

In the above embodiment, the reproduction date and time was taken as the reproduction environment, and the execution content was determined by making a judgment about this reproduction date and time in accordance with the navigation data. However, it would be possible to determine the execution content by taking the device used for reproduction as the reproduction environment and using the navigation data to make a decision about this reproduction device. Also, the place of reproduction could be taken as the reproduction environment.

For example, in the above embodiment, which button was selected and displayed in the initial condition was fixed. However, it could be arranged for the navigation data to prescribe which button is selected and displayed in the initial condition, in accordance with the reproduction environment (for example, the place of installation of the reproduction device). If this is done, the initial screen obtained if reproduction is performed with a device situated in Osaka is the display of FIG. 29, while the initial screen obtained if reproduction is performed with a device situated in Tokyo is the display of FIG. 30.

Also, in the same way, it is possible to select the initial audio of a bilingual broadcast in accordance with the reproduction condition (for example, the location in which the reproduction device is situated).

It should be noted that an optimal initial screen in accordance with the reception environment can be obtained by performing a similar process in accordance with the reception environment (for example the location of installation of the reception device).

8. Seventh Embodiment

In the above embodiments, navigation data shown in the FIGS. 46 and 47 are used. Navigation data may be described by HTML (Hyper Text Markup Language) as shown in FIGS. 54 and 55. Because HTML is widely used in the Internet, Navigation data described by HTML achieves compatibility with computer.

In FIG. 54, the display position of button B0 is instructed by "left:500; top:200" of part 200. "normal_bitmap_file:bitmap0" instructs to use the data "bitmap0" as non-selected status, and "focused_bitmapLfile:bitmap1" instructs to use the data "bitmap1" as selected status. "left:500; top:200" instructs the display position of the button. "onclick="shopping_osaka( )"" instructs a script that should be executed when a selected button is selected and decided. Concerning other buttons B1 and B2, similar instructions are made.

The part 210 describes a script "shopping_osaka( )" that is executed when the button of ordering from osaka is selected and decided. The part 220 describes a script "shopping_tokyo( )" that is executed when the button of ordering from tokyo is selected and decided. Contents of script is same as FIG. 46.

The part 230 describes a script "goto_clothing_store( )" that is executed when the button of moving to clothing store is selected and decided.

HTML scripts shown in FIGS. 54 and 55 are corresponding to the scripts shown in FIGS. 46 and 47 and are same results as the scripts shown in FIGS. 46 and 47. Other self-description language such as XML (eXtensible Markup Language) or BML (Broadcast Markup Language) may be used instead of HTML.

9. Eighth Embodiment

Figure 57:
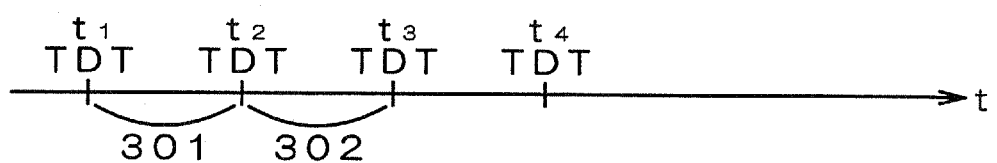
FIG. 57 is a view showing the way in which time point is recorded in recording mode.

In above embodiments, SIT that includes the time and date described in received newest TDT is recorded in the recording medium, and the recording time and date are obtained by reading the time and date of SIT form the recording medium. While process of this method is simple, the recorded time is not accurate. As shown in FIG. 57, time t1 is recorded between time duration 301, and time t2 is recorded between time duration 302.

Figure 56:
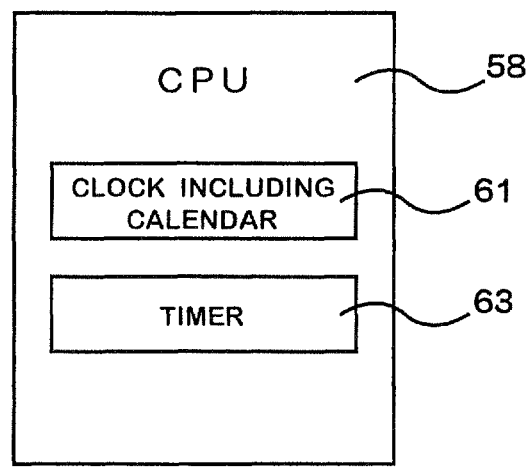
FIG. 56 is a view showing the internal construction of CPU 58.

When accurate time is necessary, following method mat be used. Referring to FIG. 56, CPU 58 adjusts the clock 61 with calendar by using the received TDT. CPU 58 obtains the current time and date from the clock 61 and recording the same as a part of SIT, when generating the SIT. This achieves to record an accurate recording time into the recording medium.

When reproduction mode, the recording time is obtained by the time and date reproduced form the recording medium as a part of SIT. CPU 58 obtains the recording time from SIT and holds newest recording time in the memory 60.

Figure 58:
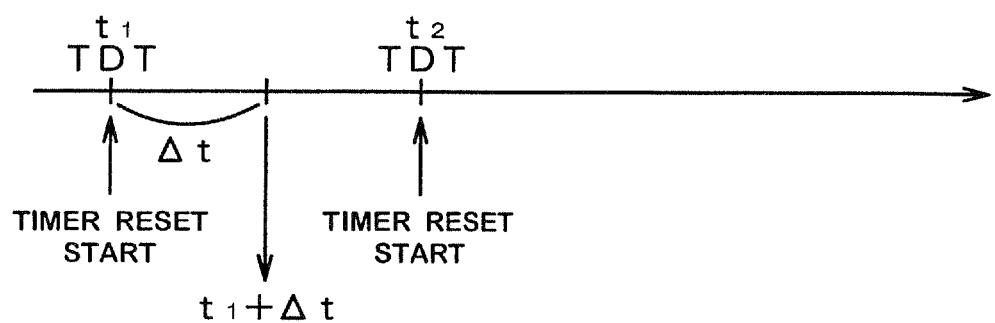
FIG. 58 is a view showing the way in which recording time point is acquired in reproduction mode.

In obtaining the recording time, the obtained recording time is not accurate. Timer 63 (within CPU 58) may be used for obtaining accurate recording time. Referring to FIG. 58, the timer 63 is reset and restarted when recording time in SIT is obtained. When obtaining the recording time, accurate recording time that is calculated by adding the timer count time Δt to the time t1 shown by newest SIT is obtained as t1+Δt. Another clock with calendar that is adjusted by SIT may be provided instead of the timer 63.

In the above mentioned embodiment, the clock 61 showing current time is adjusted by TDT in the reception and recording modes, but is not adjusted by TDT in the reproducing mode. This is because TS decoder 50 reads and process the converted stream form the recording medium, and dose not obtain TDT form the broadcasted transport stream. Therefore, there may be an error in the current time obtained from the clock 61.

For preventing the problem, another TS decoder 150 is provided other than TS decoder 50 as shown in FIG. 59. In reproduction mode, CPU 58 obtains the recording time and date form SIT using the TS decoder 150 and stores the recording time and date into the memory 60 and controls the timer 63. On the other hand, CPU 58 obtains TDT form the transport stream by TS decoder 50 and adjusts the clock 61 using the TDT. By using this method, both the accurate recording time and the accurate current time are obtained.

Further, in the embodiment of FIG. 59, a service is recording simultaneously with other service is receiving and outputting TV set 46, because other tuner 134 and descrambler 148 are also provided.

In other embodiments, TOT (Time Offset Table) may be used instead of TDT.

10. Others

In all of the above embodiments, some or all of the functions implemented using the CPU could be implemented by means of hardware. Also, in all of the above embodiments, some or all of the functions implemented using hardware could be implemented using the CPU.

Also, while, in the above embodiments, an example was described in which magnetic tape capable of being recorded to sequentially was employed as the recording medium for recording the converted stream, it would be possible to employ recording media such as a magnetic disc, magneto optic disc, hard disc, flexible disc, DVD, or CD-R.

While the embodiments of the present invention, as disclosed herein, constitute preferred forms, it is to be understood that each term was used as illustrative and not restrictive, and can be changed within the scope of the claims without departing from the scope and spirit of the invention.

What is claimed is:

1. A device for recording and reproducing digital broadcasts comprising:
   receiving means for receiving a transport stream in which a plurality of services are packet-multiplexed;
   conversion means for selecting packets relating to a desired service from the received transport stream;
   recording means for recording the selected packets on a recording medium;
   reading means for reading the selected packets recorded on the recording medium; and
   restoration means for receiving the converted stream from the reading means and for reproducing and outputting service content,
   wherein said conversion means further generates first information representing a time, place or device at which recording on the recording medium is performed and supplies the first information to the recording means together with the selected packets; and
   the restoration means compares the first information with second information representing a time, place or device at which reproduction from the recording medium is performed and controls the reproduction of the service content based on difference between the first and second information in accordance with a control rule described in the selected packets which do include the first information.

2. The device according to claim 1, wherein said conversion means is operable to generate a converted stream by selecting, of packets relating to the desired service in the transport stream, an elementary stream and PAT and PMT packets.

3. The device according to claim 2, wherein the conversion means is operable to acquire recording time information based on TDT (Time and Date Table), TOT (Time Offset Table) or PCR (Program Clock Reference) in the transport stream to generate the first information.

4. A method of recording and reproduction of digital broadcasts, the method comprising:
- receiving a transport stream in which a plurality of services are packet-multiplexed;
- selecting packets relating to a desired service from the received transport stream;
- generating first information representing a time, place or device at which recording on the recording medium is performed;
- recording the selected packets and the first information on a recording medium;
- reading the selected packets and the first information recorded on the recording medium;
- reproducing and outputting service content;
- comparing the first information with second information representing a time, place or device at which reproduction from the recording medium is performed; and
- controlling the reproduction of the service content based on difference between the first and the second information in accordance with a control rule described in the selected packets.

* * * * *